(12) United States Patent
Murakami

(10) Patent No.: US 9,526,138 B2
(45) Date of Patent: Dec. 20, 2016

(54) LOAD DRIVING DEVICE, AND LIGHTING APPARATUS AND LIQUID CRYSTAL DISPLAY DEVICE USING THE SAME

(71) Applicant: ROHM CO., LTD., Kyoto (JP)

(72) Inventor: Sadakazu Murakami, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 162 days.

(21) Appl. No.: 14/454,528

(22) Filed: Aug. 7, 2014

(65) Prior Publication Data

US 2014/0346958 A1 Nov. 27, 2014

Related U.S. Application Data

(63) Continuation of application No. 13/952,333, filed on Jul. 26, 2013, now Pat. No. 8,836,295, which is a
(Continued)

(30) Foreign Application Priority Data

Jul. 7, 2003 (JP) .................................. 2003-192784
Sep. 29, 2003 (JP) .................................. 2003-337344

(51) Int. Cl.
*G05F 1/46* (2006.01)
*H05B 33/08* (2006.01)
(Continued)

(52) U.S. Cl.
CPC ............ *H05B 33/0827* (2013.01); *G05F 1/46* (2013.01); *H02J 1/00* (2013.01); *H02M 3/155* (2013.01); *H05B 33/0815* (2013.01); *H05B 33/0818* (2013.01); *H05B 37/02* (2013.01); *Y10T 307/406* (2015.04)

(58) Field of Classification Search
CPC .... H02M 3/155; H05B 33/08; H05B 33/0815; H05B 33/0827; H05B 37/02; G05F 1/46
See application file for complete search history.

(56) References Cited

U.S. PATENT DOCUMENTS

| 5,966,395 A | 10/1999 | Ikeda |
| 6,204,646 B1 | 3/2001 | Hiramatsu et al. |

(Continued)

FOREIGN PATENT DOCUMENTS

| EP | 0567280 A1 | 10/1993 |
| JP | S61254070 A | 11/1986 |

(Continued)

OTHER PUBLICATIONS

Khan et al. "Power Electronics in Automotive Electrical System", IEEE, pp. 29-38, 1999.

*Primary Examiner* — Matthew Nguyen
(74) *Attorney, Agent, or Firm* — DLA Piper LLP (US)

(57) ABSTRACT

A load driving device disclosed in the specification includes a power supply circuit for supplying to a load an output voltage converted from an input voltage, a detection voltage generation circuit for generating a detection voltage which varies depending on a magnitude of a voltage drop which across the load, and a control circuit for controlling the power supply circuit so that it performs output feedback control of the output voltage, on the basis of the detection voltage.

6 Claims, 67 Drawing Sheets

Related U.S. Application Data continuation of application No. 12/731,006, filed on Mar. 24, 2010, now Pat. No. 8,519,680, which is a continuation-in-part of application No. 12/428,338, filed on Apr. 22, 2009, now Pat. No. 7,944,189, which is a continuation of application No. 11/750,894, filed on May 18, 2007, now Pat. No. 7,541,785, which is a continuation of application No. 10/879,315, filed on Jun. 29, 2004, now Pat. No. 7,235,954.

(51) Int. Cl.
*H02J 1/00* (2006.01)
*H05B 37/02* (2006.01)
*H02M 3/155* (2006.01)

(56) References Cited

U.S. PATENT DOCUMENTS

| | | |
|---|---|---|
| 6,229,833 B1 | 5/2001 | Noda |
| 6,313,589 B1 | 11/2001 | Kobayashi |
| 6,400,102 B1 | 6/2002 | Ghanem |
| 6,577,512 B2 | 6/2003 | Tripathi et al. |
| 6,587,490 B2 | 7/2003 | Crawford |
| 6,697,402 B2 | 2/2004 | Crawford |
| 7,010,007 B2 | 3/2006 | Kobayashi |
| 7,071,630 B1 | 7/2006 | York |
| 7,091,705 B2 | 8/2006 | Hoshino et al. |
| 7,129,679 B2 | 10/2006 | Inaba et al. |
| 7,265,504 B2 | 9/2007 | Grant |
| 8,519,680 B2 | 8/2013 | Murakami |
| 2003/0016711 A1 | 1/2003 | Crawford |
| 2003/0062881 A1 | 4/2003 | Crawford |
| 2005/0128168 A1 | 6/2005 | D'Angelo |
| 2005/0168419 A1 | 8/2005 | Shimizu |
| 2010/0327772 A1* | 12/2010 | Lee ............... H05B 33/0818 315/297 |
| 2013/0038819 A1* | 2/2013 | Ishikawa ............ G09G 3/342 349/69 |
| 2013/0250215 A1 | 9/2013 | Sasaki et al. |

FOREIGN PATENT DOCUMENTS

| | | |
|---|---|---|
| JP | H11038049 A | 2/1999 |
| JP | 2001215913 A | 8/2001 |
| JP | 2001313423 A | 11/2001 |

\* cited by examiner $$\left\{\begin{array}{l} 0 \leq \alpha\,(=T_{on}/T) \leq 1 \\ 0 \leq \beta\,(=T_{on}'/T) \leq 0.25 \end{array}\right\}$$

LOAD DRIVING DEVICE, AND LIGHTING APPARATUS AND LIQUID CRYSTAL DISPLAY DEVICE USING THE SAME

CROSS REFERENCE TO RELATED APPLICATIONS

This application is a continuation of U.S. patent application Ser. No. 13/952,333, filed on Jul. 26, 2013, which is a continuation of U.S. patent application Ser. No. 12/731,006 filed on Mar. 24, 2010, now U.S. Pat. No. 8,519,680, which is a continuation-in-part of U.S. patent application Ser. No. 12/428,338, filed on Apr. 22, 2009, now U.S. Pat. No. 7,944,189, which is a continuation of U.S. patent application Ser. No. 11/750,894, filed on May 18, 2007, now U.S. Pat. No. 7,541,785, which is a continuation of U.S. patent application Ser. No. 10/879,315, filed on Jun. 29, 2004, now U.S. Pat. No. 7,235,954, and claims the benefit of priority under 35 USC 119 of Japanese patent application number 2003-192784, filed on Jul. 7, 2003, and Japanese patent application number 2003-337344, filed on Sep. 29, 2003. The content of all of these applications is incorporated herein by reference.

BACKGROUND OF THE INVENTION

1. Field of the Invention

This invention relates to a device for driving a load (load driving device) with the output voltage by converting an inputted power supply voltage by means of a dc-dc conversion type power source circuit, and to a portable apparatus equipped with such load driving device.

2. Description of Related Art

There have been many devices in use for driving loads such as LEDs, utilizing a de-de conversion type power supply circuit adapted to provide an output voltage different from an inputted power supply voltage. A typical load driving device has a power supply circuit that generates a predetermined output voltage and an output current for driving a load, as disclosed in Japanese Patent Application Laid Open No. 2001-313423. For this purpose, the level of the output voltage or the output current supplied to the load is measured to establish a detection voltage or detection current, which is fed back to a control circuit of the power supply circuit.

In such conventional load driving device, the detection voltage is obtained by dividing the output voltage in a voltage dividing circuit having a high resistance. The detection current is obtained by detecting the potential drop across a resistor (referred to as voltage detection resistor) connected in series with the load, whereby the load current flows through the resistor. The detection voltage (or detection current) is compared with a reference value, so that the output voltage (current) outputted from the power supply circuit is controlled based on the comparison.

In a portable electronic device such as a cellular phone, the load current is sometimes increased or decreased within a permitted range in response to a request made during service. For example, when the load is a light emitting diode (LED), a request is made to regulate the luminance of the LED to an arbitrary level.

In such a case as mentioned above, the voltage detection resistor connected in series with the load will increase energy loss when the load current is increased. Therefore, the overall efficiency of the electronic device that includes a power supply circuit and a load disadvantageously drops when the load current becomes large (i.e. during a heavy duty).

In another case, a request is made to drive one load with a constant current and at the same time to drive another load with a voltage above a predetermined voltage. In such case, conventionally it is necessary to provide a further appropriate power supply circuit to meet individual use conditions, which requires additional space and cost for the power supply circuit and load.

SUMMARY OF THE INVENTION

It is, therefore, an object of the technical feature disclosed in this specification to provide a load driving device having a dc-dc conversion type power supply circuit for generating an output voltage by converting a power supply voltage (an input voltage), the power supply circuit capable of adjusting the magnitude of the load current within a predetermined range while avoiding the energy loss caused by an increase in the load current, thereby enabling efficient driving of the load.

It is another object of the technical feature disclosed in this specification to provide a portable apparatus equipped with such load driving device.

It is a further object of the technical feature disclosed in this specification to provide a load driving device having a dc-dc conversion type power supply circuit for generating an output voltage by converting a power supply voltage, the power supply circuit capable of driving a multiplicity of loads having different use conditions, including at least one constant-current type load and another type of load, and capable of adjusting the magnitude of the load current supplied to the constant-current type load within a predetermined range while maintaining the output voltage to another type of load above a predetermined voltage.

It is a still further object of the technical feature disclosed in this specification to provide a portable electronic apparatus equipped with such load driving device.

A load driving device of the technical feature disclosed in this specification has a power supply circuit for supplying to a load an output voltage by converting an input voltage and a constant-current source connected in series with the load and capable of providing a constant current that can be adjusted in magnitude (such current hereinafter referred to as adjustable constant current and current source referred to as variable-current type current source), wherein the power supply circuit is adapted to control the output voltage so as to keep constant the voltage at the node of the load and constant-current source. The constant-current source has a current mirror circuit constituted of a constant-current circuit providing an adjustable constant current (adjustable-current type constant-current circuit), an input-side current mirroring transistor connected in series with the constant-current circuit, and an output-side current mirroring transistor receiving the same control input as the input-side transistor, wherein the adjustable constant current is supplied to the output-side transistor. The constant voltage is higher than the saturation voltage of the output-side current mirroring transistor.

In accordance with the technical feature disclosed in this specification, in addition to a dc-dc conversion type power supply circuit employed to provide an output voltage by converting an input voltage, a constant-current source providing an adjustable constant current may be connected in series with a load that has an operating point that depends on the magnitude of the current flowing through it (e.g. a set of LEDs). Thus, it is possible to provide the load with a required magnitude of current in a stable manner.

The output voltage of the dc-dc conversion type power supply circuit is controlled such that the voltage drop across the constant-current source becomes equal to a reference voltage, where the reference voltage is set to secure stable operation of the constant-current source. Thus, the output voltage of the dc-dc conversion type power supply circuit is automatically adjusted so that a magnitude of current required by respective LEDs for proper luminance will flow through it even when the LEDs fluctuate in luminescence characteristic.

As described above, the voltage drop across a constant-current source is controlled automatically to become equal to the reference voltage so that the current is maintained at the preset magnitude. Therefore, even if the currents flowing through the LEDs grow larger, there will be no such energy loss as would be incurred by a voltage detecting resistor. Thus, substantially no extra energy loss is caused by an increase in the load current that the load driving device of the invention can efficiently drive a load over a wide range of load current.

An adjustable-current type constant-current source can be provided for each load consisting of a set of LEDs in such a way that the dc-dc conversion type power supply circuit is controlled based on the lowest one of the voltage drops across the constant-current sources. This ensures stable supply of a predetermined constant current to each of the LEDs constituting the load.

A load driving device in accordance with the technical feature disclosed in this specification comprises a power supply circuit for supplying to a load an output voltage by converting an input voltage; and a variable-resistance means having a resistance that varies in response to a control signal and a current detection means for detecting the magnitude of the current flowing through said variable-resistance means, both means connected in series with said load, wherein said power supply circuit is fed with a first reference voltage and a first detection voltage provided by said current detection means, and controls said output voltage so as to equalize said first detection voltage to said first reference voltage.

The variable-resistance means has a low resistance when a voltage indicative of said output voltage exceeds a predetermined voltage, and has a resistance that increases in accord with the decrease in the voltage indicative of said output voltage below said predetermined voltage.

In accordance with the technical feature disclosed in this specification, a multiplicity of load has different load characteristics. For example, a constant-current load can be driven by a constant current with its magnitude varied within a predetermined range by use of a power supply circuit such as a dc-dc conversion type power supply circuit generating an output voltage by converting an input power supply voltage, and at the same time another load other than constant-current type can be driven by keeping the output voltage above a predetermined level for the load.

For a constant-current load, such as a set of LEDs, having an operating point that depends on the magnitude of the current flowing through it, an adjustable-current type constant-current source may be connected in series with the load. It is thus possible to provide the load with a required magnitude of current in a stable manner.

When the output voltage exceeds the predetermined voltage, the output voltage of the dc-dc conversion type power supply circuit is controlled so as to equalize the voltage drop across the constant-current source to a reference voltage, where the reference voltage is set to secure stable operation of the constant-current source. Thus, the output voltage of the power supply circuit is automatically adjusted so that the magnitude of current necessary for the set of LEDs of the load to emit a predetermined amount of light will flow through them even if the LEDs in the load fluctuate in luminescent characteristic.

Moreover, when the output voltage tends to drop below the predetermined voltage due to the adjustment of current for the LEDs, the output voltage may be controlled to remain at the predetermined voltage. Thus, it is possible to secure the predetermined output voltage for the non-constant-current type load.

DETAILED DESCRIPTION OF THE PREFERRED EMBODIMENTS

First Embodiment

Figure 1:
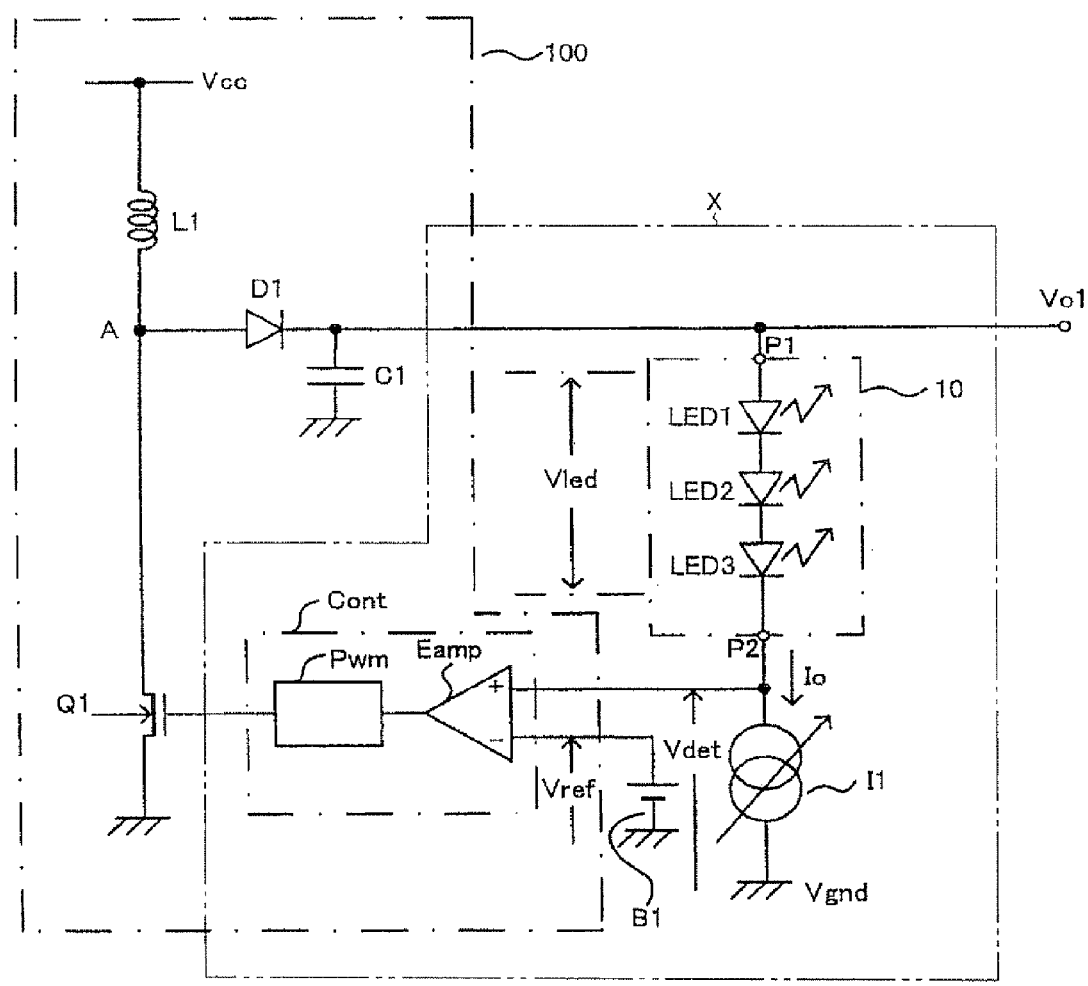
FIG. 1 is a schematic circuit diagram of a load driving device in accordance with a first embodiment of the invention.

The invention will now be described in detail by way of example with reference to the accompanying drawings. FIG. 1 is a schematic circuit diagram of a load driving device in accordance with a first embodiment of the invention.

As shown in FIG. 1, a switching power supply circuit 100 is a voltage step-up type switching power supply circuit for stepping up an input dc voltage Vcc (referred to as input voltage) to provide a stepped up dc output voltage Vo1.

A coil L1 and a switch Q1 in the form of N-type MOS transistor are connected in series between the power supply voltage Vcc and the ground. The voltage at node A of the coil L1 and switch Q1 is rectified by a rectifying diode D1 and smoothed by a smoothing capacitor C1. The smoothed voltage is provided as the output voltage Vo1. In what follows voltages represent potentials relative to the ground unless otherwise states.

Connected in series between a terminal point P1 having the output voltage Vo1 and the ground is an external load 10 and a constant-current source I1. The operating point of the external load 10 depends on the magnitude of the current that flows through it. The external load 10 is provided with a drive current Io having a predetermined magnitude set by the constant-current source I1. The voltage generated at one terminal P2 of the constant-current source I1 is taken as a detection voltage Vdet.

A control circuit Cont receives the detection voltage Vdet and a reference voltage Vref from a reference voltage source B1, and generates a switching signal for controlling the switching of the switch Q1 so as to equalize the detection voltage Vdet to the reference voltage Vref. In the example shown herein, the control circuit Cont includes an error amplifier Eamp for amplifying the difference between the reference voltage Vref and the detection voltage Vdet, and a pulse-width-modulation (PWM) control circuit Pwm for generating a PWM signal based on the output of the error amplifier Eamp. The PWM signal is provided as the switching signal.

The external load 10 is connected between the terminals P1 and P2. The invention may incorporate such external load in a portable electronic apparatus. In that case, the terminals P1 and P2 may be omitted.

An example of the external load 10 is a set of light emitting diodes (LEDs) LED1-LED3. In the example shown herein, the LEDs are white LEDs, which are used, for example, in a liquid crystal display (LCD) panel or as a backlight of a key. Although only three serial LEDs are shown in FIG. 1, the invention may encompass more than three LEDs connected in different configurations (serial, parallel, or combination of serial and parallel connections) depending on the luminance required and the area to be illuminated.

Figure 2:
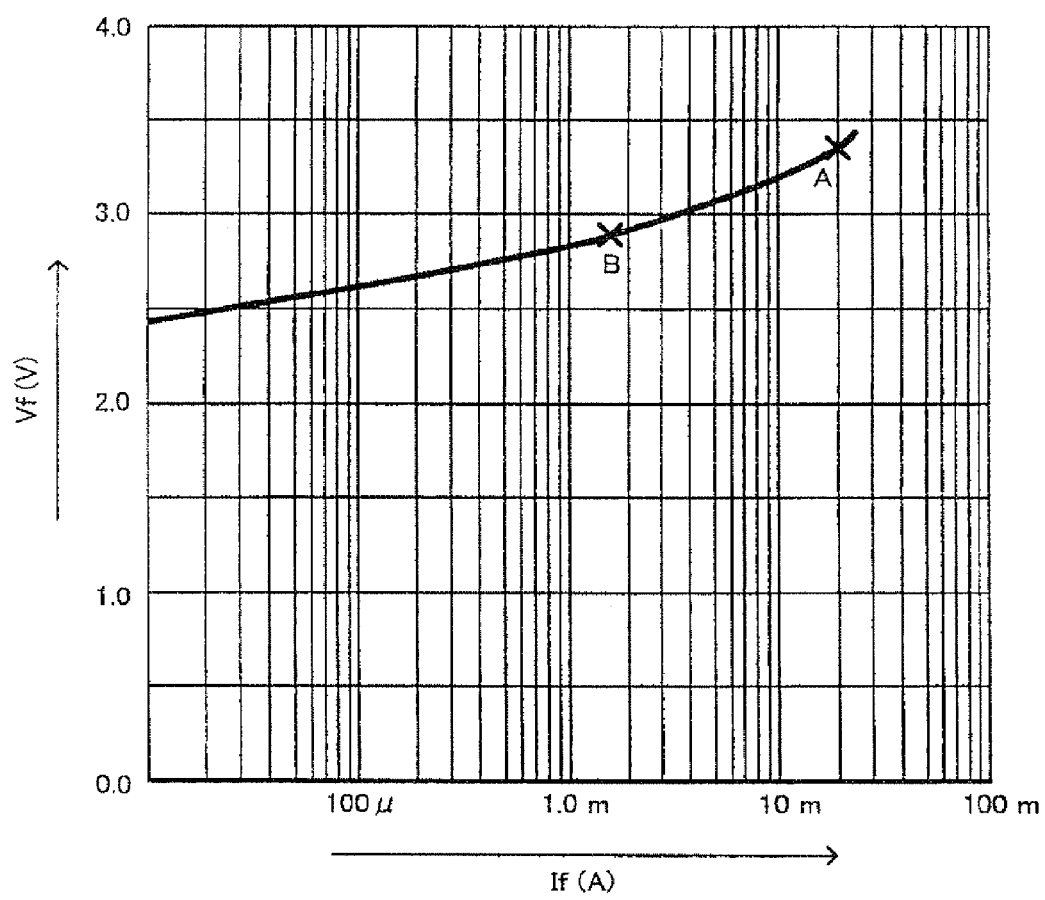
FIG. 2 is a graph showing the current-voltage characteristic of an LED.

The If-Vf characteristic of a white LED is shown in FIG. 2, where If stands for the current flowing through the LED and Vf for the voltage applied to the LED. In FIG. 2, the characteristic curve is plotted on a semi-logarithmic scale with the abscissa representing current If in logarithm and the coordinate representing voltage Vf. This LED emits light when current If is in a broad range (e.g. from 1.5 mA (point B) to 20 mA (point A)). As current If is varied, the luminance of the LED changes, in accordance with the magnitude of current If.

When current If is 20 mA (point A), the LED is activated by voltage Vf of 3.4 V applied in forward direction. However, not all of the LEDs necessarily have the same characteristic. For example, forward activation voltage Vf can differ from one LED to another in the range from about 3.4 V to about 4.0 V when current If is 20 mA. As seen in this example, white LEDs generally have higher forward activation voltage Vf than LEDs of other colors. In order to activate three white LEDs in series, the output voltage Vo1 must be at least 12.0 V or more.

Figure 3:
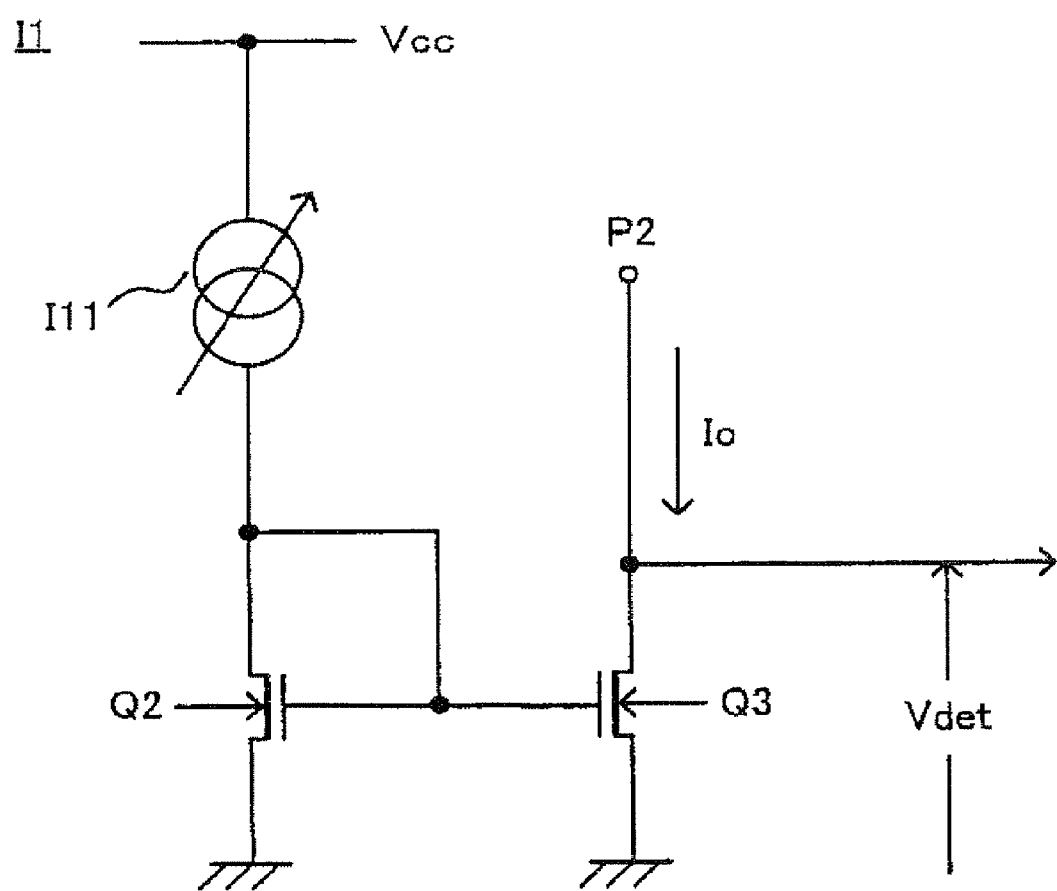
FIG. 3 is a schematic circuit diagram of a constant-current source

FIG. 3 shows an exemplary circuit arrangement of a constant-current source I1. As shown in FIG. 3, a constant-current circuit I11 and an N-type MOS transistor (hereinafter referred to as N-type transistor) Q2 are connected in series with each other between a power supply voltage Vcc and the ground. The drain and the gate of this N-type transistor Q2 are directly connected together. In addition to the N-type transistor Q2, a further N-type transistor Q3 having higher driving capability than the N-type transistor Q2 is provided to flow the drive current Io. The gate of the N-type transistor Q2 on the input-side is connected to the gate of the N-type transistor Q3 on output-side to form a current mirror circuit.

In FIG. 3, the magnitude of the drive current Io flowing through the N-type transistor Q3 may be arbitrarily set to a preferred value. This can be done by adjusting the magnitude of the current flowing through the constant-current circuit I11.

Referring back to FIG. 1 again, the constant-current source I1 can perform constant-current operation if it is impressed with a voltage higher than its saturation voltage of about 0.3 V, for example (which is the saturation voltage of the N-type transistor Q3 of FIG. 3). The portion of the voltage exceeding the saturation voltage (about 0.3 V), which is not necessary as the drive current, results in a power loss (being equal to voltage×current) inside the constant-current source I1. The output voltage Vo1 of the power supply circuit 100 is controlled so as to equalize the voltage drop Vdet across the constant-current source I1 to the reference voltage Vref. Therefore, the reference voltage Vref is set to a level slightly higher than the saturation voltage (about 0.3 V) of the transistor used in the constant-current source I1.

Figure 4:
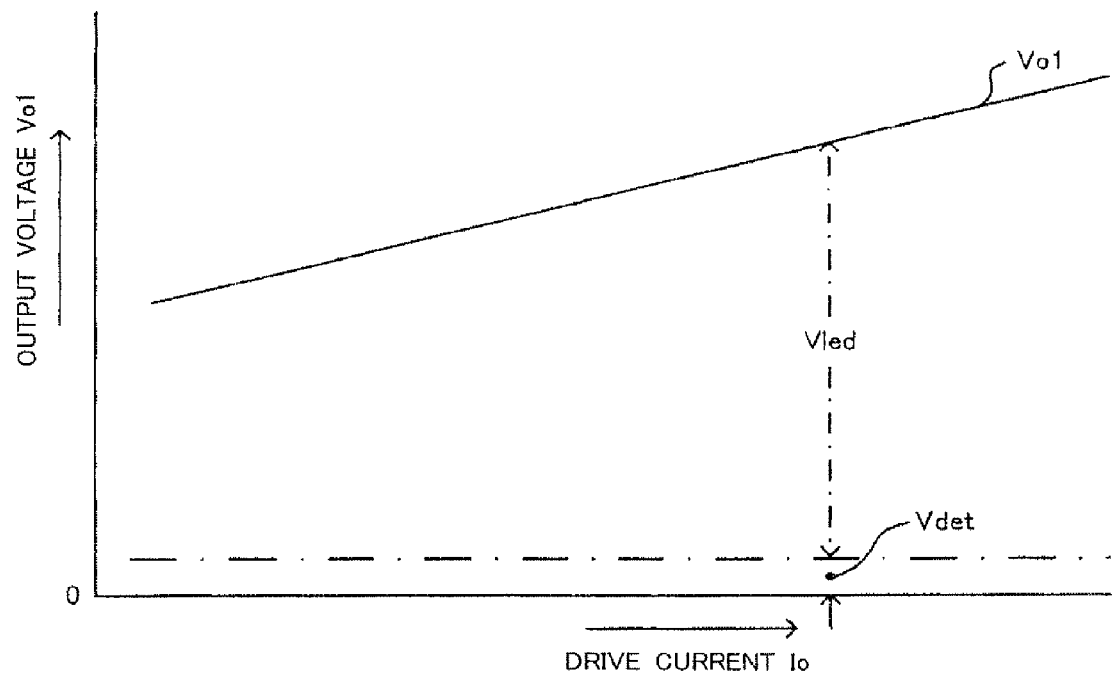
FIG. 4 is a graph showing the drive current-output voltage characteristic of a first dc-dc-conversion type power supply circuit of FIG. 1.

Operation of the load driving device thus configured will now be described with further reference to FIG. 4 showing the drive current-output voltage characteristic of the driving device. First, the magnitude of the drive current Io to be passed through the LEDs of the load 10 is set for the constant-current circuit I11. Then on-off switching operation of the switch Q1 is started in the switching power supply circuit 100. This causes the output voltage Vo1 to rise gradually.

As a consequence, the detection voltage Vdet will become equal to the reference voltage Vref, thereby causing the drive current Io to flow through the LEDs LED1-LED3 of the load 10. The LEDs will be activated to emit light at the predetermined luminance.

It should be appreciated that even if the forward voltage Vf characteristic varies from one LED to another for the LEDs LED1-LED3, only the output voltage Vo1 deviates from a predetermined value, without affecting the luminance of the LEDs LED1-LED3. The detection voltage Vdet, which represents the voltage drop across the constant-current source I1, is fixed. Hence, the output voltage Vo1 is equal to the constant detection voltage Vdet plus the voltage drop Vled (=3×Vf) across the LEDs LED1-LED3 in accord with the drive current Io at that time.

If the luminance of the LEDs LED1-LED3 needs to be changed, magnitude of the drive current Io may be changed. For example, if the drive current Io is increased, the luminance of the LEDs LED1-LED3 will increase accordingly. With this increase in the drive current Io, the voltage drop Vled across the LEDs LED1-LED3 becomes larger, in accordance with the Io-Vo1 characteristic shown in FIG. 2. The slope of the Vo1-line of FIG. 4 depends on the If-Vf characteristic shown in FIG. 2.

Since the voltage drop Vled across the LEDs LED1-LED3 increases in accord with the increase in the drive current Io, the output voltage Vo1 increases as shown by the characteristic curve of FIG. 4. However, since the detection voltage Vdet is fixed, the loss of power in the constant-current source I1 does not increase any further even if the drive current is increased to enhance the luminance. Thus, the load driving device maintains a high operating efficiency.

Second Embodiment

Figure 5:
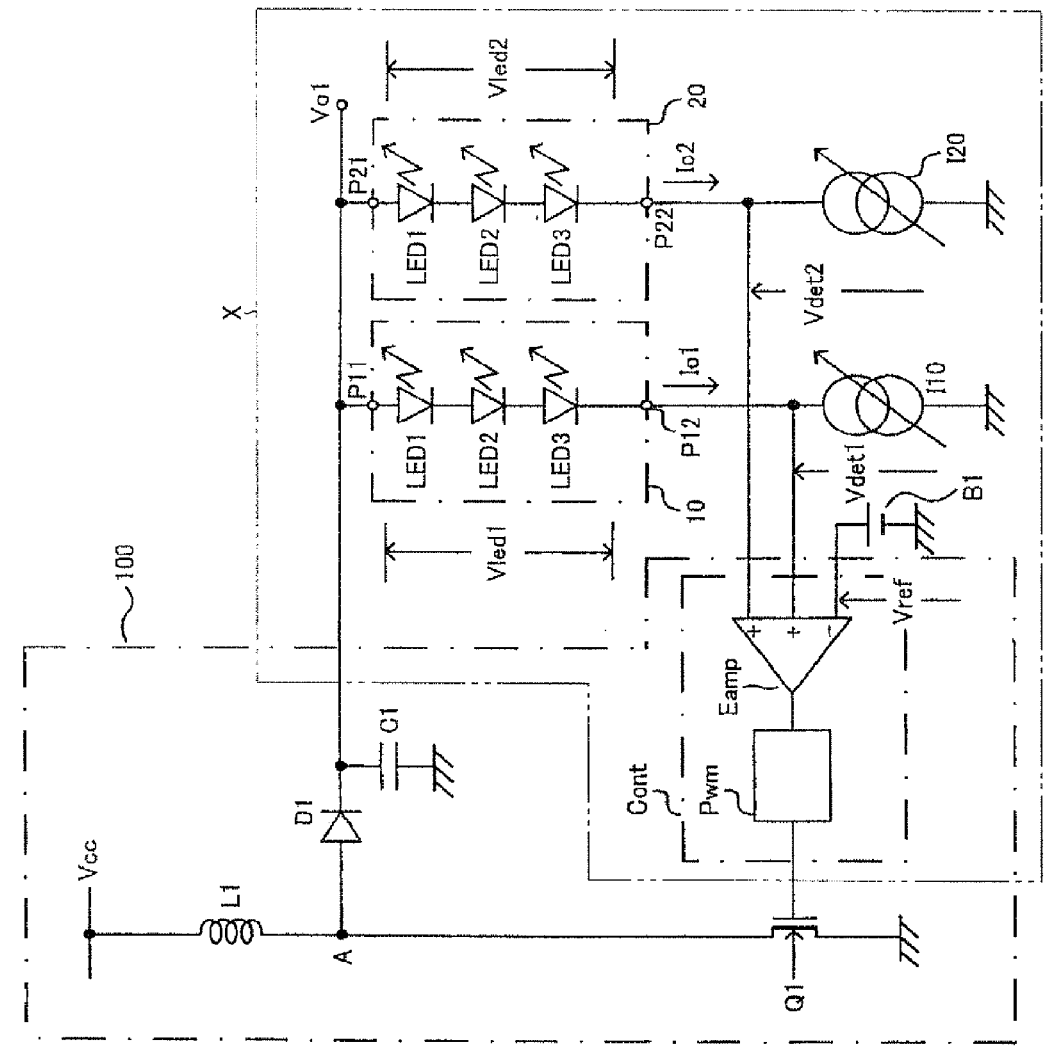
FIG. 5 is a schematic circuit diagram of a load driving device in accordance with a second embodiment of the invention.

FIG. 5 shows a circuit structure of a load driving device in accordance with a second embodiment of the invention. As shown in FIG. 5, the load driving device has a further load 20 in addition to the forgoing load 10. Furthermore, a constant-current source I20 is provided in association with the load 20. It should be understood that more than two loads can be added.

In the arrangement shown in FIG. 5, a constant-current source I10 is connected in series with the load 10, through which flows a drive current Io1. The voltage drop across the constant-current source I10 is utilized as a first detection voltage Vdet1. Similarly, a constant-current source I20 is connected in series with the load 20, through which flows a drive current Io2. The voltage drop across the constant-current source I20 is used as the second detection voltage Vdet2. Symbols P11, P12, P21, and P22 indicate terminals for connection with the loads.

An error amplifier Eamp of the control circuit Cont has two non-inverting input terminals (+) and one inverting input terminal (−). The two non-inverting input terminals (+) are fed with a first detection voltage Vdet1 and a second detection voltage Vdet2, one for each terminal, while the inverting input terminal (−) is fed with the reference voltage Vref. In the error amplifier Eamp, the lower one of the first detection voltage Vdet1 and the second detection voltage Vdet2 is compared with the reference voltage Vref. Rest of the circuit structure is the same as that of the first embodiment shown in FIG. 1.

The load driving device of FIG. 5 can adjust the individual drive currents Io1 and Io2 independently. The lower one of the voltage drops Vdet1 and Vdet2 of the constant-current sources I10 and I20, respectively, is automatically selected in the controlled switching operation performed by the power supply circuit 100, thereby securing operations of the constant-current sources I10 and I20 providing the constant drive current Io1 and Io2 to the multiple loads 10 and 20.

Thus, the second embodiment provides the same merits as the first if multiple loads are involved.

Third Embodiment

Figure 6:
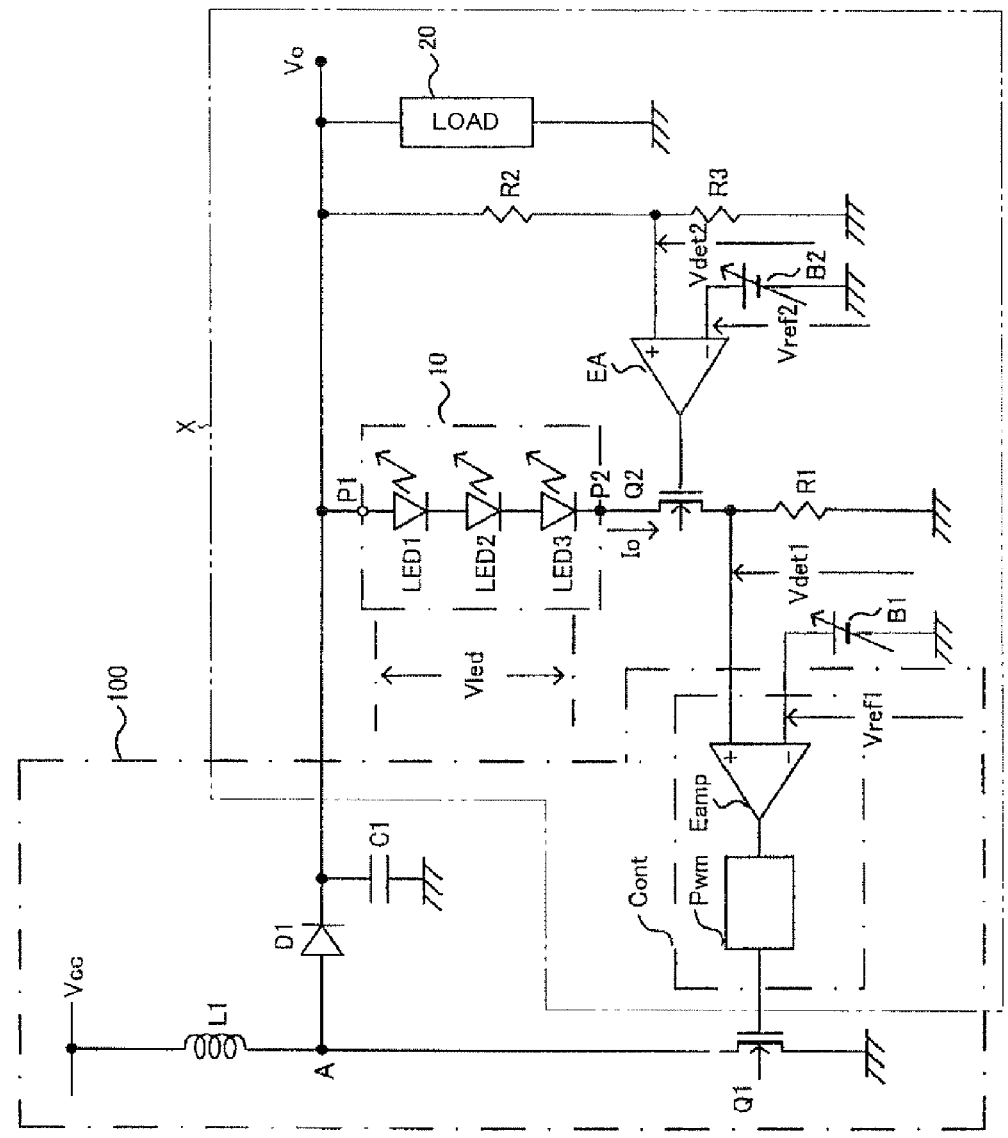
FIG. 6 is a schematic circuit diagram of a load driving device in accordance with a third embodiment of the invention.

FIG. 6 shows a circuit structure of a load driving device in accordance with a third embodiment of the invention. As seen in FIG. 6, the switching power supply circuit 100 has the same configuration as the one shown in FIG. 1.

In the third embodiment, connected in series between a node providing an output voltage Vo and the ground are a first external load (referred to as first load) 10 driven by a predetermined constant current, a variable-resistance means in the form of N-type transistor Q2 having variable resistance in response to a control signal, and a resistor R1 serving as a current detection means. The first load 10 is a load having an operating point that depends on the magnitude of the current flowing through it. In this example, the load 10 is provided with the drive current to of a predetermined magnitude. The voltage drop across the resistor R1 is used as the first detection voltage Vdet1.

The control circuit Cont is fed with the first detection voltage Vdet1 along with a first reference voltage Vref1 from a reference voltage source B1.

The first load 10 is the same as the load 10 of FIG. 1. Connected between a node having the output voltage Vo and the ground is a second external load (referred to as second load) 20 driven by a voltage higher than the predetermined voltage V1.

A voltage dividing circuit consisting of resistors R2 and R3 is provided to detect the output voltage Vo. One of the divided voltages serves as the second detection voltage Vdet2. An error amplifier EA is provided at the non-inverting input terminal (+) thereof with the second detection voltage Vdet2, and at the inverting input terminal (−) thereof with the second reference voltage Vref2 received from a reference voltage source B2. The second detection voltage Vdet2 and the second reference voltage Vref2 are compared in the error amplifier EA to generate a control signal in accord with the difference between them. The control signal is supplied to the gate of the N-type transistor Q2.

In order to drive the second load 20 at the voltage higher than the predetermined voltage V1, the second reference voltage Vref2 is set to the voltage $V1 \times R3/(R2+R3)$ obtained by dividing the predetermined voltage V1 by the resistors R2 and R3. As a result, when the output voltage Vo is higher than the predetermined voltage V1, the N-type transistor Q2 is switched on and has an extremely small resistance. That means that the transistor Q2 is virtually short-circuited (or in a low-resistance state). On the other hand, when the output voltage Vo becomes lower than the predetermined voltage V1, the resistance of the N-type transistor Q2 becomes high. Thus, the N-type transistor Q2 functions as a variable-resistance means, i.e. means for varying its resistance in response to a control signal.

Figure 7:
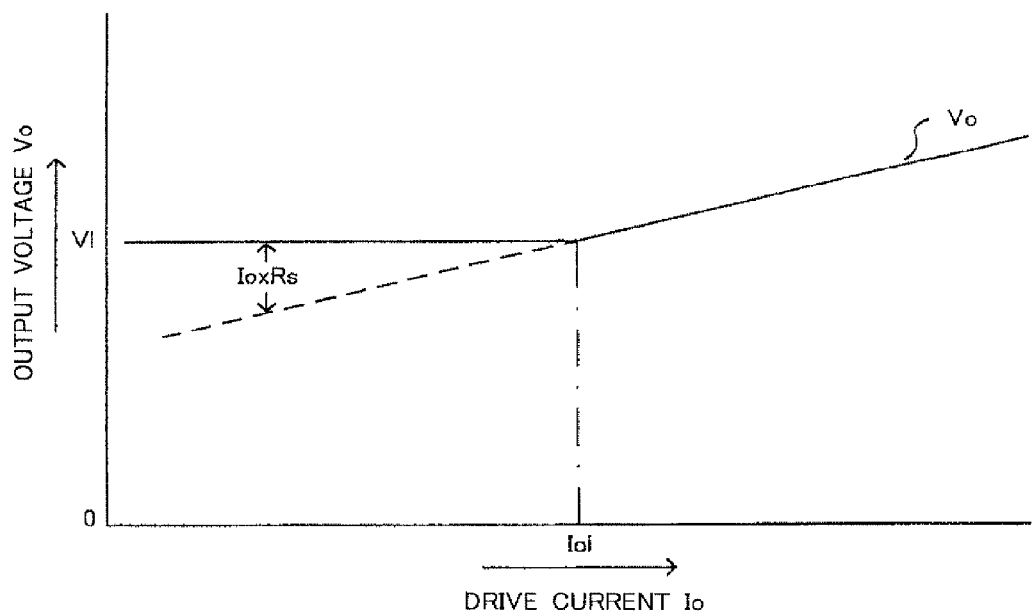
FIG. 7 is a graph showing the drive current-output voltage characteristic of a third dc-dc-conversion type power supply circuit of FIG. 6.

Operation of the load driving device thus configured will now be described with additional reference to FIG. 7 showing the Io-Vo characteristic of the device, where Io and Vo stand for the drive current and output voltage, respectively. In this load driving device, the output voltage Vo is maintained at the predetermined voltage V1 when the drive current Io is less than a predetermined magnitude Io1, as shown in FIG. 7. On the other hand, when the drive current Io exceeds the predetermined magnitude Io1, the output voltage Vo increases in accord with the increase in the drive current Io.

In operation, the first reference voltage Vref1 (=Io×R1) is set up in accord with the magnitude of the drive current Io to be supplied to the LEDs of the first load 10. Suppose now that the drive current Io is set larger than the predetermined magnitude Io1.

Then controlled on-off switching operation of the switch Q1 is started in the switching power supply circuit 100 such that the first detection voltage Vdet1 becomes equal to the first reference voltage Vref1. The switching operation causes the output voltage Vo to rise gradually.

While the output voltage Vo is less than the predetermined voltage V1, the second detection voltage Vdet2 is smaller than the second reference voltage Vref2. As a consequence, the N-type transistor Q2 will not be turned on, thereby sustaining a high resistance. Hence, the drive current Io is insufficient to the load, and the first detection voltage Vdet1 is lower than the first reference voltage Vref1, causing the output voltage Vo to rise gradually.

The rise of the output voltage Vo eventually equalizes the first detection voltage Vdet1 to the first reference voltage Vref1. Under this condition, the intended drive current Io flows through the LEDs LED1-LED3 of the first load 10, thereby activating the LEDs to emit light with a predetermined luminance.

Under this condition, if the luminance characteristic of the LEDs LED1-LED3 fluctuates from one LED to another, the output voltage Vo deviates from a predetermined value due to the fluctuations, but luminance of the LEDs LED1-LED3 will be little affected. As a consequence, the output voltage Vo becomes equal to the first detection voltage Vdet1 (which equals the first reference voltage Vref1) plus the voltage drop Vled (=3×Vf) across the LEDs LED1-LED3 driven by the drive current Io.

The output voltage Vo is then larger than the predetermined voltage V1. Hence the second detection voltage Vdet2 derived from the output voltage Vo through voltage division is larger than the second reference voltage Vref2. Under this condition, the N-type transistor Q2 is in ON state under the control of the control signal received from the error amplifier EA. The resistance of the N-type transistor Q2 under this condition is extremely small and it can be said that the transistor Q2 is virtually short-circuited.

To make the luminance of the LEDs LED1-LED3 larger, the first reference voltage Vref1 may be raised, which in turn increases the drive current Io. With the drive current Io increased, luminance of the LEDs LED1-LED3 will be enhanced more. The voltage drop Vled across the LEDs LED1-LED3 also becomes larger, in accordance with the characteristic shown in FIG. 2. The slope of the output voltage Vo shown in FIG. 7 is determined by the If-Vf characteristic of FIG. 2.

Since the voltage drop Vled across the LEDs LED1-LED3 increases in accord with the increase in the drive current Io, the output voltage Vo increases in accord with Io as shown in FIG. 7.

Conversely, in order to decrease the luminance of the LEDs LED1-LED3, the first reference voltage Vref1 may be lowered to reduce the drive current Io. As the drive current Io is reduced, the luminance of the LEDs LED1-LED3 decreases accordingly. Then the voltage drop Vled across the LEDs LED1-LED3 also decreases in accord with the If-Vf characteristic shown in FIG. 2.

If the drive current Io is set to a smaller magnitude than the predetermined current magnitude Io1, the voltage drop Vled across the LEDs LED1-LED3 will be smaller accordingly. The output voltage Vo then tends to decrease below the predetermined voltage V1.

However, the second detection voltage Vdet2 then becomes equal to or lower than the second reference voltage Vref2. As a result, the resistance Rs of the N-type transistor Q2 increases in response to the control signal received from the error amplifier EA.

With the increase in the resistance Rs of the N-type transistor Q2, drive current Io decreases and so does the first detection voltage Vdet1. The power supply circuit 100 operates such that the first detection voltage Vdet1 becomes equal to the first reference voltage Vref1. Then, the output voltage Vo rises by a magnitude equal to the voltage drop Io×Rs across the N-type transistor Q2, which is the product of the drive current Io and the resistance Rs of the N-type transistor Q2.

As a result, when the drive current Io is set to a smaller magnitude than predetermined magnitude Io1, the N-type transistor Q2 functions as a variable-resistance means for maintaining the output voltage Vo at the predetermined voltage V1.

Although a voltage drop Io×Rs is induced by the N-type transistor Q2, the second load 20 is provided with the output voltage Vo larger than the predetermined voltage V1.

Fourth Embodiment

Figure 8:
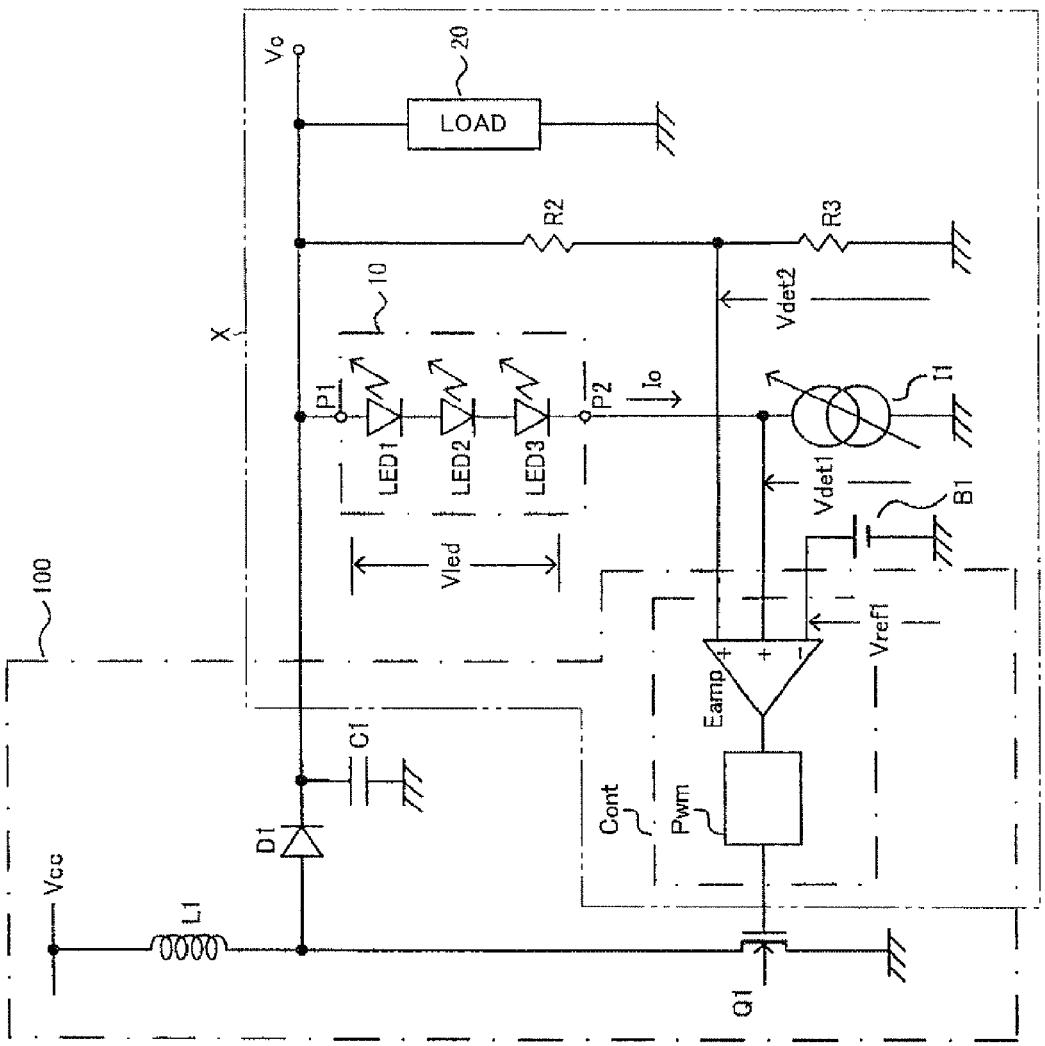
FIG. 8 is a schematic circuit diagram of a load driving device in accordance with a fourth embodiment of the invention.

FIG. 8 shows a circuit structure of a load driving device in accordance with a fourth embodiment of the invention. As seen in FIG. 8, this embodiment lacks the N-type transistor Q2 serving as a variable-resistance means, error amplifier EA for controlling the N-type transistor Q2, and reference voltage source B2 of FIG. 6. However, the embodiment has a three-input type error amplifier Eamp substituting for the two-input type error amplifier of FIG. 6.

A first non-inverting input terminal (+) of the error amplifier Eamp is fed with the first detection voltage Vdet1, and a second non-inverting input terminal (+) is fed with the second detection voltage Vdet2. The inverting input terminal (−) of the error amplifier Eamp is fed with the first reference voltage Vref1.

This error amplifier Eamp automatically selects the lowest one of the first and second detection voltages Vdet1 and Vdet2, respectively, inputted to the first and second non-inverting input terminals (+), respectively, and compares the selected one with the first reference voltage Vref1.

As shown in FIG. 8, the resistor R1 of FIG. 6 serving as a drive current detection means is replaced by an adjustable-current type constant-current circuit I1. This constant-current source I1 is the same as one shown in FIG. 3. In this arrangement too, the output voltage Vo of the power supply circuit is controlled so as to equalize the first reference voltage Vdet1 (representing the voltage drop across the constant-current source I1) to the first reference voltage Vref. Therefore, the reference voltage Vref1 is set to a level slightly larger than the saturation voltage (about 0.3 V) of the transistor used in the constant-current source I1.

On the other hand, the voltage division ratio of the resistors R2 and R3 is set such that the second detection voltage Vdet2 balances the first reference voltage Vref1 when the output voltage Vo has the predetermined voltage V1, i.e., V1×R3/(R2+R3)=Vref1.

The rest of the circuit structure of FIG. 8 is the same as that of the third embodiment shown in FIG. 6.

In the embodiment shown in FIG. 8, the lower one of the first detection voltage Vdet1 representing the voltage drop across the constant-current source I1 and the second detection voltage Vdet2 obtained by voltage division of the output voltage Vo is automatically chosen in the controlled switching operation performed by the power supply circuit 100.

The load driving device shown in FIG. 8 also provides the same output characteristic as the third embodiment shown in FIG. 6. This can be seen as follows. Referring to FIG. 7, there is shown Io-Vo characteristic of the load driving device, in which the output voltage Vo is maintained at the predetermined voltage V1 when the drive current Io is less than the predetermined magnitude Io1, but the output voltage Vo increases with the drive current Io if the drive current Io exceeds the predetermined magnitude Io1.

Incidentally, the resistor R1 serving as the current detection means in the arrangement of FIG. 6 may be replaced by the constant-current source I1 of FIG. 5. In this case, the constant-current source I1 is adapted to adjust the magnitude of the constant-current. The first reference voltage Vref1 may be fixed.

Fifth Embodiment

Figure 9:
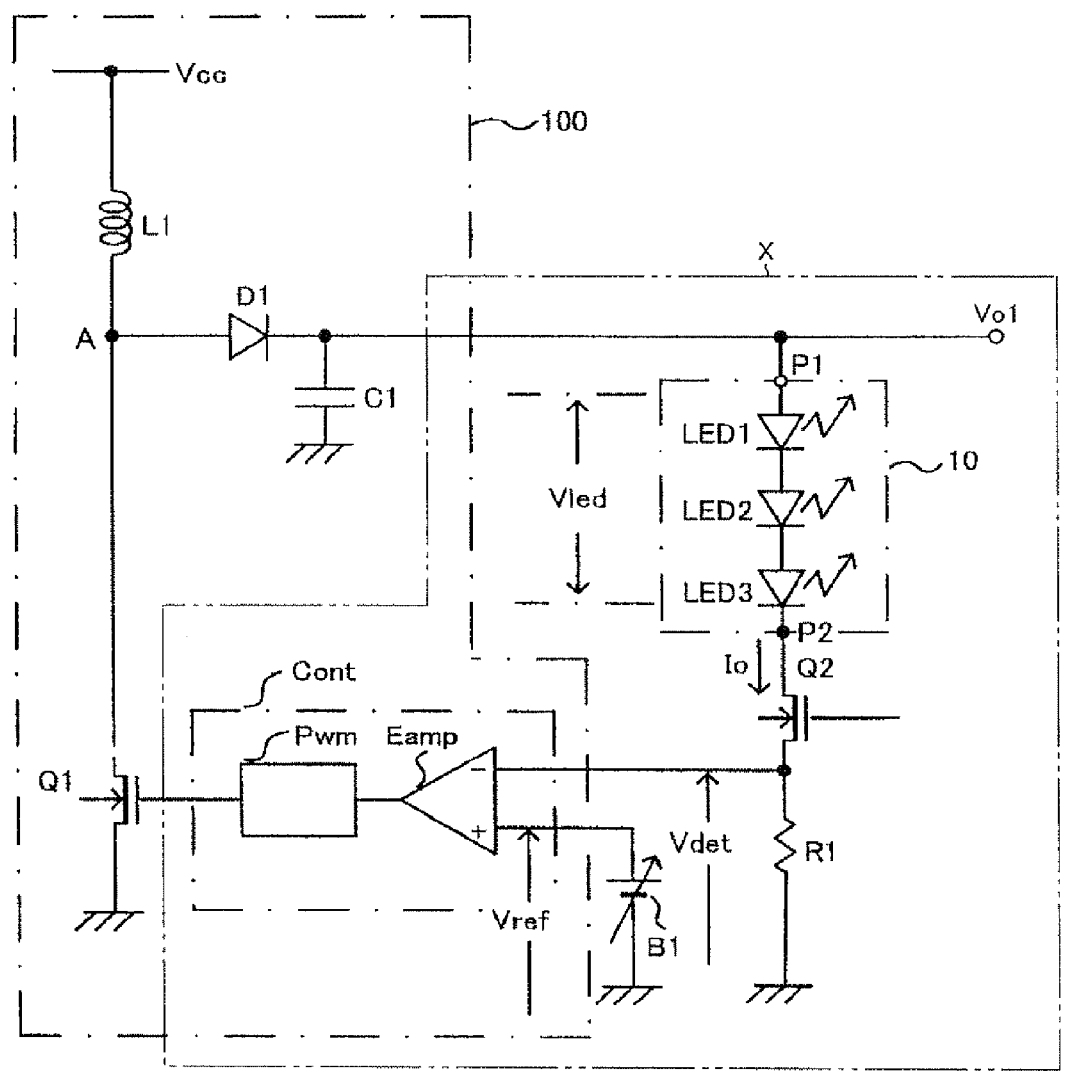
FIG. 9 is a schematic circuit diagram of a load driving device in accordance with a fifth embodiment of the invention.

FIG. 9 is a view showing a configuration of a load driving device in accordance with a fifth embodiment of the present invention. Basically, the load driving device of the fifth embodiment has a similar configuration to the load driving device of the first embodiment (see FIG. 1), and is characterized in that a resistance R1 for current detection is provided at a position of a constant-current source I1 and a detection voltage Vdet is derived from one end of the resistance R1, that it is such configured to allow a reference voltage Vref to be arbitrarily adjustable by a reference voltage source B1, that input polarity of an error amplifier Eamp is inverted from input polarity of the error amplifier of the first embodiment, and that a transistor Q2 for a shutdown in case of abnormality is provided between an external load 10 and the resistance R1. However, the input polarity of the error amplifier Eamp may correspond with the input polarity of the error amplifier Eamp of the first embodiment.

The load driving device of the fifth embodiment can achieve similar effect to the load driving device of the first embodiment, without using the constant-current source I1. In addition, since a current value of a drive current Io flowing through the resistance R1 is finally maintained at a fixed value corresponding to the reference voltage Vref by output feedback control of a control circuit Cont, the resistance R1 can be recognized as the constant-current source I1 in that sense.

In addition, the load driving device of the fifth embodiment can forcibly shut down operation of the load driving device by turning off the transistor Q2 in response to an abnormality protection signal (not shown in FIG. 9) and blocking a current pathway to the external load 10.

In addition, in the load driving device in accordance with the fifth embodiment, the reference voltage Vref is inputted to a noninverting input terminal (+) of the error amplifier Eamp, and the detection voltage Vdet is inputted to an inverting input terminal (−) of the error amplifier Eamp. In this case, the lower the detection voltage Vdet becomes compared to the reference voltage Vref, the higher the output voltage level of the error amplifier Eamp becomes, and as the detection voltage Vdet is closer to the reference voltage Vref, the output voltage level of the error amplifier Eamp becomes lower.

Thus, a pulse-width modulation control circuit Pwm increases on duty of a transistor Q1 when an output voltage of the error amplifier Eamp is at a higher level. On the other hand, the circuit may generate a gate signal of the transistor Q1 so as to decrease on duty of the transistor Q1 when the output voltage of the error amplifier Eamp is at a lower level.

Sixth Embodiment

Figure 10:
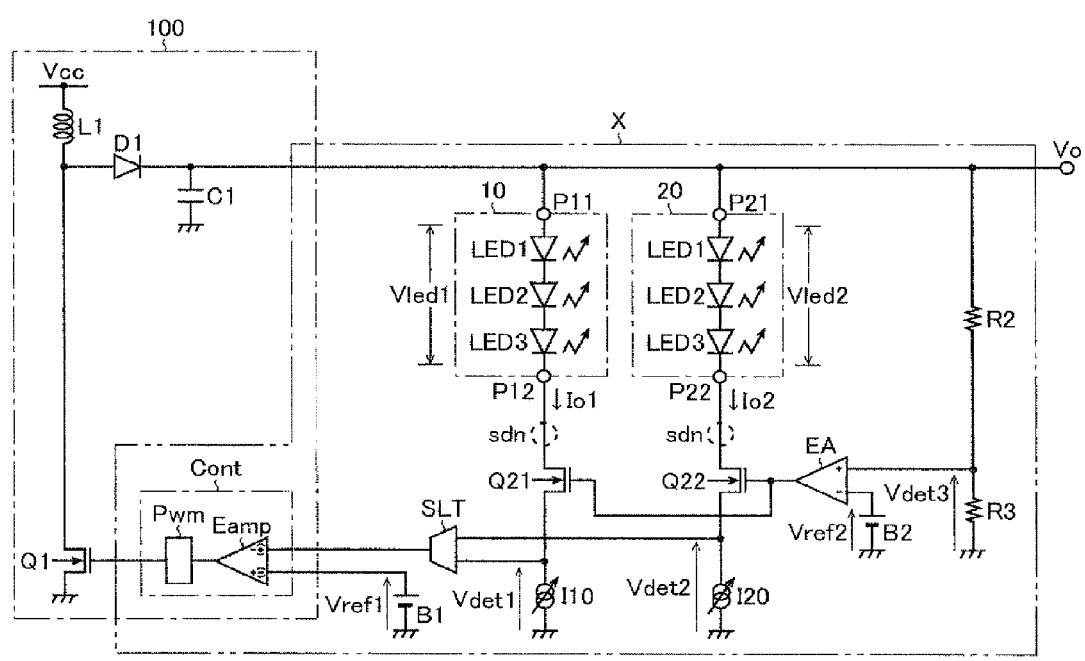
FIG. 10 is a schematic circuit diagram of a load driving device in accordance with a sixth embodiment of the present invention.

FIG. 10 is a view showing a configuration of a load driving device in accordance with a sixth embodiment of the invention. The load driving device of the sixth embodiment is characterized in that external loads 10 and 20 of multiple systems are connected, that detection voltages Vdet1 and Vdet2 are derived from each one end of constant-current sources I10 and I20, that a selector SLT for selecting any one of the detection voltages Vdet1 and Vdet2 (one at a lower voltage level) and outputting it to an error amplifier Eamp is provided, that the error amplifier Eamp has input terminals of two systems (a noninverting input terminal (+) and an inverting input terminal (−)), and that output feedback circuits (an error amplifier EA, a reference voltage source B2, and resistances R2 and R3) for controlling continuity level of transistors Q21 and Q22 placed respectively between the external loads 10 and 20 and the constant-current sources I10 and I20, depending on an output voltage Vo, are provided.

In the embodiment, a description of input polarity of the error amplifier Eamp was given by taking an example of a configuration in which the reference voltage Vref1 is inputted into the noninverting terminal (+) and any one of the detection voltages Vdet1 and Vdet2 is inputted into the inverting input terminal (−). However, a configuration of the present invention is not limited to this, and may be such that contrary to the above, a reference voltage Vref1 is inputted to the inverting input terminal (−) and any one of the detection voltages Vdet1 and Vdet2 is inputted into the noninverting terminal (+). The input polarity of the error amplifier Eamp can be arbitrarily selected in any embodiment to be described in the following, although this is not stated redundantly hereinafter. Hence, in order to clearly specify that such a modification can be made, as the input polarity of the error amplifier Eamp, first input polarity (refer to a sign not parenthesized) and second input polarity (refer to a parenthesized sign) are included in FIG. 10 to FIG. 63.

Figure 63:
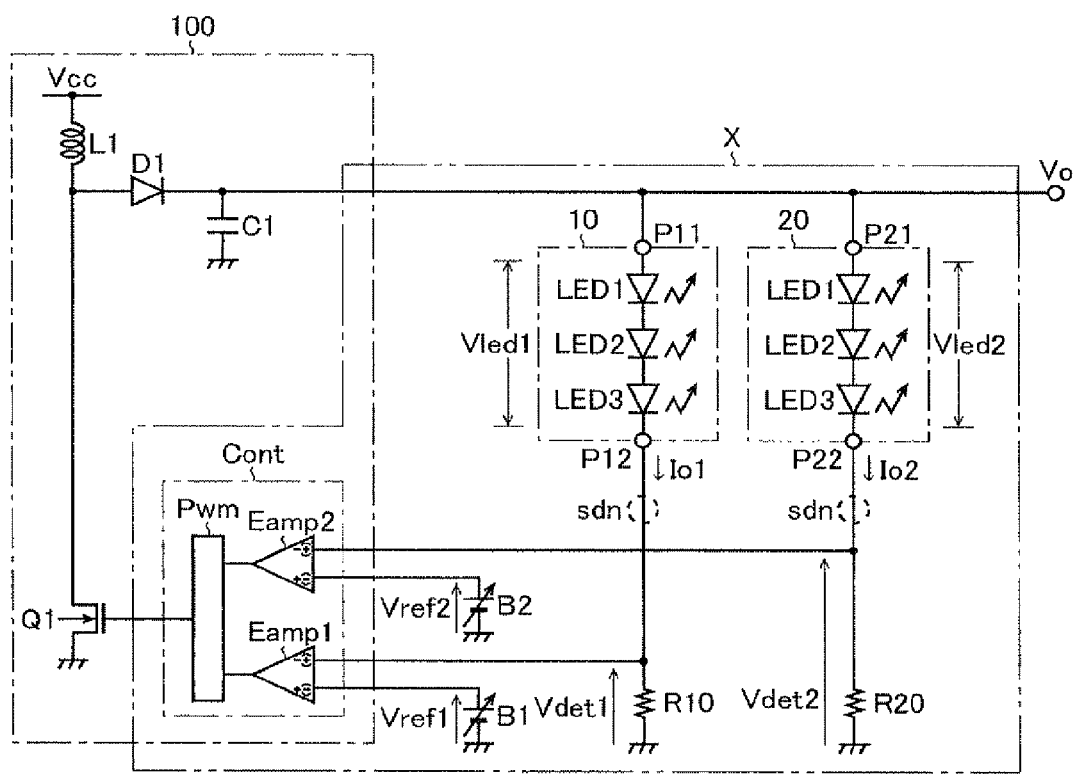
FIG. 63 is a schematic circuit diagram of a load driving device in accordance with a fifty-ninth embodiment of the present invention.

In addition, the abnormality protection transistor shown in FIG. 9 above may be inserted between the external loads 10 and constant-current source I10, and also inserted between the external loads 20 and the constant-current source I20. The above abnormality protection transistor may also be inserted arbitrarily in any embodiment to be described in the following, although this is not stated redundantly hereinafter. Hence, in order to clearly specify that such a modification can be made, a position sdn (dash line circle) into which the abnormality protection transistor can be inserted is indicated in FIG. 10 to FIG. 63.

Seventh Embodiment

Figure 11:
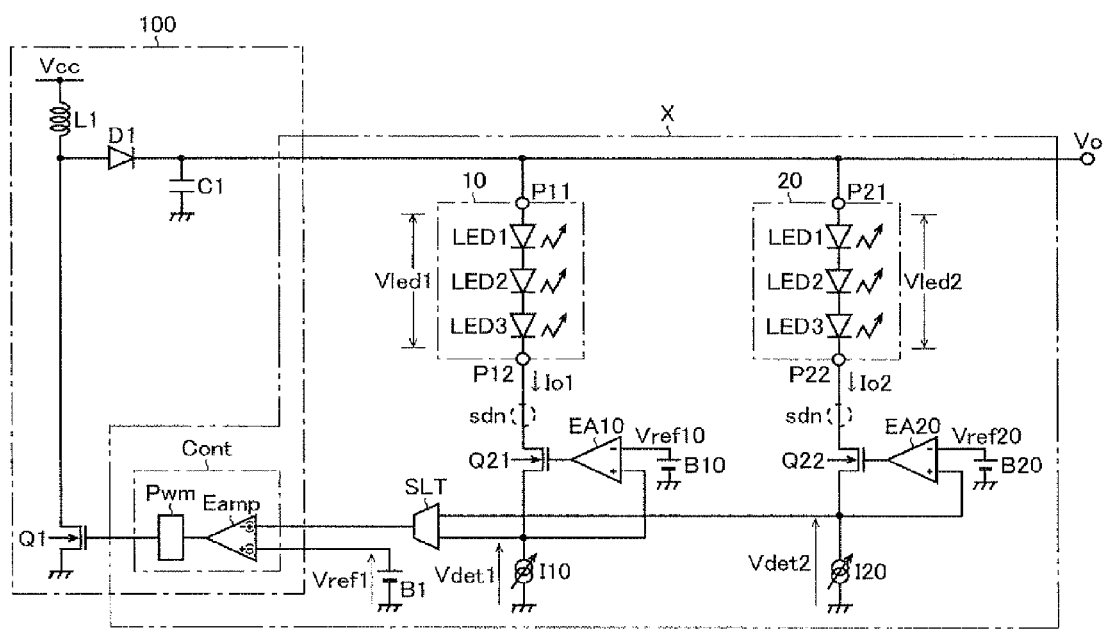
FIG. 11 is a schematic circuit diagram of a load driving device in accordance with a seventh embodiment of the present invention.

FIG. 11 is a view showing a configuration of a load driving device in accordance with a seventh embodiment of the present invention. The load driving device of the seventh embodiment is characterized in that external loads 10 and 20 of multiple systems are connected, that detection voltages Vdet1 and Vdet2 are derived from each one end of constant-current sources I10 and I20, that a selector SLT for selecting any one of the detection voltages Vdet1 and Vdet2 (one at a lower voltage level) and outputting it to an error amplifier Eamp is provided, that the error amplifier Eamp has input terminals of two systems (a noninverting input terminal (+) and, an inverting input terminal (−)), and that output feedback circuits (error amplifiers EA10 and EA20, and reference voltage sources B10 and B20) for controlling continuity level of transistors Q21 and Q22 placed respectively between the external loads 10 and 20 and the constant-current sources I10 and I20, depending on drive currents Io1 and Io2 (more specifically, the detection voltages Vdet1 and Vdet2), are provided.

Eighth Embodiment

Figure 12:
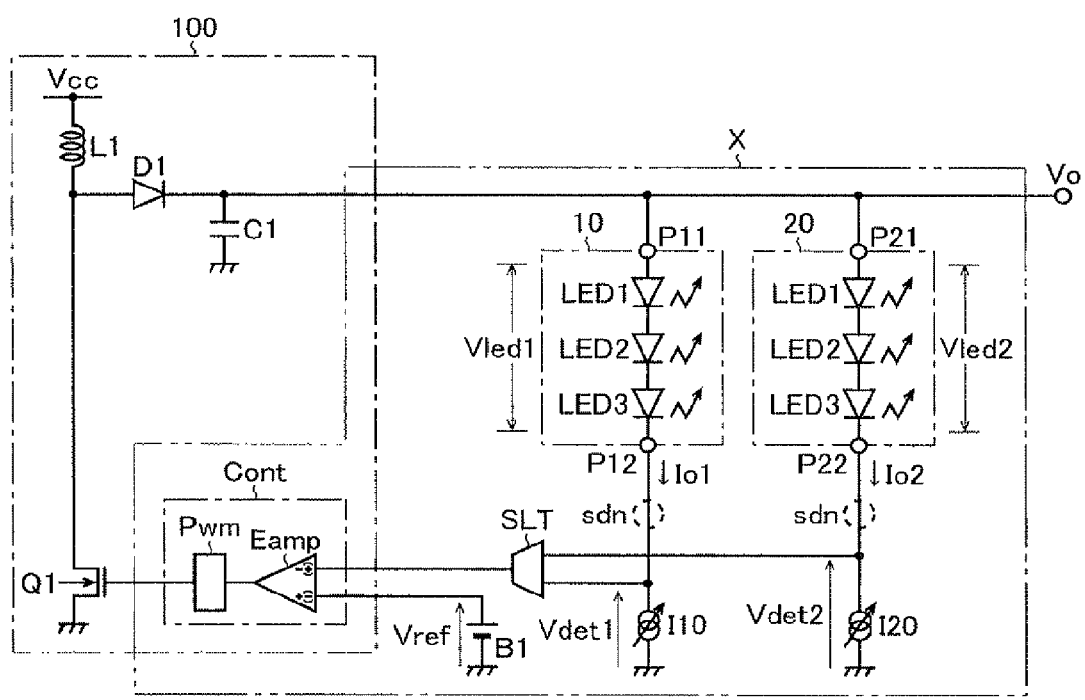
FIG. 12 is a schematic circuit diagram of a load driving device in accordance with an eighth embodiment of the present invention.

FIG. 12 is a view showing a configuration of a load driving device in accordance with an eighth embodiment of the present invention. The load driving device of the eighth embodiment is characterized in that external loads 10 and 20 of multiple systems are connected, that detection voltages Vdet1 and Vdet2 are derived from each one end of constant-current sources I10 and I20, that a selector SLT for selecting any one of the detection voltages Vdet1 and Vdet2 (one at a lower voltage level) and outputting it to an error amplifier Eamp is provided, and that the error amplifier Eamp has input terminals of two systems (a noninverting input terminal (+) and an inverting input terminal (−)).

Ninth Embodiment

Figure 13:
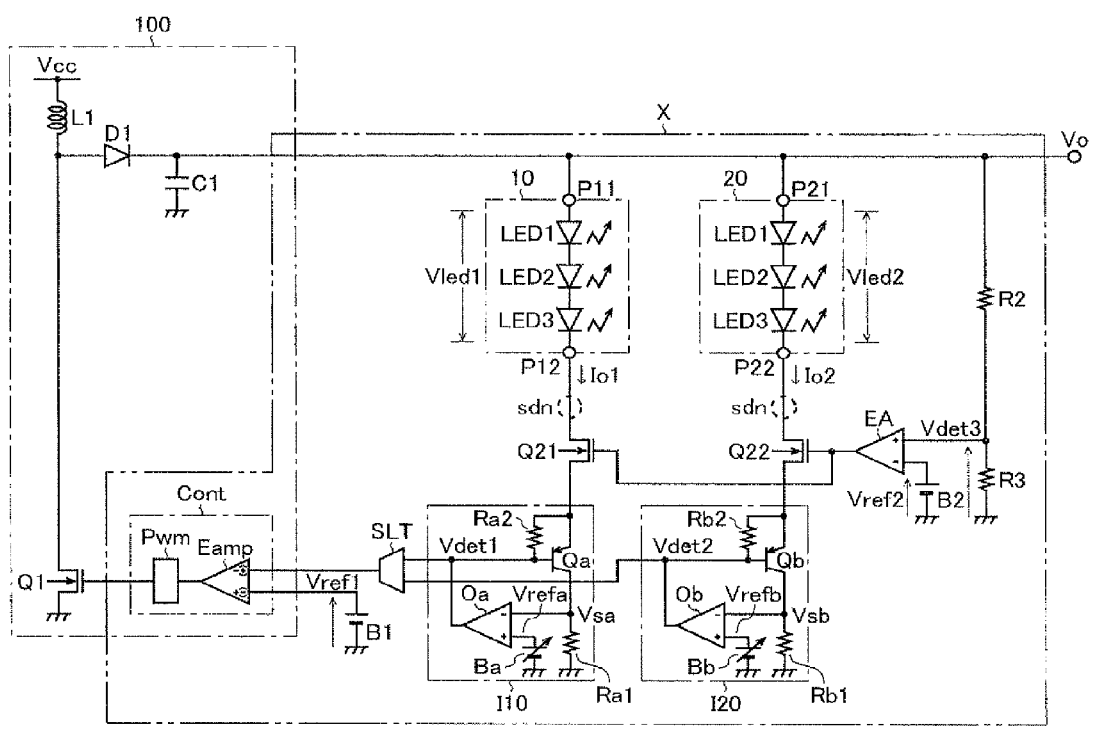
FIG. 13 is a schematic circuit diagram of a load driving device in accordance with a ninth embodiment of the present invention.

FIG. 13 is a view showing a configuration of a load driving device in accordance with a ninth embodiment of the present invention. The load driving device of the ninth embodiment is characterized in that external loads 10 and 20 of multiple systems are connected, that as constant-current sources I10 and I20 whose internal configuration different from FIG. 3 is adopted and positions from which detection voltages Vdet1 and Vdet2 are derived have been changed, that a selector SLT for selecting any one of the detection voltages Vdet1 and Vdet2 (one at a lower voltage level) and outputting it to an error amplifier Eamp is provided, that the error amplifier Eamp has input terminals of two systems (a noninverting input terminal (+) and an inverting input terminal (−)), and that output feedback circuits (an error amplifier EA, a reference voltage source B2, and resistances R2 and R3) for controlling continuity level of transistors Q21 and Q22 placed respectively between the external loads 10 and 20 and the constant-current sources I10 and I20, depending on an output voltage Vo, are provided.

In the load driving device of the ninth embodiment, the first constant-current source I10 has a pnp type bipolar transistor Qa, resistances Ra1 and Ra2, an operational amplifier Oa, and reference voltage source Ba.

An emitter of the transistor QA is connected to a terminal P12 (a cathode of a light-emitting diode column, which forms an external load 10). A collector of the transistor Qa is connected to a ground end by way of a resistance Ra1. A base of the transistor Qa is connected to a first inverting input terminal (−) of the error amplifier Eamp. A resistance Ra2 is connected between the base and the emitter of the transistor Qa.

The inverting input terminal (−) of the operational amplifier Oa is connected to one end (derived end of a first sense voltage Vsa) of the resistance Ra1. The noninverting input terminal (+) of the operational amplifier Oa is connected to a positive electrode end (an end to which a first reference voltage Vrefa is applied) of a first reference voltage source Ba. A negative electrode end of the first reference voltage source Ba is connected to the ground. An output end of the operational amplifier Oa is connected to the base of the transistor Qa.

In addition, the second constant-current supply I20 has a pnp type bipolar transistor Qb, resistances Rb1 and Rb2, an operational amplifier Ob, and a reference voltage source Bb.

An emitter of the transistor Qb is connected to a terminal P22 (cathode of a light-emitting diode column, which forms an external load 20). A collector of the transistor Qb is connected to a ground by way of the resistance Rb1. A base of the transistor Qb is connected to a second inverting input terminal (−) of the error amplifier Eamp. The resistance Rb2 is connected between the base and the emitter of the transistor Qb.

The inverting input terminal (−) of the operational amplifier Ob is connected to one end of a resistance Rb1 (derived end of a second sense voltage Vsb). The noninverting input terminal (+) of the operational amplifier Ob is connected to a positive electrode end (an end to which a second reference voltage Vrefb is applied) of a second reference voltage source Bb. A negative electrode end of the second reference voltage source Bb is connected to the ground. The output terminal of the operational amplifier Ob is connected to the base of the transistor Qb.

In addition, the transistors Qa and Qb may be replaced with a P-channel type MOS field-effect transistor, respectively. In that case, connections may be made such that the emitter is replaced with a source, the collector is replaced with a drain, and the base is replaced with a gate.

In the first constant-current supply I10 of the above configuration, a base voltage of the transistor Qa, that is to say, the first detection voltage Vdet1 is controlled to generate a predetermined first drive current Io1, so that a first sense voltage Vsa corresponds with a first reference voltage Vrefa. In addition, if it is desired to adjust the first drive current Io1, the first reference voltage Vrefa may be variably controlled arbitrarily.

Similarly, in the second constant-current supply I20 of the above configuration, a base voltage of the transistor Qb, that is to say, the second detection voltage Vdet2 is controlled to generate a predetermined second drive current Io2, so that a second sense voltage Vsb corresponds with a second reference voltage Vrefb. In addition, if it is desired to adjust the second drive current Io2, the second reference voltage Vrefb may be variably controlled arbitrarily.

If the above configuration is adopted, the first detection voltage Vdet1 is not a voltage that appears at a connecting point (i.e., terminal P12) of the external load 10 and the first constant-current source I10 but a voltage from which a lowered voltage in the resistance Rat is subtracted. Similarly, the second detection voltage Vdet2 is not a voltage that appears at a connecting point (i.e., terminal P22) of the external load 20 and the second constant-current source I20, but a voltage from which lowered voltage in the resistance Rb2 is subtracted.

Thus, the load driving device of the ninth embodiment can achieve effect similar to that described above, even in the configuration in which the positions where the first detection voltage Vdet1 and the second detection voltage Vdet2 are derived are changed.

In other words, it is important that the load driving device disclosed in the specification has, as its components, a power supply circuit for supplying an output voltage, which is converted from an input voltage, to load, a detection voltage generation circuit for generating a detection voltage which varies depending on a magnitude of lowered voltage across the load, and a control circuit for controlling the power supply circuit so that output feedback control of the output voltage is performed based on the detection voltage, and various changes may be made to a method for generating the detection voltage or a position where it is derived. It can be said that such a modification is included in the technological scope of any load driving devices disclosed in the specification.

Tenth Embodiment

Figure 14:
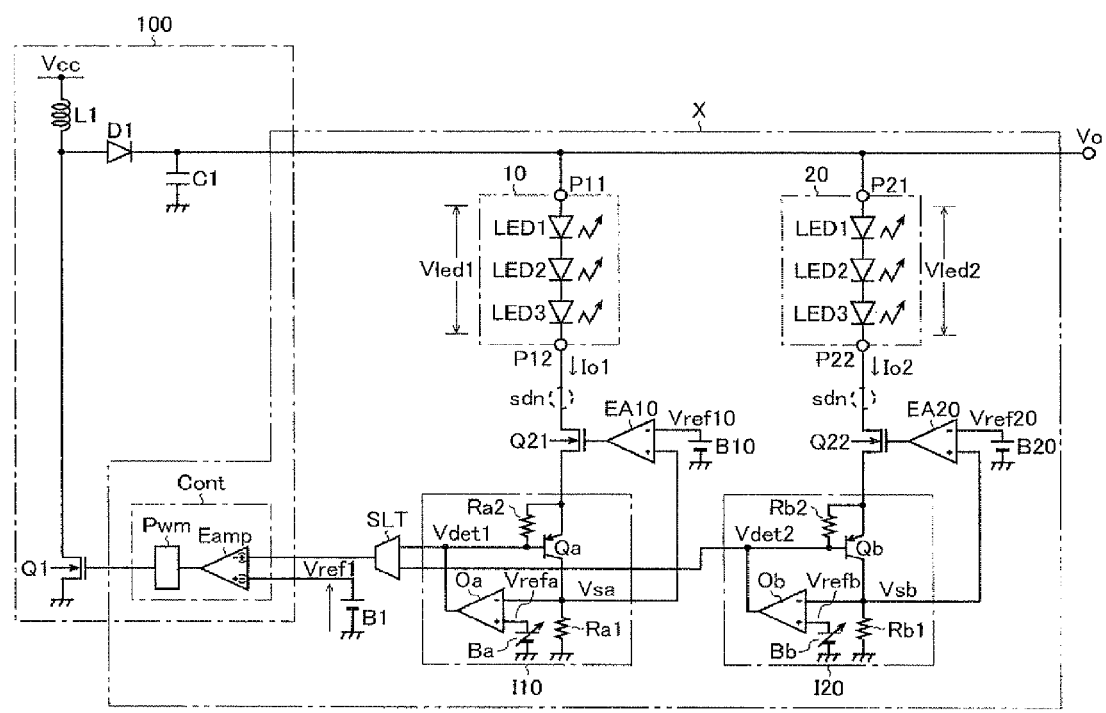
FIG. 14 is a schematic circuit diagram of a load driving device in accordance with a tenth embodiment of the present invention.

FIG. 14 is a view showing a configuration of a load driving device in accordance with a tenth embodiment of the present invention. The load driving device of the tenth embodiment is characterized in that external loads 10 and 20 of multiple systems are connected, that as constant-current sources I10 and I20, an internal configuration different from FIG. 3 (a configuration similar to the ninth embodiment) is adopted and positions from which detection voltages Vdet1 and Vdet2 are derived have been changed, that a selector SLT for selecting any one of the detection voltages Vdet1 and Vdet2 (one at a lower voltage level) and outputting it to an error amplifier Eamp is provided, that the error amplifier Eamp has input terminals of two systems (a noninverting input terminal (+) and an inverting input terminal (−)), and that output feedback circuits (error amplifiers EA10 and EA20, and reference voltage sources B10 and B20) for controlling continuity level of transistors Q21 and Q22 placed respectively between the external loads 10 and 20 and the constant-current sources I10 and I20, depending on drive currents Io1 and Io2 (more specifically, sense voltages Vsa and Vsb), are provided.

Eleventh Embodiment

Figure 15:
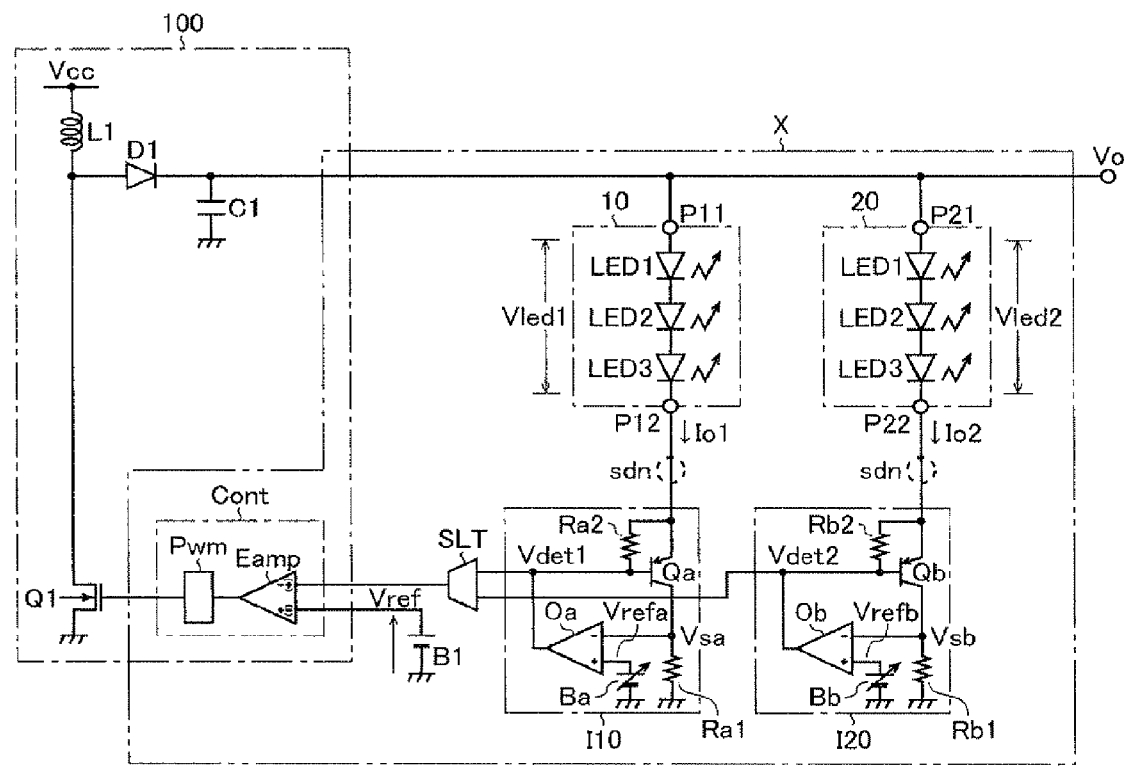
FIG. 15 is a schematic circuit diagram of a load driving device in accordance with an eleventh embodiment of the present invention.

FIG. 15 is a view showing a configuration of a load driving device in accordance with an eleventh embodiment of the present invention. The load driving device of the eleventh embodiment is characterized in that external loads 10 and 20 of multiple systems are connected, that as constant-current sources I10 and I20, an internal configuration different from FIG. 3 (a configuration similar to the ninth embodiment) is adopted and positions from which detection voltages Vdet1 and Vdet2 are derived have been changed, that a selector SLT for selecting any one of the detection voltages Vdet1 and Vdet2 (one at a lower voltage level) and outputting it to an error amplifier Eamp is provided, and that the error amplifier Eamp has input terminals of two systems (a noninverting input terminal (+) and an inverting input terminal (−)).

Twelfth Embodiment

Figure 16:
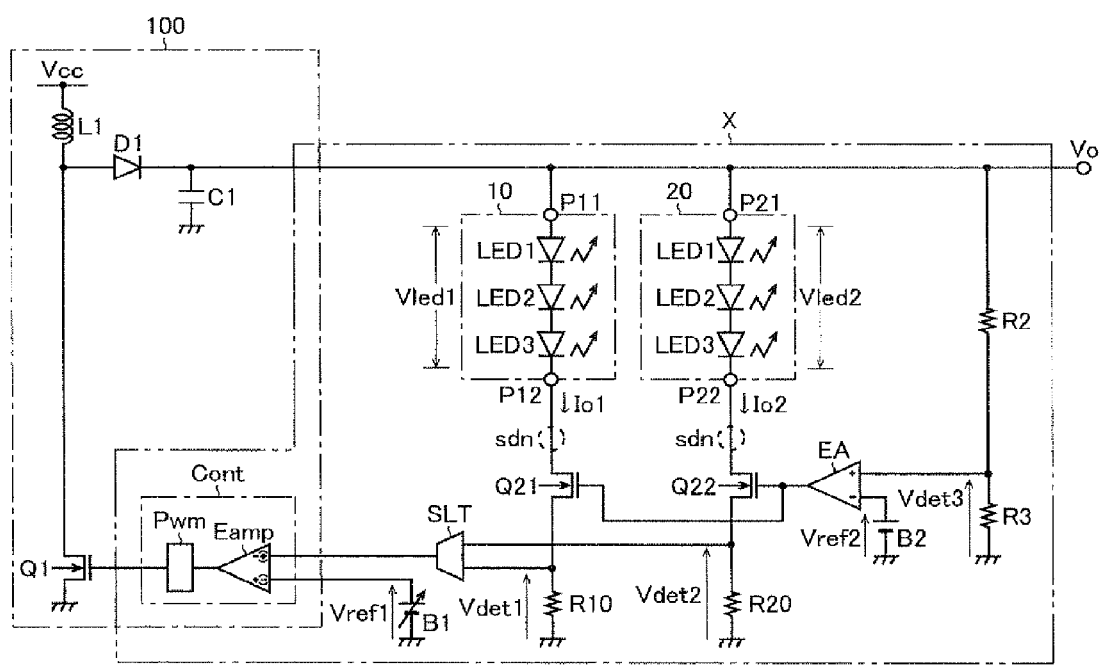
FIG. 16 is a schematic circuit diagram of a load driving device in accordance with a twelfth embodiment of the present invention.

FIG. 16 is a view showing a configuration of a load driving device in accordance with a twelfth embodiment of the present invention. The load driving device of the twelfth embodiment is characterized in that external loads 10 and 20 of multiple systems are connected, that resistances R10 and R20 for current detection are provided at positions of constant-current sources I10 and I20 and detection voltages Vdet1 and Vdet2 are derived from one end of each, that a selector SLT for selecting any one of the detection voltages Vdet1 and Vdet2 (one at a lower voltage level) and outputting it to an error amplifier Eamp is provided, that the error amplifier Eamp has input terminals of two systems (a noninverting input terminal (+) and an inverting input terminal (−)), and that output feedback circuits (an error amplifier EA, a reference voltage source B2, and resistances R2 and R3) for controlling continuity level of transistors Q21 and Q22 placed respectively between the external loads 10 and 20 and the resistances R10 and R20, depending on an output voltage Vo, are provided.

Thirteenth Embodiment

Figure 17:
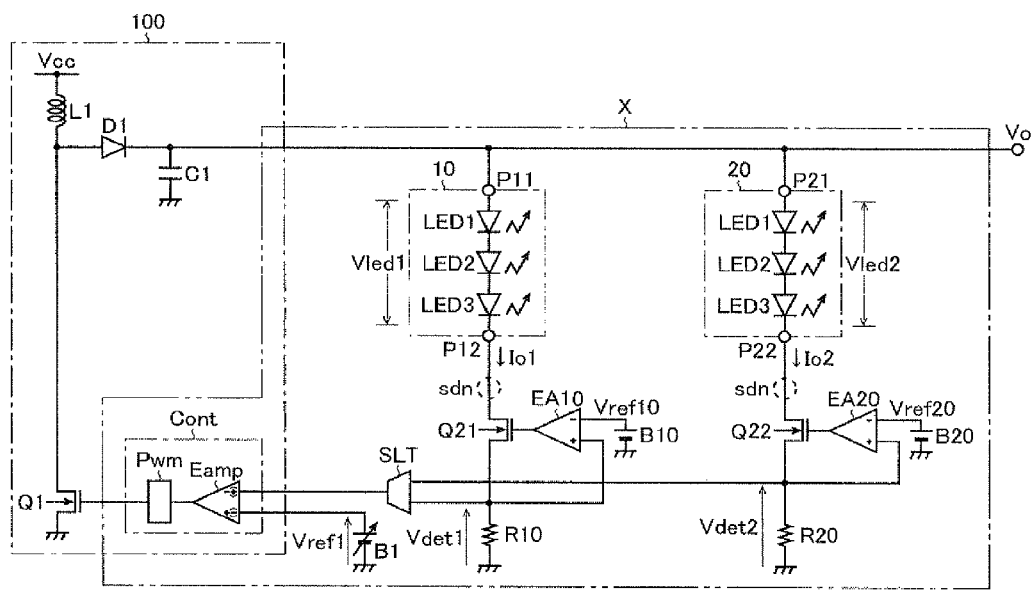
FIG. 17 is a schematic circuit diagram of a load driving device in accordance with a thirteenth embodiment of the present invention.

FIG. 17 is a view showing a configuration of a load driving device in accordance with a thirteenth embodiment of the present invention. The load driving device of the thirteenth embodiment is characterized in that external loads 10 and 20 of multiple systems are connected, that resistances R10 and R20 for current detection are provided at positions of constant-current sources I10 and I20 and detection voltages Vdet1 and Vdet2 are derived from one end of each, that a selector SLT for selecting any one of the detection voltages Vdet1 and Vdet2 (one at a lower voltage level) and outputting it to an error amplifier Eamp is provided, that the error amplifier Eamp has input terminals of two systems (a noninverting input terminal (+) and an inverting input terminal (−)), and that output feedback circuits (error amplifiers EA1 and EA20, and reference voltage sources B1 and B2) for controlling continuity level of transistors Q21 and Q22 placed respectively between the external loads 10 and 20 and the resistances R10 and R20, depending on drive currents Io1 and Io2 (more specifically, the detection voltages Vdet1 and Vdet2), are provided.

Fourteenth Embodiment

Figure 18:
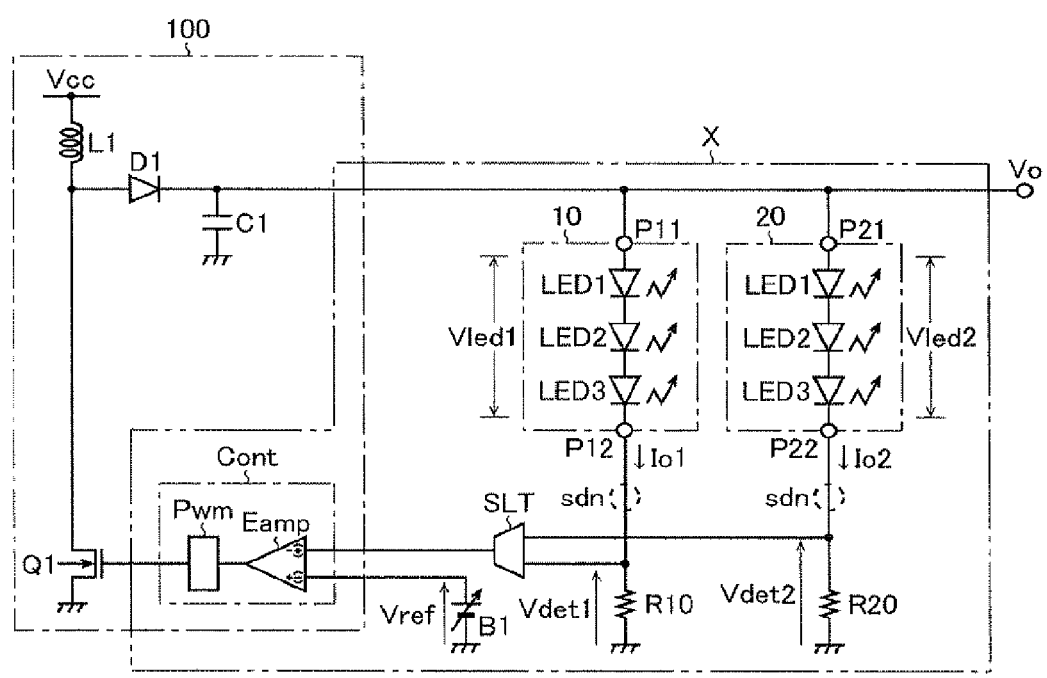
FIG. 18 is a schematic circuit diagram of a load driving device in accordance with a fourteenth embodiment of the present invention.

FIG. 18 is a view showing a configuration of a load driving device in accordance with a fourteenth embodiment of the present invention. The load driving device of the fourteenth embodiment is characterized in that external loads 10 and 20 of multiple systems are connected, that resistances R10 and R20 for current detection are provided at positions of constant-current sources I10 and I20 and detection voltages Vdet1 and Vdet2 are derived from one end of each, that a selector SLT for selecting any one of the detection voltages Vdet1 and Vdet2 (one at a lower voltage level) and outputting it to an error amplifier Eamp is provided, and that the error amplifier Eamp has input terminals of two systems (a noninverting input terminal (+) and an inverting input terminal (−)).

Fifteenth Embodiment

Figure 19:
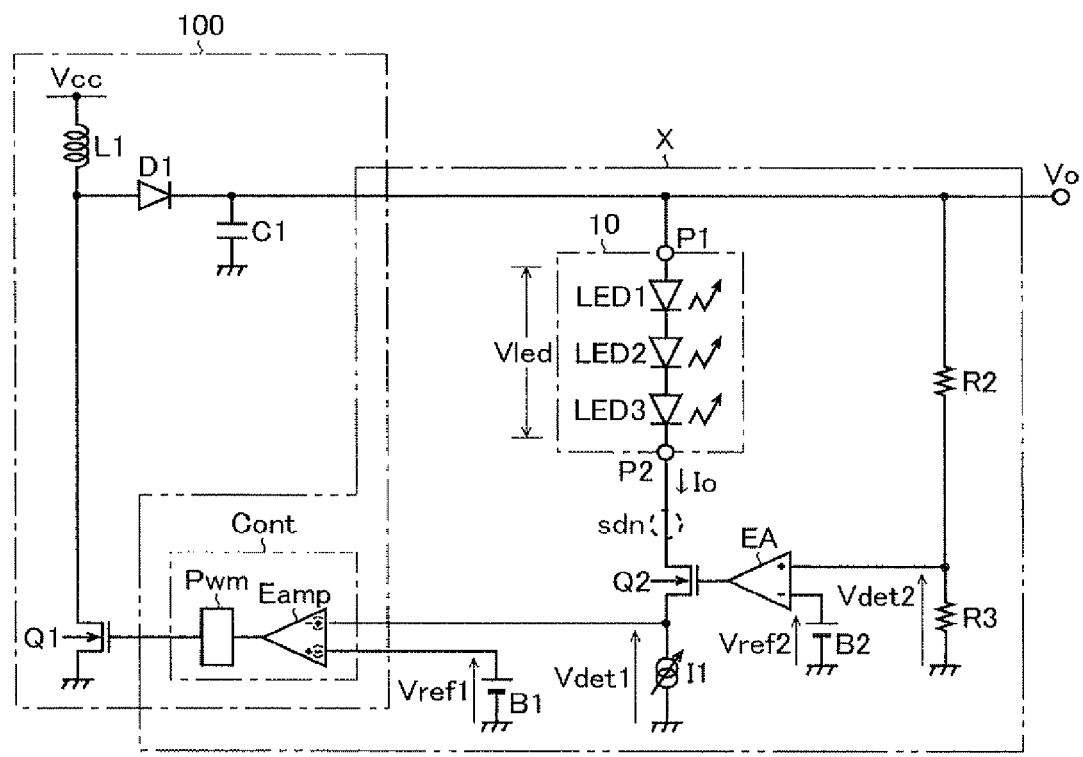
FIG. 19 is a schematic circuit diagram of a load driving device in accordance with a fifteenth embodiment of the present invention.

FIG. 19 is a view showing a configuration of a load driving device in accordance with a fifteenth embodiment of the present invention. The load driving device of the fifteenth embodiment is characterized in that an external load 10 of a single system is connected, that a detection voltage Vdet1 is derived from one end of a constant-current source IL that an error amplifier Eamp has input terminals of two systems (a noninverting input terminal (+) and an inverting input terminal (−)), and that output feedback circuits (an error amplifier EA, a reference voltage source B2, and resistances R2 and R3) for controlling continuity level of a transistor Q2 placed respectively between the external load 10 and the constant-current source I1, depending on an output voltage Vo, are provided.

Sixteenth Embodiment

Figure 20:
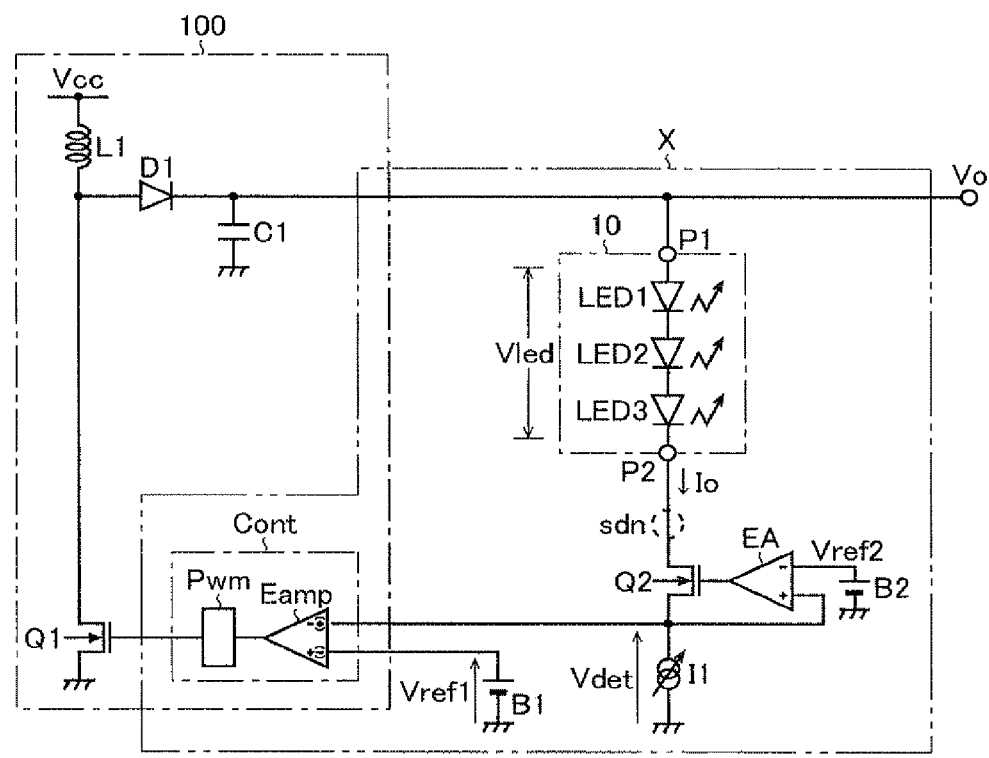
FIG. 20 is a schematic circuit diagram of a load driving device in accordance with a sixteenth embodiment of the present invention.

FIG. 20 is a view showing a configuration of a load driving device in accordance with a sixteenth embodiment of the present invention. The load driving device of the sixteenth embodiment is characterized in that an external load 10 of a single system is connected, that a detection voltage Vdet is derived from one end of a constant-current source I1, that an error amplifier Eamp has input terminals of two systems (a noninverting input terminal (+) and an inverting input terminal (−)), and that output feedback circuits (an error amplifier EA, and a reference voltage source B2) for controlling continuity level of a transistor Q2 placed respectively between the external load 10 and the constant-current source I1, depending on a drive current Io (more specifically, the detection voltage Vdet), are provided.

Seventeenth Embodiment

Figure 21:
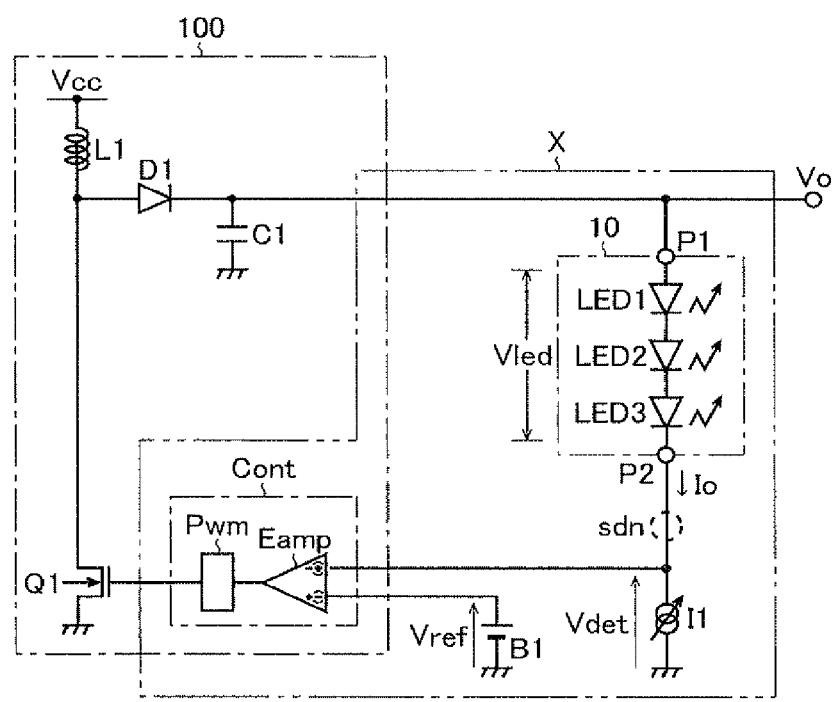
FIG. 21 is a schematic circuit diagram of a load driving device in accordance with a seventeenth embodiment of the present invention.

FIG. 21 is a view showing a configuration of a load driving device in accordance with a seventeenth embodiment of the present invention. The load driving device of the seventeenth embodiment is characterized in that an external load 10 of a single system is connected, that a detection voltage Vdet1 is derived from one end of a constant-current source I1, and that an error amplifier Eamp has input terminals of two systems (a noninverting input terminal (+) and an inverting input terminal (−)).

Eighteenth Embodiment

Figure 22:
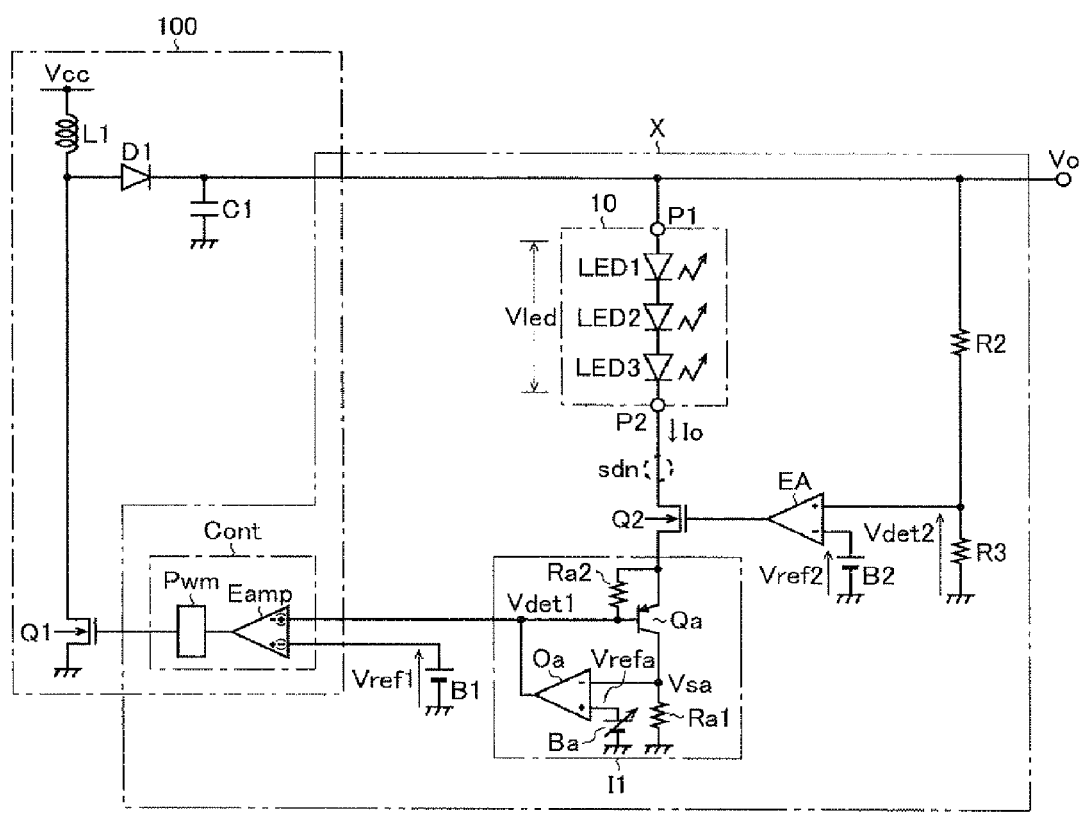
FIG. 22 is a schematic circuit diagram of a load driving device in accordance with an eighteenth embodiment of the present invention.

FIG. 22 is a view showing a configuration of a load driving device in accordance with an eighteenth embodiment of the present invention. The load driving device of the eighteenth embodiment is characterized in that an external load 10 of a single system is connected, that as a constant-current source I1, an internal configuration different from FIG. 3 (a configuration similar to the first constant-current source I10 of the ninth embodiment) is adopted and a position from which a detection voltages Vdet1 is derived has been changed, that an error amplifier Eamp has input terminals of two systems (a noninverting input terminal (+) and an inverting input terminal (−)), and that output feedback circuits (an error amplifier EA, a reference voltage source B2, and resistances R2 and R3) for controlling continuity level of a transistor Q2 placed respectively between the external load 10 and the constant-current source I1, depending on an output voltage Vo, are provided.

Nineteenth Embodiment

Figure 23:
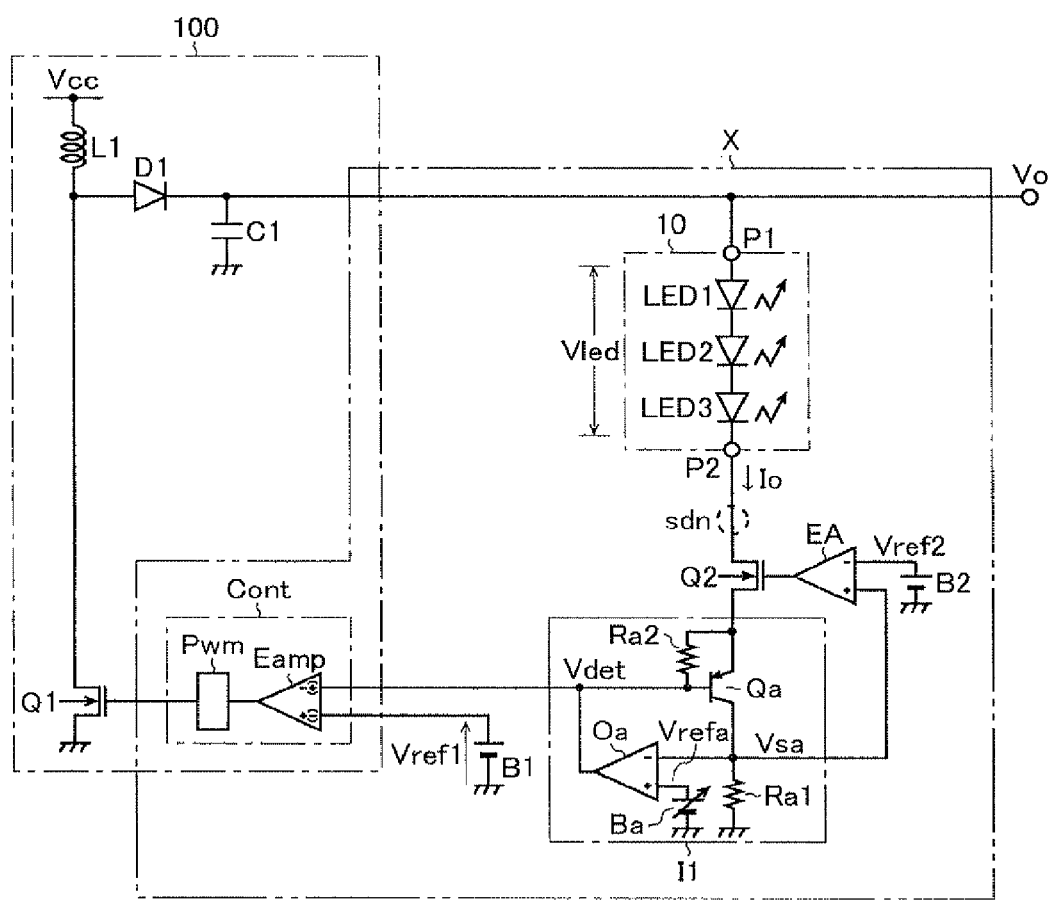
FIG. 23 is a schematic circuit diagram of a load driving device in accordance with a nineteenth embodiment of the present invention.

FIG. 23 is a view showing a configuration of a load driving device in accordance with a nineteenth embodiment of the present invention. The load driving device of the nineteenth embodiment is characterized in that an external load 10 of a single system is connected, that as a constant-current source I1, an internal configuration different from FIG. 3 (a configuration similar to the first constant-current source I10 of the ninth embodiment) is adopted and a position from which a detection voltages Vdet1 is derived has been changed, that an error amplifier Eamp has input terminals of two systems (a noninverting input terminal (+) and an inverting input terminal (−)), and that output feedback circuits (an error amplifier EA, and a reference voltage source B2) for controlling continuity level of a transistors Q2 between the external load 10 and the constant-current source I1, depending on a drive current Io (more specifically, a sense voltage Vsa), are provided.

Twentieth Embodiment

Figure 24:
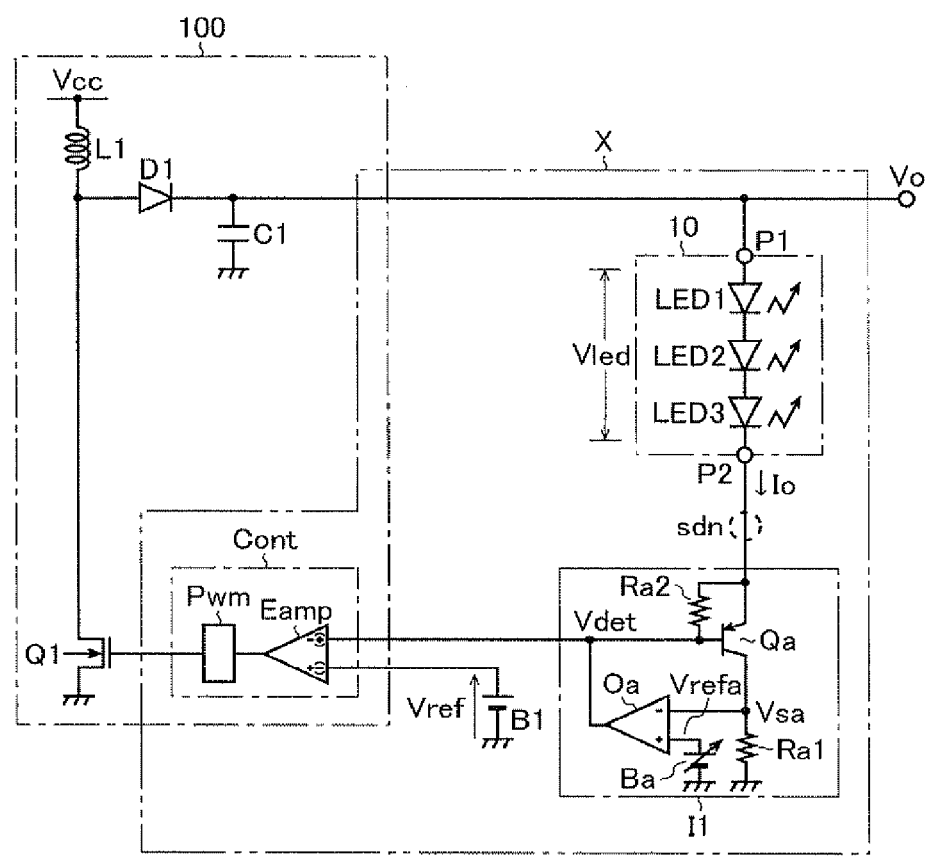
FIG. 24 is a schematic circuit diagram of a load driving device in accordance with a twentieth embodiment of the present invention.

FIG. 24 is a view showing a configuration of a load driving device in accordance with a twentieth embodiment of the present invention. The load driving device of the twentieth embodiment is characterized in that an external load 10 of a single system is connected, that as a constant-current source I1, an internal configuration different from FIG. 3 (a configuration similar to the first constant-current source I10 of the ninth embodiment) is adopted and a position from which a detection voltages Vdet is derived has been changed, that an error amplifier Eamp has input terminals of two systems (a noninverting input terminal (+) and an inverting input terminal (−)).

Twenty-First Embodiment

Figure 25:
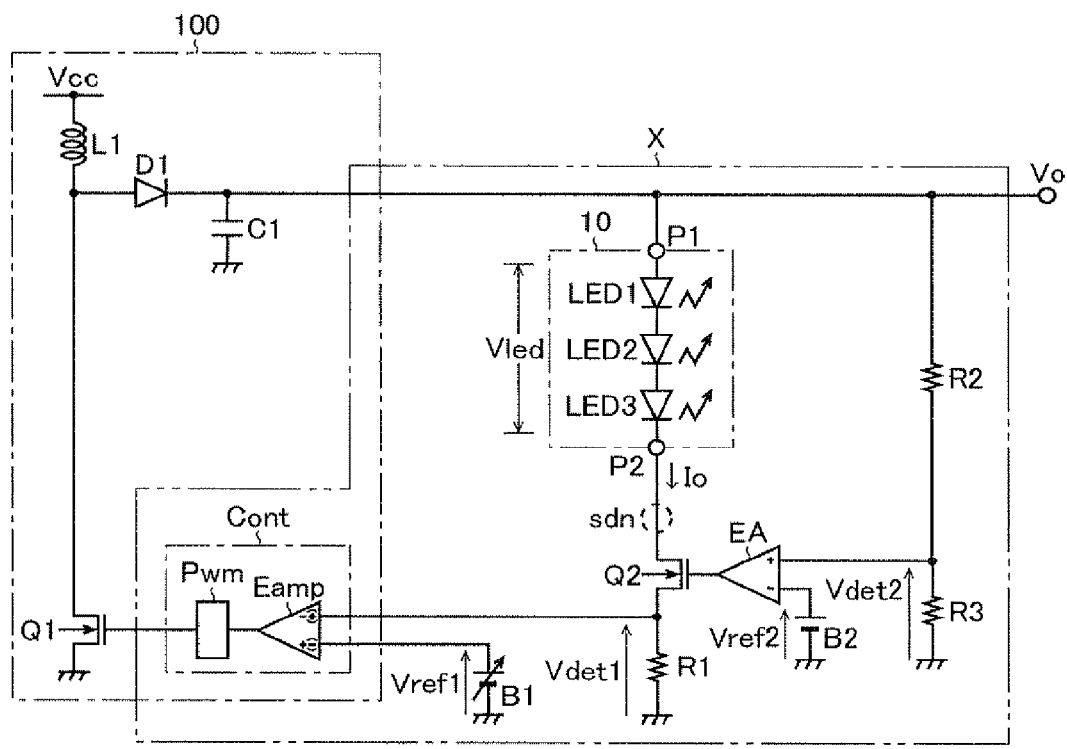
FIG. 25 is a schematic circuit diagram of a load driving device in accordance with a twenty-first embodiment of the present invention.

FIG. 25 is a view showing a configuration of a load driving device in accordance with a twenty-first embodiment of the present invention. The load driving device of the twenty-first embodiment is characterized in that an external load 10 of a single system is connected, that a resistance R1 for current detection is provided at a position of a constant-current source I1 and a detection voltage Vdet1 is derived from one end of the resistance R1, that an error amplifier Eamp has input terminals of two systems (a noninverting input terminal (+) and an inverting input terminal (−)), and that output feedback circuits (an error amplifier EA, a reference voltage source B2, and resistances R2 and R3) for controlling continuity level of a transistor Q2 between the external load 10 and the resistance R1, depending on an output voltage Vo, are provided.

Twenty-Second Embodiment

Figure 26:
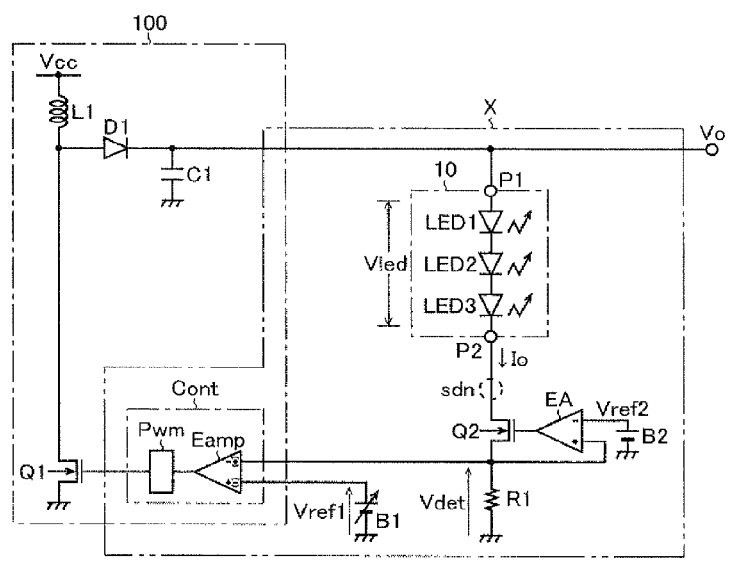
FIG. 26 is a schematic circuit diagram of a load driving device in accordance with a twenty-second embodiment of the present invention.

FIG. 26 is a view showing a configuration of a load driving device in accordance with a twenty-second embodiment of the present invention. The load driving device of the twenty-second embodiment is characterized in that an external load 10 of a single system is connected, that a resistance R1 for current detection is provided at a position of a constant-current source I1 and a detection voltage Vdet is derived from one end of the resistance R1, that an error amplifier Eamp has input terminals of two systems (a noninverting input terminal (+) and an inverting input terminal (−)), and that output feedback circuits (an error amplifier EA, and a reference voltage source B2) for controlling continuity level of a transistor Q2 between the external load 10 and the resistance R1, depending on a drive current Io (more specifically, the detection voltage Vdet), are provided.

Twenty-Third Embodiment

Figure 27:
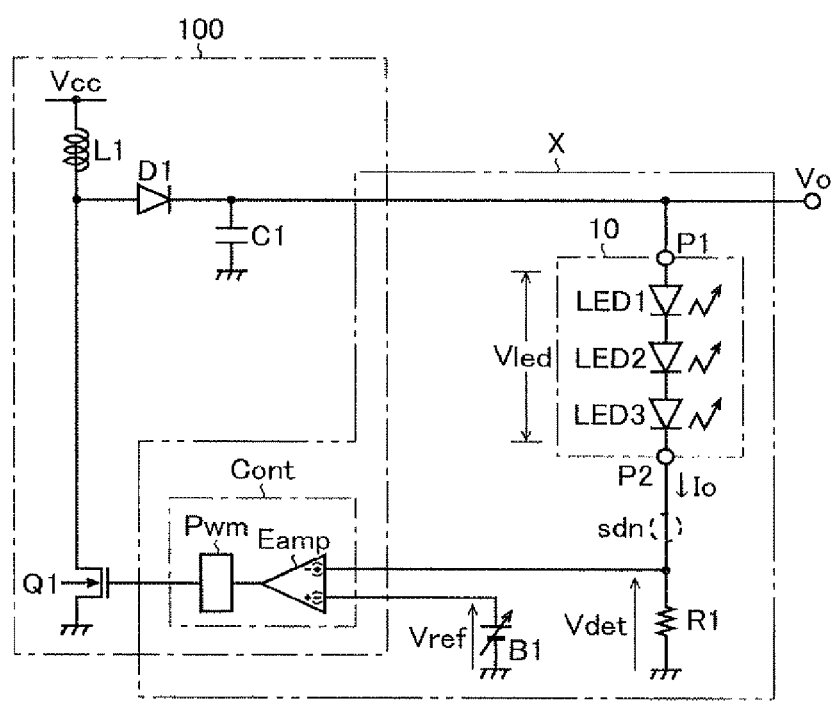
FIG. 27 is a schematic circuit diagram of a load driving device in accordance with a twenty-third embodiment of the present invention.

FIG. 27 is a view showing a configuration of a load driving device in accordance with a twenty-third embodiment of the present invention. The load driving device of the twenty-third embodiment is characterized in that an external load 10 of a single system is connected, that a resistance R1 for current detection is provided at a position of a constant-current source I1 and a detection voltage Vdet is derived from one end of the resistance R1, and that an error amplifier Eamp has input terminals of two systems (a noninverting input terminal (+) and an inverting input terminal (−)).

Twenty-Fourth Embodiment

Figure 28:
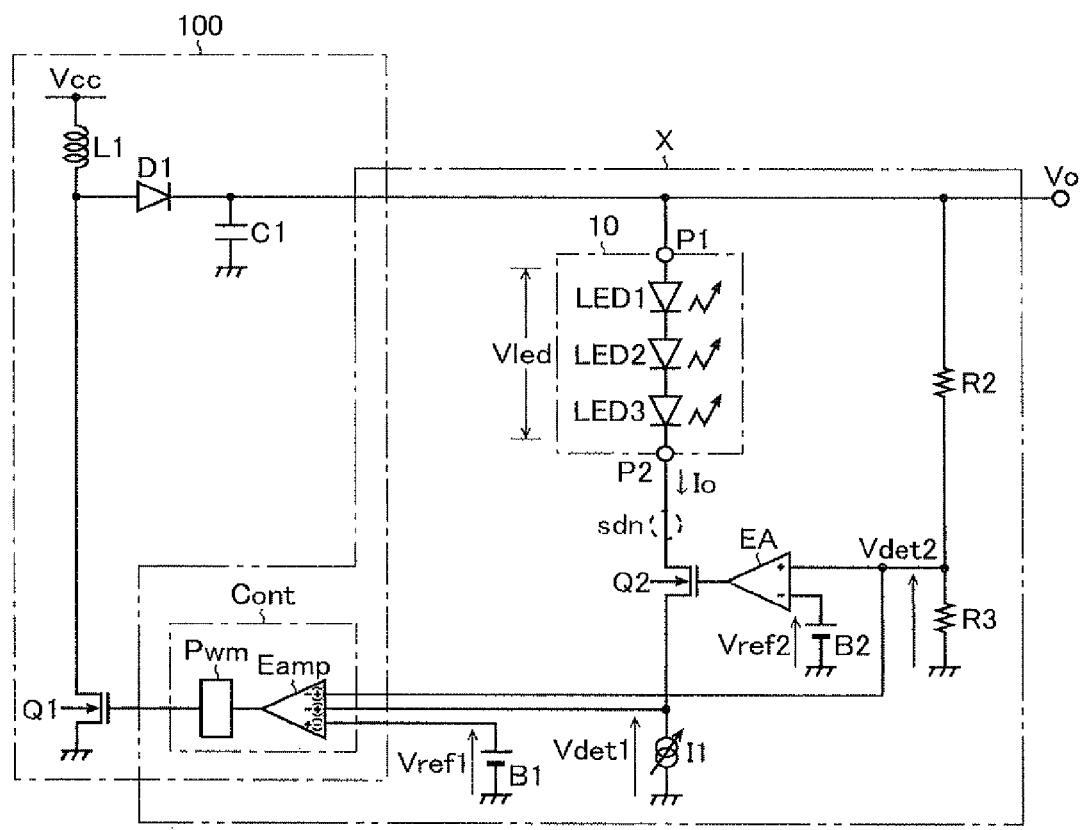
FIG. 28 is a schematic circuit diagram of a load driving device in accordance with a twenty-fourth embodiment of the present invention.

FIG. 28 is a view showing a configuration of a load driving device in accordance within accordance with a twenty-fourth embodiment of the present invention. The load driving device of the twenty-fourth embodiment is characterized in that an external load 10 of a single system is connected, that a detection voltage Vdet1 is derived from one end of a constant-current source I1, that an error amplifier Eamp has input terminals of three systems (a noninverting input terminal (+), a first inverting input terminal (−), and a second inverting input terminal (−)), that in the error amplifier Eamp, an error voltage corresponding to any one (one at a lower voltage level) of the detection voltage Vdet1 and a detection voltage Vdet2 (divided voltage of an output voltage Vo) is generated, and that output feedback circuits (an error amplifier EA, a reference voltage source B2, and resistances R2 and R3) for controlling continuity level of a transistor Q2 between the external load 10 and the constant-current source I1, depending on an output voltage Vo, are provided.

Twenty-Fifth Embodiment

Figure 29:
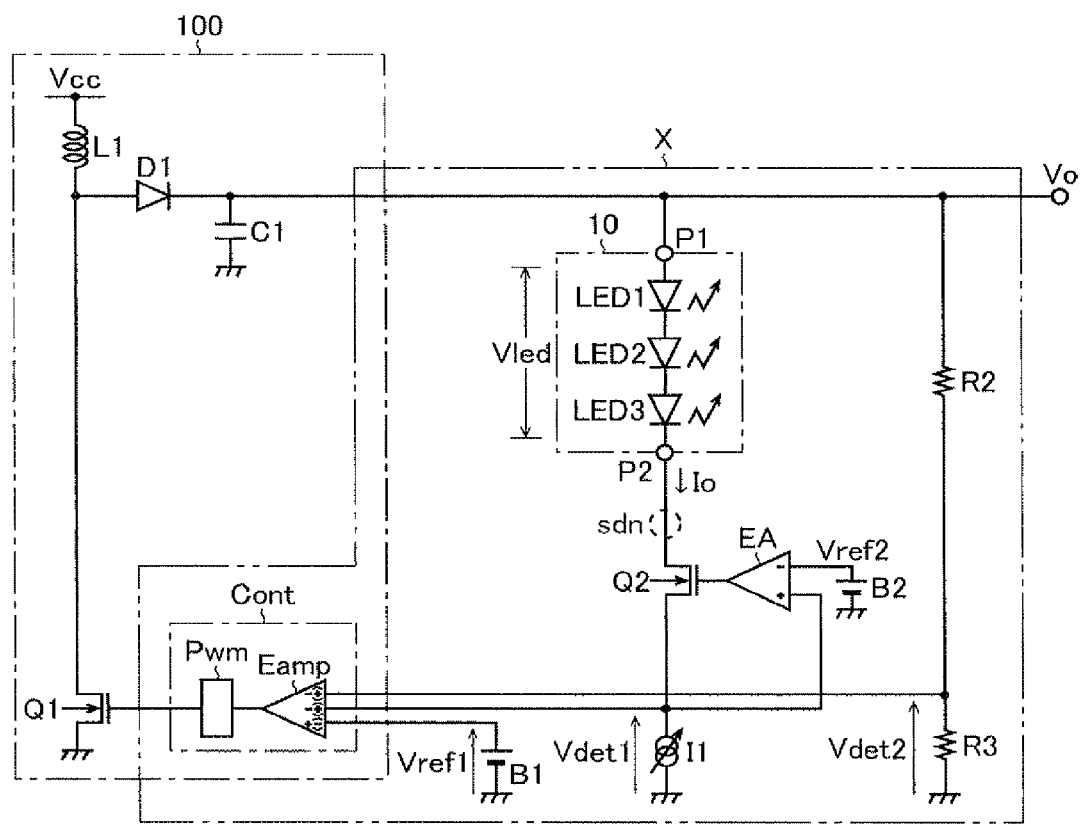
FIG. 29 is a schematic circuit diagram of a load driving device in accordance with a twenty-fifth embodiment of the present invention.

FIG. 29 is a view showing a configuration of a load driving device in accordance with a twenty-fifth embodiment of the present invention. The load driving device of the twenty-fifth embodiment is characterized in that an external load 10 of a single system is connected, that a detection voltage Vdet1 is derived from one end of a constant-current source I1, that an error amplifier Eamp has input terminals of three systems (a noninverting input terminal (+), a first inverting input terminal (−), and a second inverting input terminal (−)), that in the error amplifier Eamp, an error voltage corresponding to any one (one at a lower voltage level) of the detection voltage Vdet1 and a detection voltage Vdet2 (divided voltage of an output voltage Vo) is generated, and that output feedback circuits (an error amplifier EA and a reference voltage source B2) for controlling continuity level of a transistor Q2 between the external load 10 and the constant-current source IL depending on a drive current Io (more specifically the detection voltage Vdet1), are provided.

Twenty-Sixth Embodiment

Figure 30:
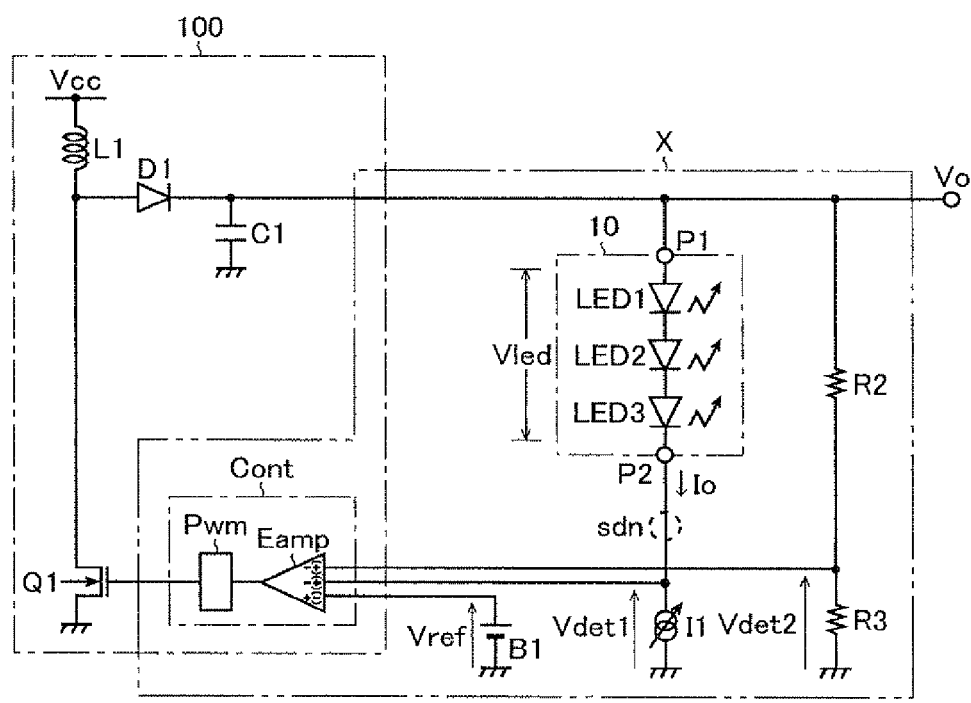
FIG. 30 is a schematic circuit diagram of a load driving device in accordance with a twenty-sixth embodiment of the present invention.

FIG. 30 is a view showing a configuration of a load driving device of a twenty-sixth embodiment of the present invention. The load driving device of the twenty-sixth embodiment is characterized in that an external load 10 of a single system is connected, that a detection voltage Vdet1 is derived from one end of a constant-current source that an error amplifier Eamp has input terminals of three systems (a noninverting input terminal (+), a first inverting input terminal (−), and a second inverting input terminal (−)), and that in the error amplifier Eamp, an error voltage corresponding to any one (one at a lower voltage level) of the detection voltage Vdet1 and a detection voltage Vdet2 (divided voltage of an output voltage Vo) is generated.

Twenty-Seventh Embodiment

Figure 31:
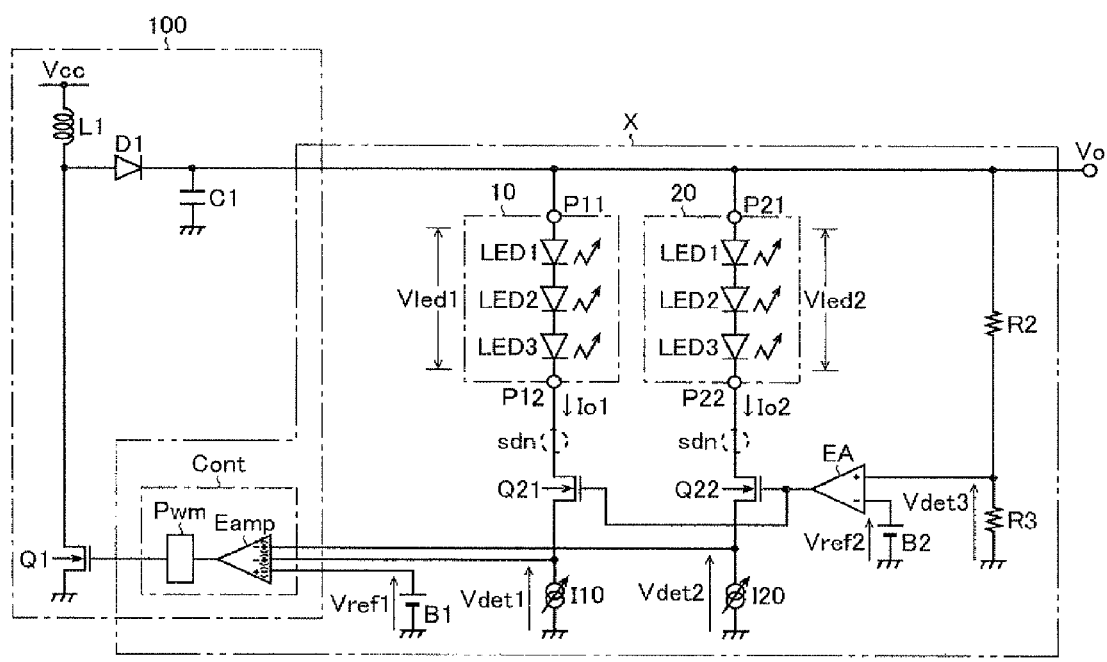
FIG. 31 is a schematic circuit diagram of a load driving device in accordance with a twenty-seventh embodiment of the present invention.

FIG. 31 is a view showing a configuration of a load driving device in accordance with a twenty-seventh embodiment of the present invention. The load driving device of the twenty-seventh embodiment is characterized in that external loads 10 and 20 of multiple systems are connected, that detection voltages Vdet1 and Vdet2 are derived from each one end of constant-current sources I10 and I20, that an error amplifier Eamp has input terminals of three systems (a noninverting input terminal (+), a first inverting input terminal (−), and a second inverting input terminal (−)), that in the error amplifier Eamp, an error voltage corresponding to any one (one at a lower voltage level) of the detection voltages Vdet1 and Vdet2 is generated, and that output feedback circuits (an error amplifier EA, a reference voltage source B2, and resistances R2 and R3) for controlling continuity level of transistors Q21 and Q22 placed respectively between the external loads 10 and 20 and the constant-current sources I10 and I20, depending on an output voltage Vo, are provided.

Twenty-Eighth Embodiment

Figure 32:
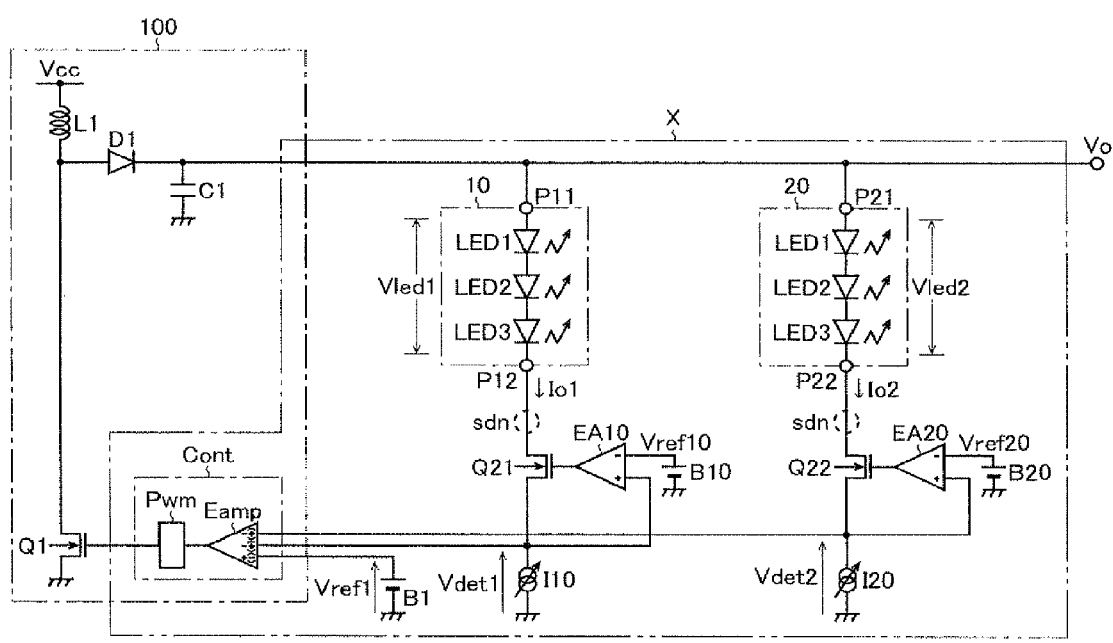
FIG. 32 is a schematic circuit diagram of a load driving device in accordance with a twenty-eighth embodiment of the present invention.

FIG. 32 is a view showing a configuration of a load driving device in accordance with a twenty-eighth embodiment of the present invention. The load driving device of the twenty-eighth embodiment is characterized in that external loads 10 and 20 of multiple systems are connected, that detection voltages Vdet1 and Vdet2 are derived from each one end of constant-current sources I10 and I20, that an error amplifier Eamp has input terminals of three systems (a noninverting input terminal (+), a first inverting input terminal (−), and a second inverting input terminal (−)), that in the error amplifier Eamp, an error voltage corresponding to any one (one at a lower voltage level) of the detection voltages Vdet1 and Vdet2 is generated, and that output feedback circuits (error amplifiers EA10 and EA20, and reference voltage sources B10 and B20) for controlling continuity level of transistors Q21 and Q22 placed respectively between the external loads 10 and 20 and the constant-current sources I10 and I20, depending on drive currents Io1 and Io2 (more specifically, the detection voltages Vdet1 and Vdet2), are provided.

Twenty-Ninth Embodiment

Figure 33:
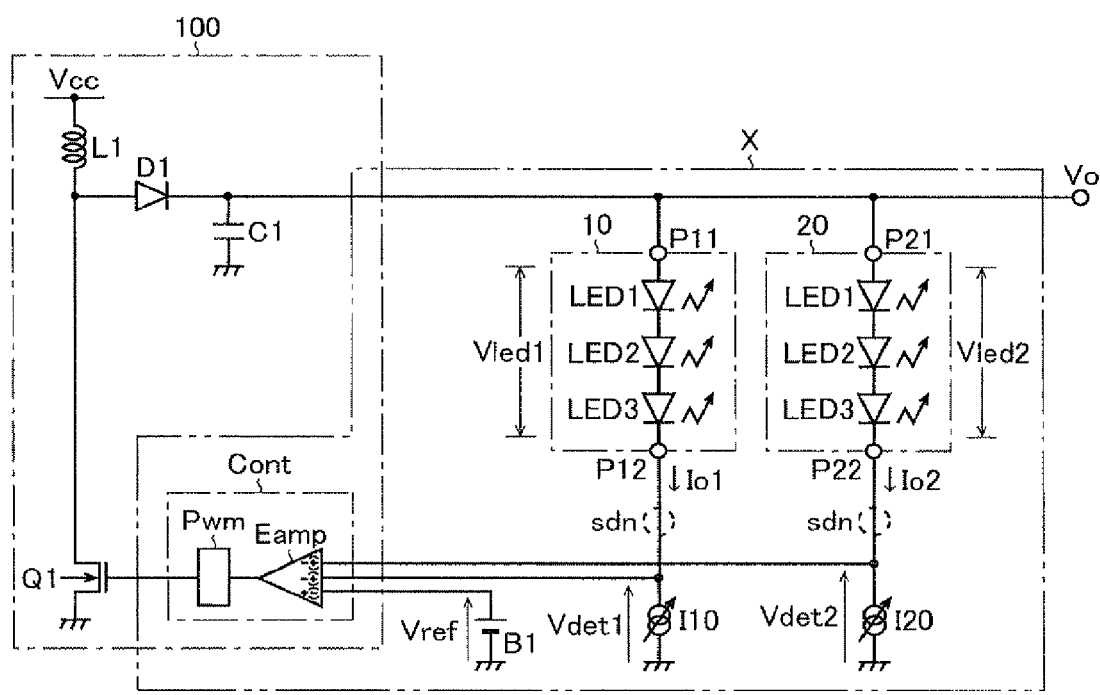
FIG. 33 is a schematic circuit diagram of a load driving device in accordance with a twenty-ninth embodiment of the present invention.

FIG. 33 is a view showing a configuration of a load driving device in accordance with a twenty-ninth embodiment of the present invention. The load driving device of the twenty-ninth embodiment is characterized in that external loads 10 and 20 of multiple systems are connected, that detection voltages Vdet1 and Vdet2 are derived from each one end of constant-current sources I10 and I20, that an error amplifier Eamp has input terminals of three systems (a noninverting input terminal (+), a first inverting input terminal (−), and a second inverting input terminal (−)), and that in the error amplifier Eamp, an error voltage corresponding to any one (one at a lower voltage level) of the detection voltages Vdet1 and Vdet2 is generated.

Thirtieth Embodiment

Figure 34:
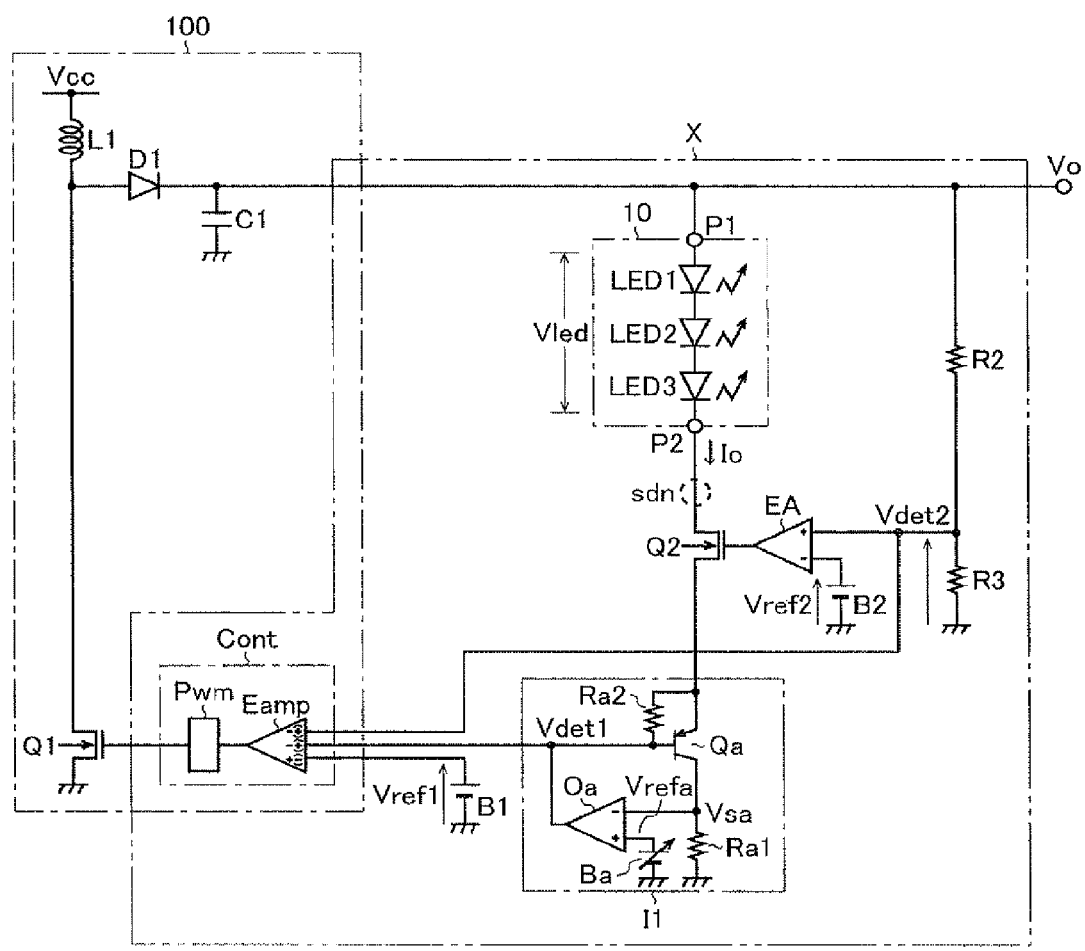
FIG. 34 is a schematic circuit diagram of a load driving device in accordance with a thirtieth embodiment of the present invention.

FIG. 34 is a view showing a configuration of a load driving device in accordance with a thirtieth embodiment of the present invention. The load driving device of the thirtieth embodiment is characterized in that an external load 10 of a single system is connected, that as a constant-current source I1, an internal configuration different from FIG. 3 (a configuration similar to the first constant-current source I10 of the ninth embodiment) is adopted and a position from which a detection voltages Vdet1 is derived has been changed, that an error amplifier Eamp has input terminals of three systems (a noninverting input terminal (+), a first inverting input terminal (−), and a second inverting input terminal (−)), that in the error amplifier Eamp, an error voltage corresponding to any one (one at a lower voltage level) of detection voltages Vdet1 and Vdet2 (divided voltage of an output voltage Vo) is generated, and that output feedback circuits (an error amplifier EA, a reference voltage source B2, and resistances R2 and R3) for controlling continuity level of a transistor Q2 between the external load 10 and the constant-current source I1, depending on an output voltage Vo, are provided.

Thirty-First Embodiment

Figure 35:
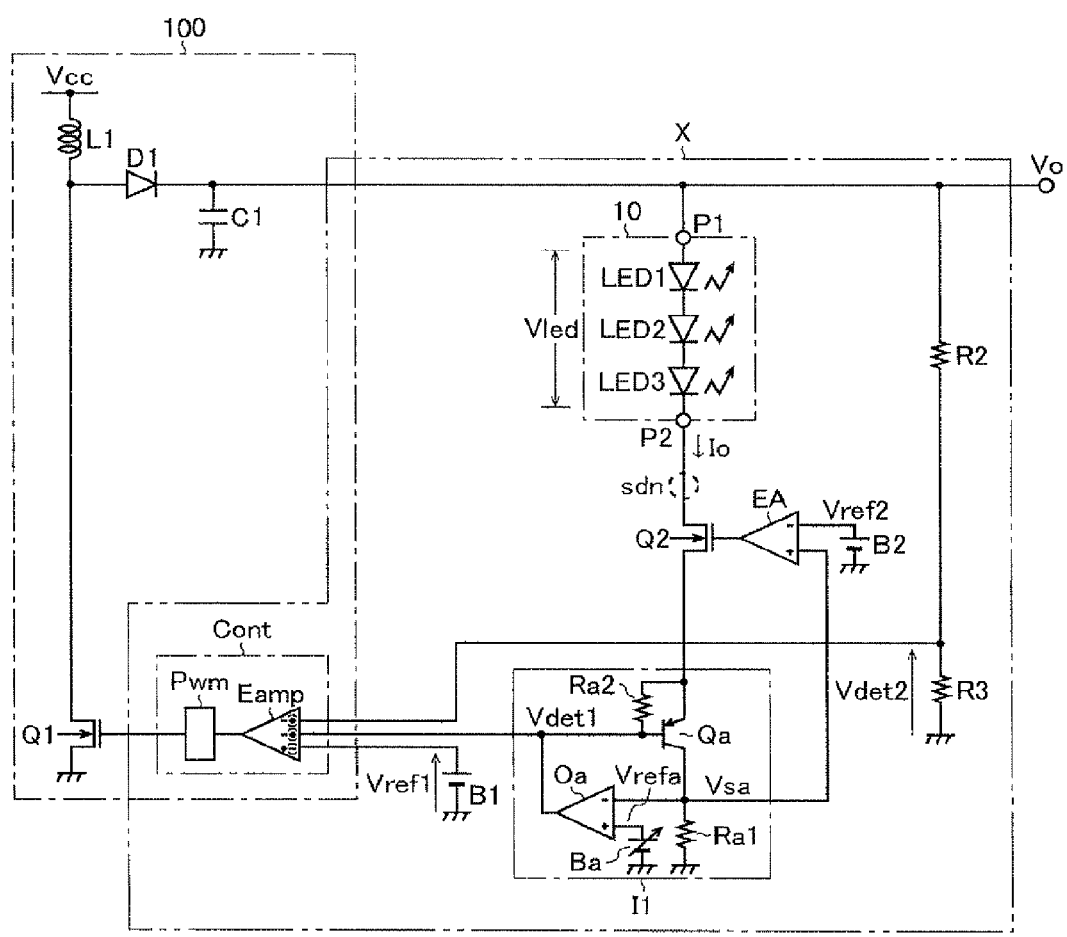
FIG. 35 is a schematic circuit diagram of a load driving device in accordance with a thirty-first embodiment of the present invention.

FIG. 35 is a view showing a configuration of a load driving device in accordance with a thirty-first embodiment of the present invention. The load driving device of the thirty-first embodiment is characterized in that an external load 10 of a single system is connected, that as a constant-current source I1, an internal configuration different from FIG. 3 (a configuration similar to the first constant-current source I10 of the ninth embodiment) is adopted and a position from which a detection voltages Vdet1 is derived has been changed, that an error amplifier Eamp has input terminals of three systems (a noninverting input terminal (+), a first inverting input terminal (−), and a second inverting input terminal (−)), that in the error amplifier Eamp, an error voltage corresponding to any one (one at a lower voltage level) of detection voltages Vdet1 and Vdet2 (divided voltage of an output voltage Vo) is generated, and that output feedback circuits (an error amplifier EA and a reference voltage source B2) for controlling continuity level of a transistor Q2 between the external load 10 and the constant-current source I1, depending on a drive current Io (more specifically, a sense voltage Vsa), are provided.

Thirty-Second Embodiment

Figure 36:
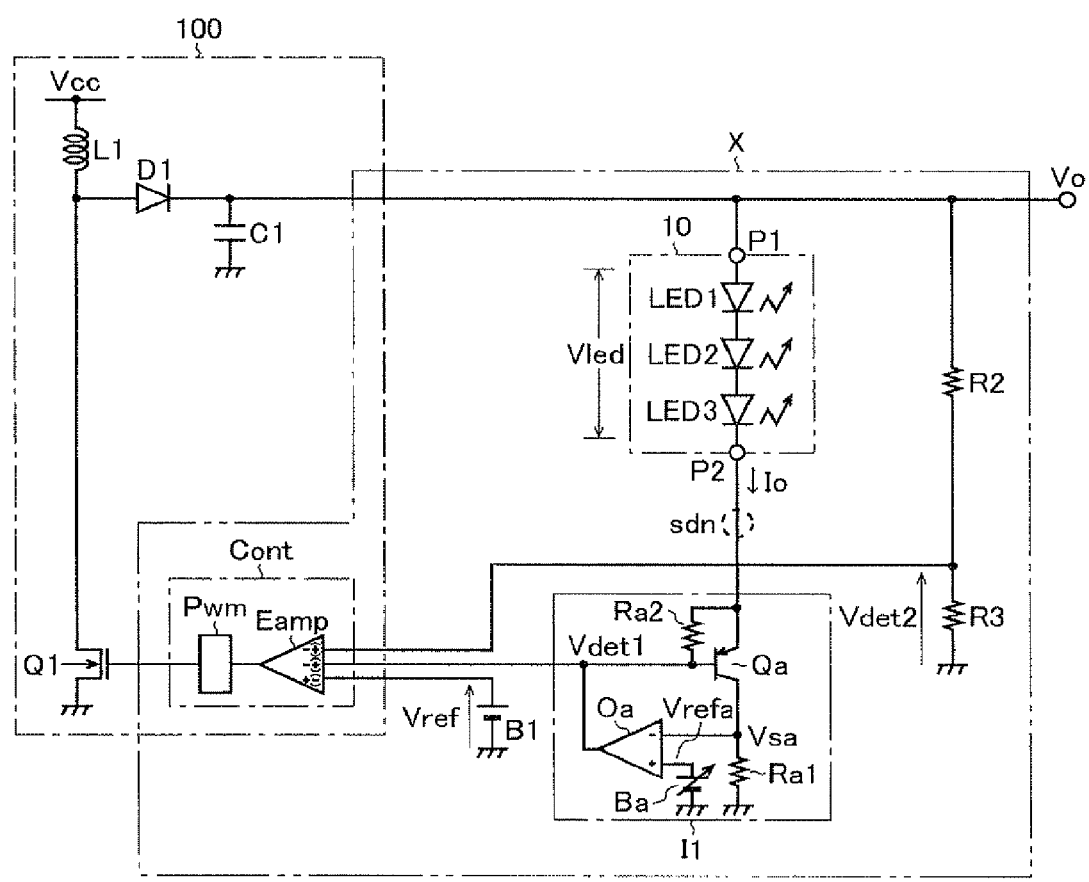
FIG. 36 is a schematic circuit diagram of a load driving device in accordance with a thirty-second embodiment of the present invention.

FIG. 36 is a view showing a configuration of a load driving device in accordance with thirty-second embodiment of the present invention. The load driving device of the thirty-second embodiment is characterized in that an external load 10 of a single system is connected, that as a constant-current source I1, an internal configuration different from FIG. 3 (a configuration similar to the first constant-current source I10 of the ninth embodiment) is adopted and a position from which a detection voltages Vdet1 is derived has been changed, that an error amplifier Eamp has input terminals of three systems (a noninverting input terminal (+), a first inverting input terminal (−), and a second inverting input terminal (−)), and that in the error amplifier Eamp, an error voltage corresponding to any one (one at a lower voltage level) of detection voltages Vdet1 and Vdet2 (divided voltage of an output voltage Vo) is generated.

Thirty-Third Embodiment

Figure 37:
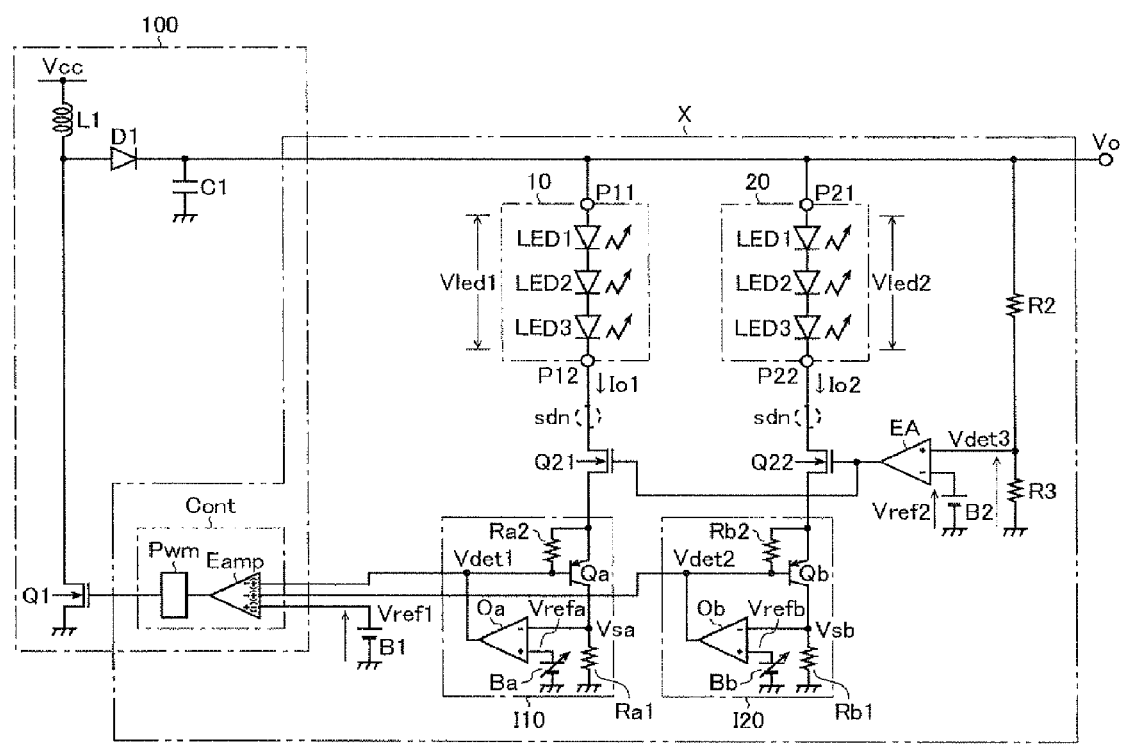
FIG. 37 is a schematic circuit diagram of a load driving device in accordance with a thirty-third embodiment of the present invention.

FIG. 37 is a view showing a configuration of a load driving device in accordance with a thirty-third embodiment of the present invention. The load driving device of the thirty-third embodiment is characterized in that external loads 10 and 20 of multiple systems are connected, that as constant-current sources I10 and I20, an internal configuration different from FIG. 3 (a configuration similar to the ninth embodiment) is adopted and positions from which detection voltages Vdet1 and Vdet2 are derived have been changed, that an error amplifier Eamp has input terminals of three systems (a noninverting input terminal (+), a first inverting input terminal (·), and a second inverting input terminal (−)), that in the error amplifier Eamp, an error voltage corresponding to any one (one at a lower voltage level) of the detection voltages Vdet1 and Vdet2 is generated, and that output feedback circuits (an error amplifier EA, a reference voltage source B20, and resistances R2 and R3) for controlling continuity level of transistors Q21 and Q22 placed respectively between the external loads 10 and 20 and the constant-current sources I10 and I20, depending on an output voltage V0, are provided.

Thirty-Fourth Embodiment

Figure 38:
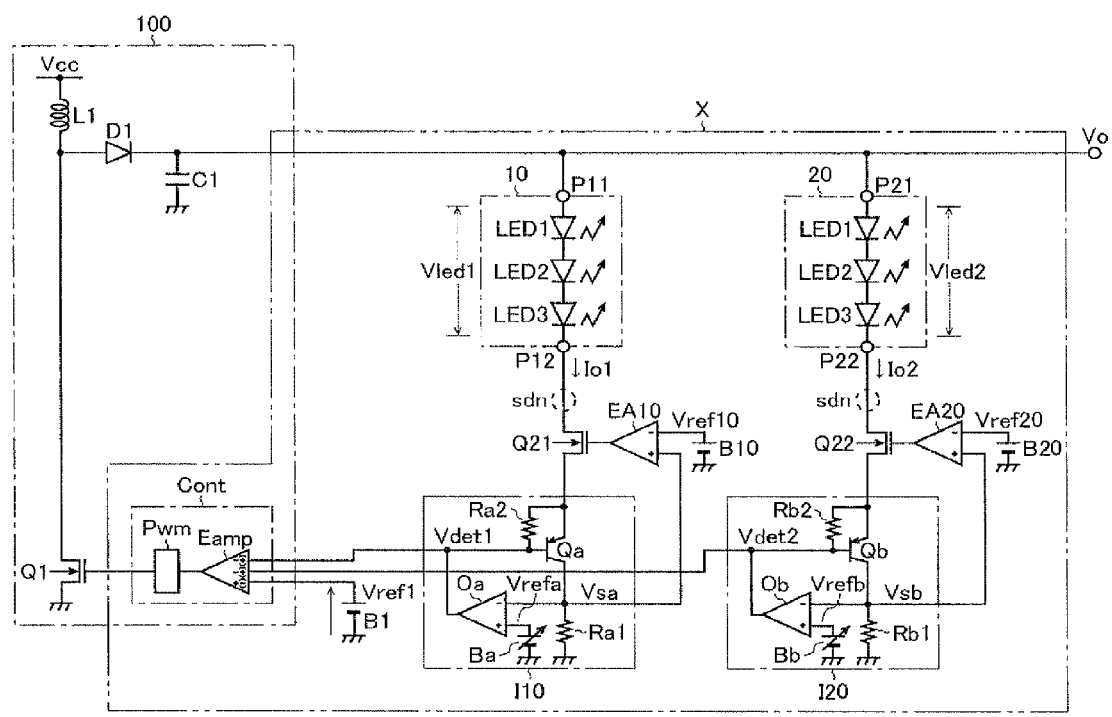
FIG. 38 is a schematic circuit diagram of a load driving device in accordance with a thirty-fourth embodiment of the present invention.

FIG. 38 is a view showing a configuration of a load driving device in accordance with a thirty-fourth embodiment of the present invention. The load driving device of the thirty-fourth embodiment is characterized in that external loads 10 and 20 of multiple systems are connected, that as constant-current sources I10 and I20, an internal configuration different from FIG. 3 (a configuration similar to the ninth embodiment) is adopted and positions from which detection voltages Vdet1 and Vdet2 are derived have been changed, that an error amplifier Eamp has input terminals of three systems (a noninverting input terminal (+), a first inverting input terminal (−), and a second inverting input terminal (−)), that in the error amplifier Eamp, an error voltage corresponding to any one (one at a lower voltage level) of the detection voltages Vdet1 and Vdet2 is generated, and that output feedback circuits (error amplifiers EA10 and EA20 and reference voltage sources B10 and B20) for controlling continuity level of transistors Q21 and Q22 placed respectively between the external loads 10 and 20 and the constant-current sources I10 and I20, depending on drive currents Io1 and Io2 (more specifically, sense voltages Vsa and Vsb), are provided.

Thirty-Fifth Embodiment

Figure 39:
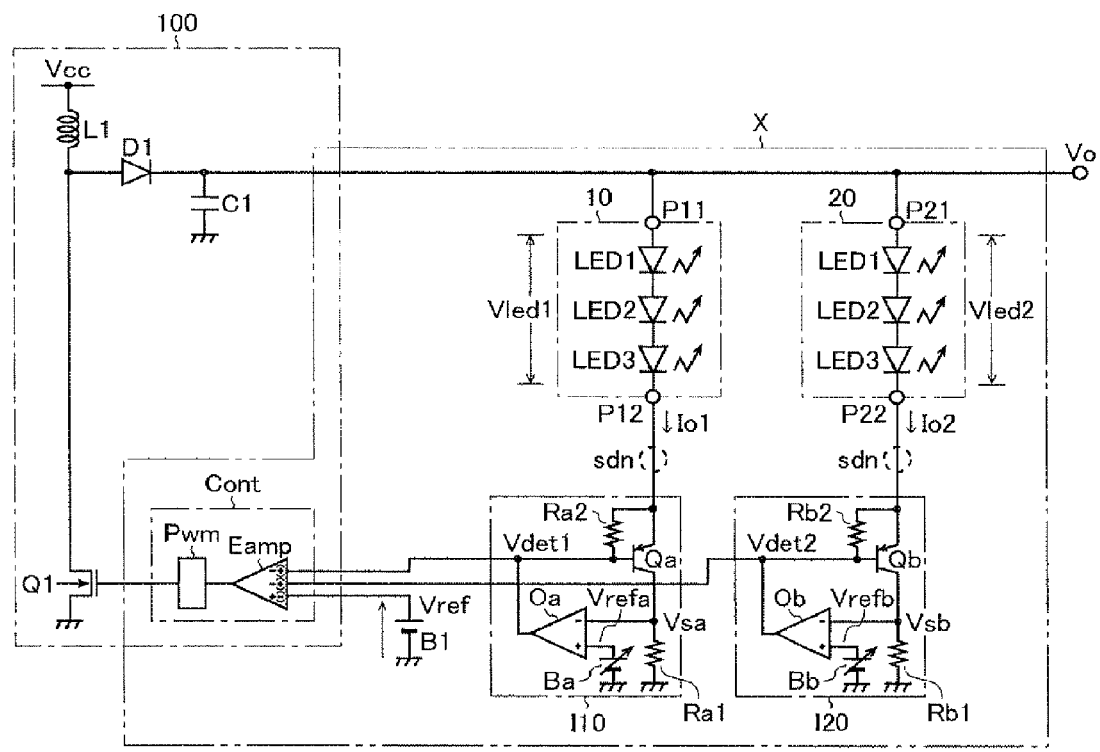
FIG. 39 is a schematic circuit diagram of a load driving device in accordance with a thirty-fifth embodiment of the present invention.

FIG. 39 is a view showing a configuration of a load driving device in accordance with a thirty-fifth embodiment of the present invention. The load driving device of the thirty-fifth embodiment is characterized in that external loads 10 and 20 of multiple systems are connected, that as constant-current sources I10 and I20, an internal configuration different from FIG. 3 (a configuration similar to the ninth embodiment) is adopted and positions from which detection voltages Vdet1 and Vdet2 are derived have been changed, that an error amplifier Eamp has input terminals of three systems (a noninverting input terminal (+), a first inverting input terminal (−), and a second inverting input terminal (−)), and that in the error amplifier Eamp, an error voltage corresponding to any one (one at a lower voltage level) of the detection voltages Vdet1 and Vdet2 is generated.

Thirty-Sixth Embodiment

Figure 40:
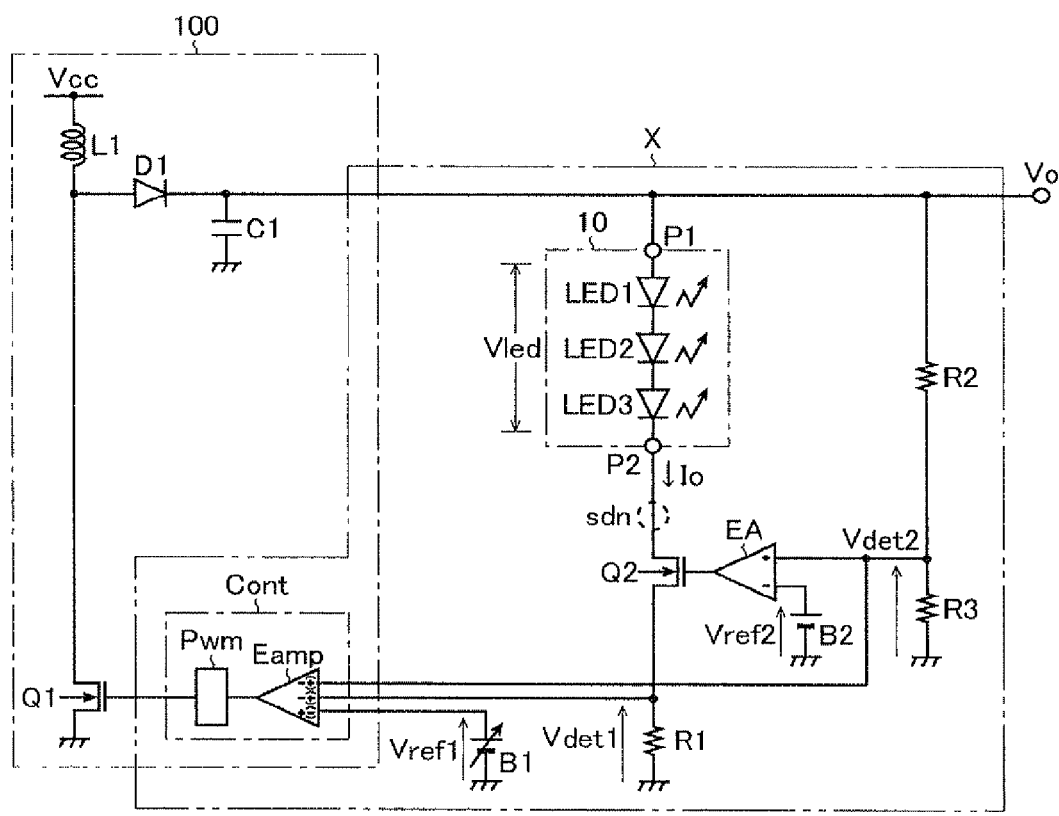
FIG. 40 is a schematic circuit diagram of a load driving device in accordance with a thirty-sixth embodiment of the present invention.

FIG. 40 is a view showing a configuration of a load driving device of a thirty-sixth embodiment of the present invention. The load driving device of the thirty-sixth embodiment is characterized in that an external load 10 of a single system is connected, that a resistance R1 for current detection is provided at a position of a constant-current source I1 and a detection voltage Vdet1 is derived from one end of the resistance R1, that an error amplifier Eamp has input terminals of three systems (a noninverting input terminal (+), a first inverting input terminal (−), and a second inverting input terminal (−)), that in the error amplifier Eamp, an error voltage corresponding to any one (one at a lower voltage level) of the detection voltage Vdet1 and a detection voltage Vdet2 (divided voltage of an output voltage Vo) is generated, and that output feedback circuits (an error amplifier EA, a reference voltage source B2, and resistances R2 and R3) for controlling continuity level of a transistor Q2 between the external load 10 and the resistance R1, depending on an output voltage Vo, are provided.

Thirty-Seventh Embodiment

Figure 41:
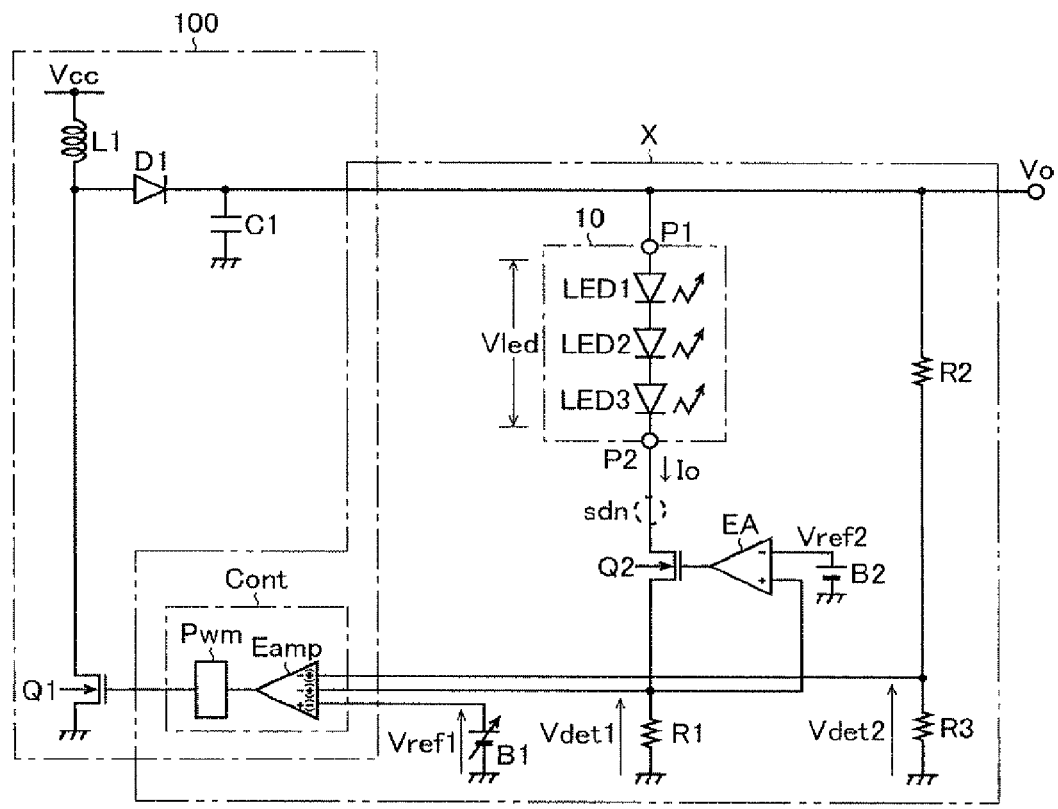
FIG. 41 is a schematic circuit diagram of a load driving device in accordance with a thirty-seventh embodiment of the present invention.

FIG. 41 is a view showing a configuration of a load driving device in accordance with a thirty-seventh embodiment of the present invention. The load driving device of the thirty-seventh embodiment is characterized in that an external load 10 of a single system is connected, that a resistance R1 for current detection is provided at a position of a constant-current source I1 and a detection voltage Vdet1 is derived from one end of the resistance R1, that an error amplifier Eamp has input terminals of three systems (a noninverting input terminal (+), a first inverting input terminal (−), and a second inverting input terminal (−)), that in the error amplifier Eamp, an error voltage corresponding to any one (one at a lower voltage level) of the detection voltage Vdet1 and a detection voltage Vdet2 (divided voltage of an output voltage Vo) is generated, and that output feedback circuits (an error amplifier EA, and a reference voltage source B20) for controlling continuity level of a transistor Q2 between the external load 10 and the resistance R1, depending on a drive current Io (more specifically, the detection voltage Vdet1), are provided.

Thirty-Eighth Embodiment

Figure 42:
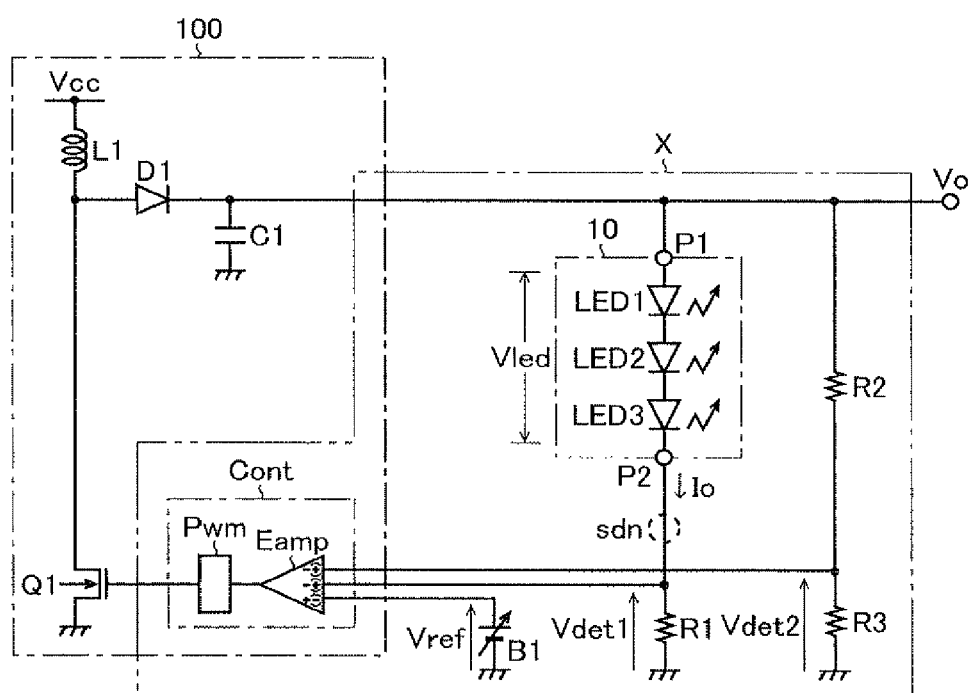
FIG. 42 is a schematic circuit diagram of a load driving device in accordance with a thirty-eighth embodiment of the present invention.

FIG. 42 is a view showing a configuration of a load driving device in accordance with a thirty-eighth embodiment of the present invention. The load driving device of the thirty-eighth embodiment is characterized in that an external load 10 of a single system is connected, that a resistance R1 for current detection is provided at a position of a constant-current source I1 and a detection voltage Vdet1 is derived from one end of the resistance R1, that an error amplifier Eamp has input terminals of three systems (a noninverting input terminal (+), a first inverting input terminal (−), and a second inverting input terminal (−)), and that in the error amplifier Eamp, an error voltage corresponding to any one (one at a lower voltage level) of the detection voltage Vdet1 and a detection voltage Vdet2 (divided voltage of an output voltage Vo) is generated.

Thirty-Ninth Embodiment

Figure 43:
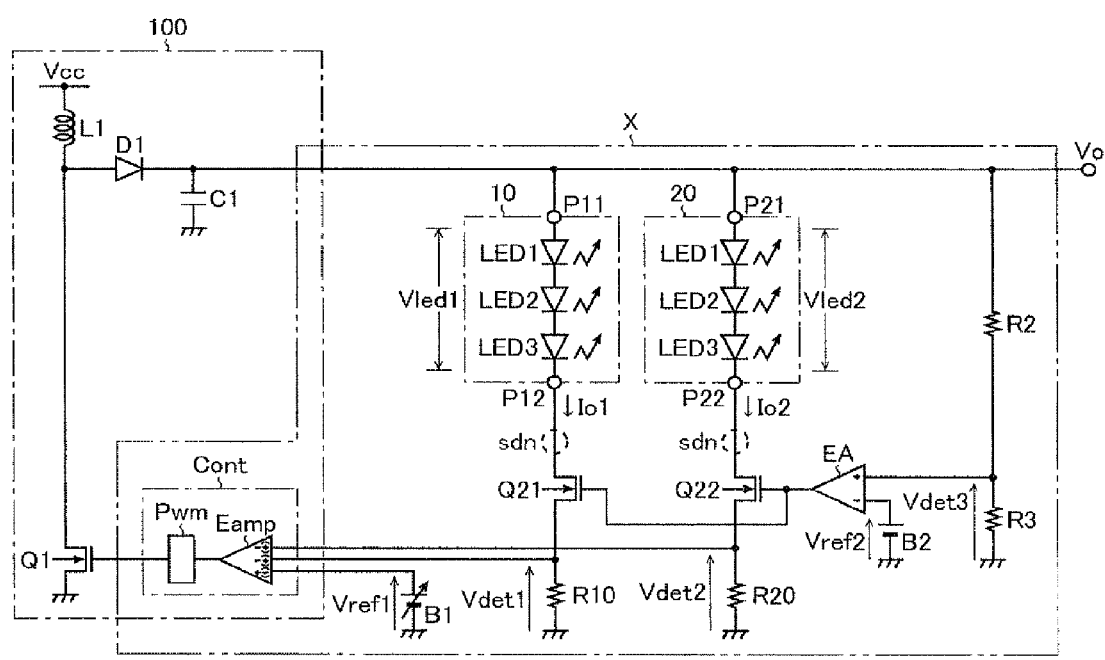
FIG. 43 is a schematic circuit diagram of a load driving device in accordance with a thirty-ninth embodiment of the present invention.

FIG. 43 is a view showing a configuration of a load driving device in accordance with a thirty-ninth embodiment of the present invention. The load driving device of the thirty-ninth embodiment is characterized in that external loads 10 and 20 of multiple systems are connected, that resistances R10 and R20 for current detection are provided at positions of constant-current sources I10 and I20 and detection voltages Vdet1 and Vdet2 are derived from one end of each, that an error amplifier Eamp has input terminals of three systems (a noninverting input terminal (+), a first inverting input terminal (−), and a second inverting input terminal (−)), that in the error amplifier Eamp, an error voltage corresponding to any one (one at a lower voltage level) of the detection voltages Vdet1 and Vdet2 is generated, and that output feedback circuits (an error amplifier EA10, a reference voltage sources B2, and resistances R2 and R3) for controlling continuity level of transistors Q21 and Q22 placed respectively between the external loads 10 and 20 and the resistances R10 and R20, depending on an output voltage Vo, are provided.

Fortieth Embodiment

Figure 44:
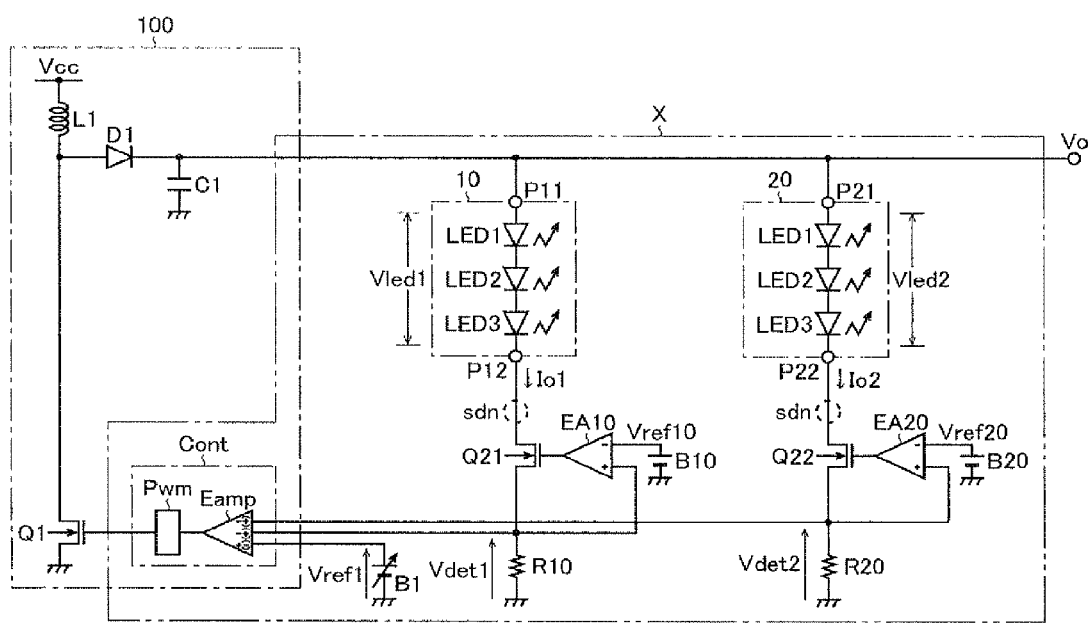
FIG. 44 is a schematic circuit diagram of a load driving device in accordance with a fortieth embodiment of the present invention.

FIG. 44 is a view showing a configuration of a load driving device in accordance with a fortieth embodiment of the present invention. The load driving device of the fortieth embodiment is characterized in that external loads 10 and 20 of multiple systems are connected, that resistances R10 and R20 for current detection are provided at positions of constant-current sources I10 and I20 and detection voltages Vdet1 and Vdet2 are derived from one end of each, that an error amplifier Eamp has input terminals of three systems (a noninverting input terminal (+), a first inverting input terminal (−), and a second inverting input terminal (−)), that in the error amplifier Eamp, an error voltage corresponding to any one (one at a lower voltage level) of the detection voltages Vdet1 and Vdet2 is generated, and that output feedback circuits (error amplifiers EA10 and EA20 and reference voltage sources B10 and B20) for controlling continuity level of transistors Q21 and Q22 placed respectively between the external loads 10 and 20 and the resistances R10 and R20, depending on drive currents Io1 and Io2 (more specifically, the detection voltages Vdet1 and Vdet2), are provided.

Forty-First Embodiment

Figure 45:
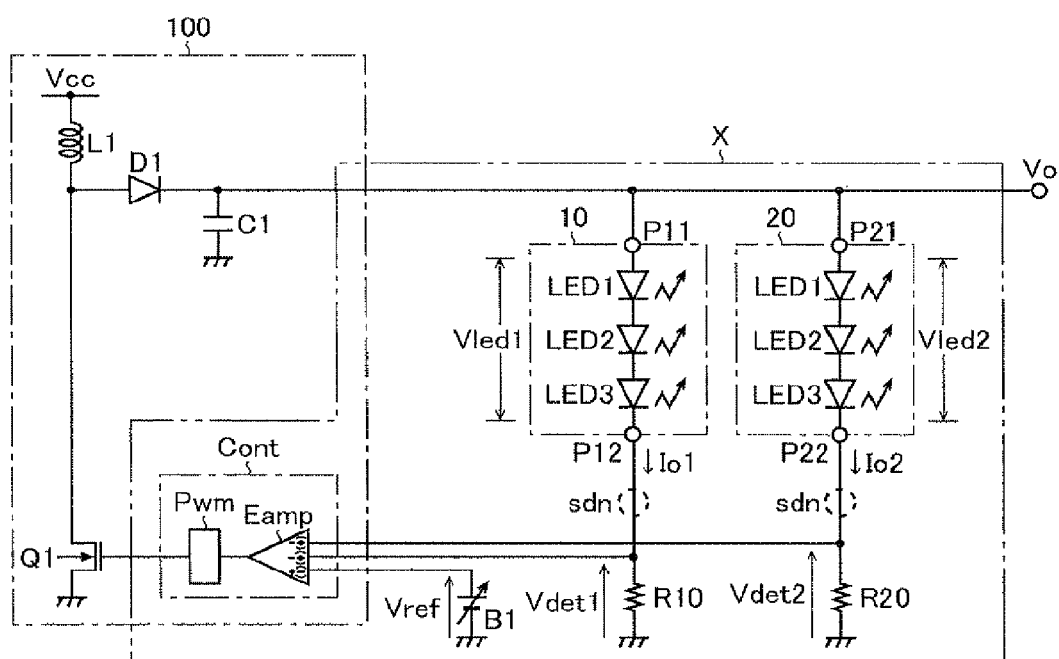
FIG. 45 is a schematic circuit diagram of a load driving device in accordance with a forty-first embodiment of the present invention.

FIG. 45 is a view showing a configuration of a load driving device of a forty-first embodiment of the present invention. The load driving device of the forty-first embodiment is characterized in that external loads 10 and 20 of multiple systems are connected, that resistances R10 and R20 for current detection are provided at positions of constant-current sources I10 and I20 and detection voltages Vdet1 and Vdet2 are derived from one end of each, that an error amplifier Eamp has input terminals of three systems (a noninverting input terminal (+), a first inverting input terminal (−), and a second inverting input terminal (−)), and that in the error amplifier Eamp, an error voltage corresponding to any one (one at a lower voltage level) of the detection voltages Vdet1 and Vdet2 is generated.

Forty-Second Embodiment

Figure 46:
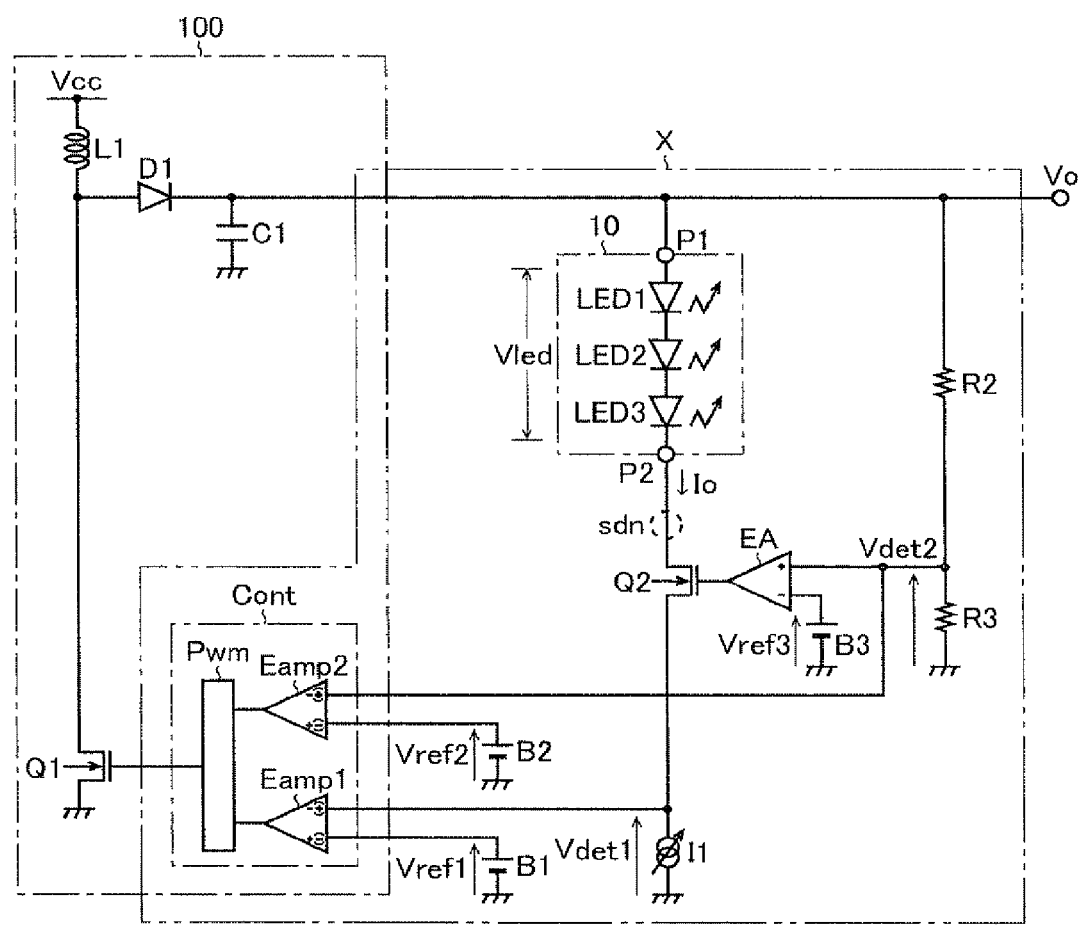
FIG. 46 is a schematic circuit diagram of a load driving device in accordance with a forty-second embodiment of the present invention.

FIG. 46 is a view showing a configuration of a load driving device in accordance with a forty-second embodiment of the present invention. The load driving device of the forty-second embodiment is characterized in that an external load 10 of a single system is connected, that a detection voltage Vdet1 is derived from one end of a constant-current source I1, that the detection voltage Vdet1 and a detection voltage Vdet2 (divided voltage of an output voltage Vo) are respectively inputted into separate error amplifiers Eamp1 and Eamp2, that in pulse-width modulation control circuit Pwm, On duty of a transistor Q1 is determined depending on any one output (one at a higher output voltage level) of the error amplifiers Eamp1 and Eamp2, and that output feedback circuits (an error amplifier EA, a reference voltage source B3, and resistances R2 and R3) for controlling continuity level of a transistor Q2 between the external load 10 and the constant-current source I1, depending on an output voltage Vo, are provided.

The load driving device of the forty-second embodiment can individually set a reference voltage Vref1 to be inputted into the error amplifier Eamp1 and a reference voltage Vref2 to be inputted into the error amplifier Eamp2. Thus, it can even cope with a case flexibly in which characteristics of the multiple external loads 10, 20 differ.

Forty-Third Embodiment

Figure 47:
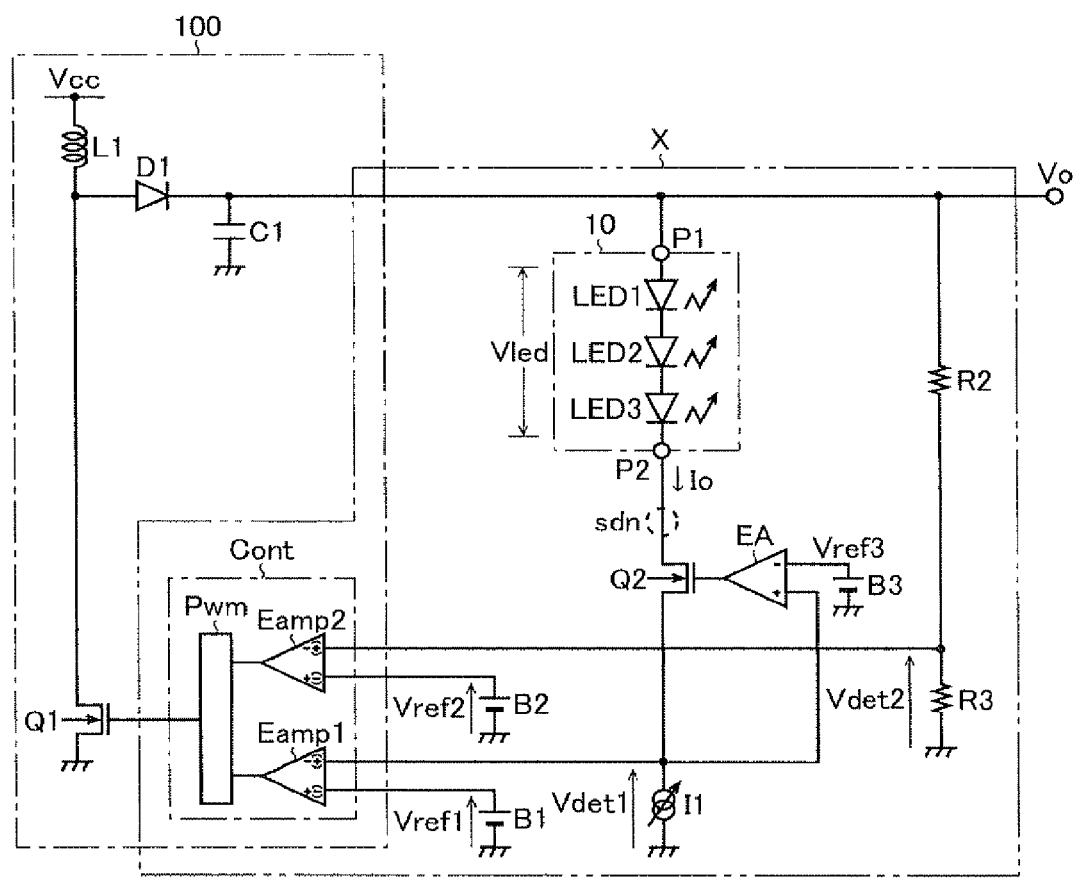
FIG. 47 is a schematic circuit diagram of a load driving device in accordance with a forty-third embodiment of the present invention.

FIG. 47 is a view showing a configuration of a load driving device in accordance with a forty-third embodiment of the present invention. The load driving device of the forty-third embodiment is characterized in that an external load 10 of a single system is connected, that a detection voltage Vdet1 is derived from one end of a constant-current source I1, that the detection voltage Vdet1 and a detection voltage Vdet2 (divided voltage of an output voltage Vo) are respectively inputted into separate error amplifiers Eamp1 and Eamp2, that in pulse-width modulation control circuit Pwm, On duty of a transistor Q1 is determined depending on any one output (one at a higher output voltage level) of the error amplifiers Eamp1 and Eamp2, and that output feedback circuits (an error amplifier EA and a reference voltage source B3) for controlling continuity level of a transistor Q2 between the external load 10 and the constant-current source I1, depending on a drive current Io (more specifically, the detection voltage Vdet1), are provided.

Forty-Fourth Embodiment

Figure 48:
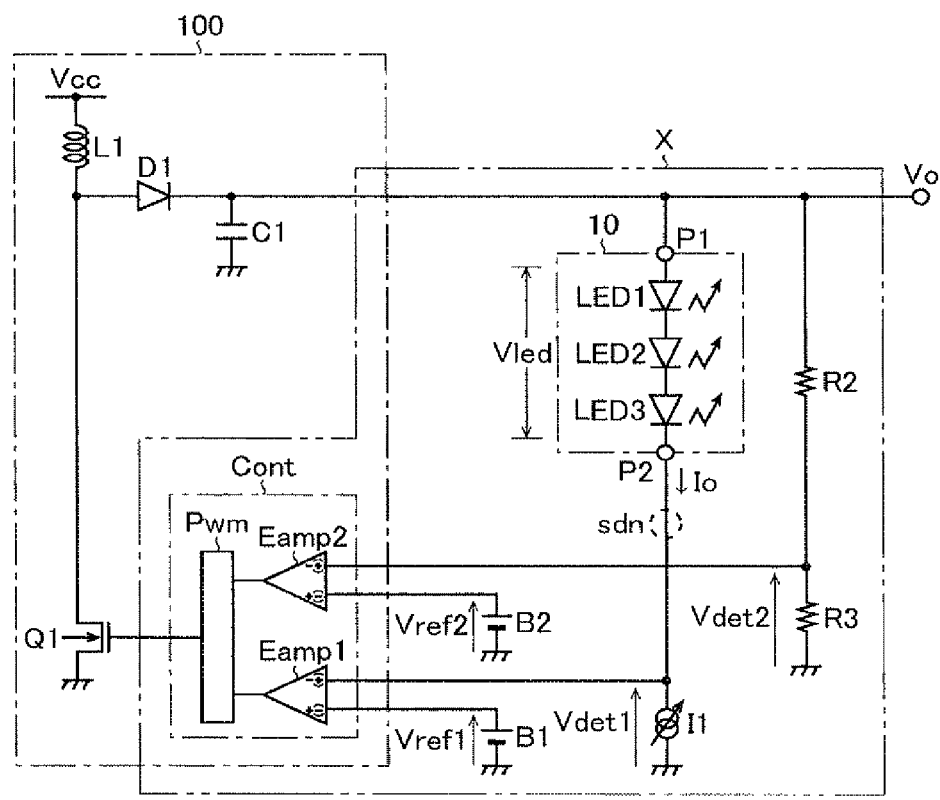
FIG. 48 is a schematic circuit diagram of a load driving device in accordance with a forty-fourth embodiment of the present invention.

FIG. 48 is a view showing a configuration of a load driving device in accordance with a forty-fourth embodiment of the present invention. The load driving device of the forty-fourth embodiment is characterized in that an external load 10 of a single system is connected, that a detection voltage Vdet1 is derived from one end of a constant-current source I1, that the detection voltage Vdet1 and a detection voltage Vdet2 (divided voltage of an output voltage Vo) are respectively inputted into separate error amplifiers Eamp1 and Eamp2, that in pulse-width modulation control circuit Pwm, On duty of a transistor Q1 is determined depending on any one output (one at a higher output voltage level) of the error amplifiers Eamp1 and Eamp2.

Forty-Fifth Embodiment

Figure 49:
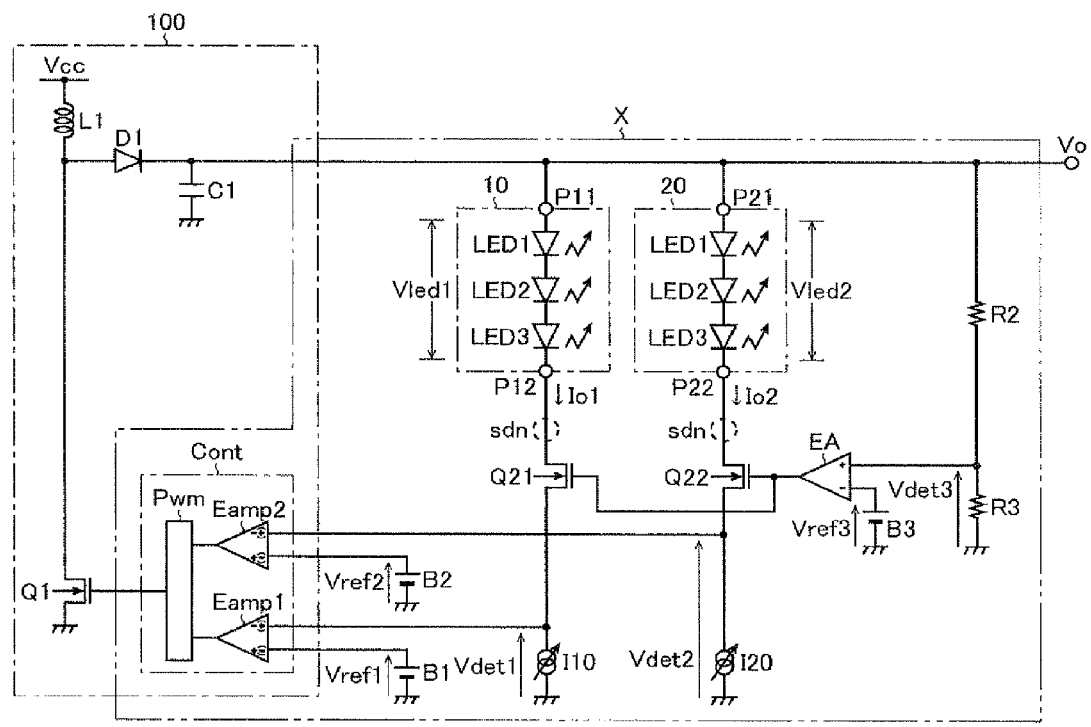
FIG. 49 is a schematic circuit diagram of a load driving device in accordance with a forty-fifth embodiment of the present invention.

FIG. 49 is a view showing a configuration of a load driving device in accordance with a forty-fifth embodiment of the present invention. The load driving device of the forty-fifth embodiment is characterized in that external loads 10 and 20 of multiple systems are connected, that detection voltages Vdet1 and Vdet2 are derived from each one end of constant-current sources I10 and I20, that the detection voltages Vdet1 and Vdet2 are respectively inputted into separate error amplifiers Eamp1 and Eamp2, that in pulse-width modulation control circuit Pwm, On duty of a transistor Q1 is determined depending on any one output (one at a higher output voltage level) of the error amplifiers Eamp1 and Eamp2, and that output feedback circuits (an error amplifier EA, a reference voltage sources B3, and resistances R2 and R3) for controlling continuity level of transistors Q21 and Q22 placed respectively between the external loads 10 and 20 and the constant-current sources I10 and I20, depending on an output voltage Vo, are provided.

Forty-Sixth Embodiment

Figure 50:
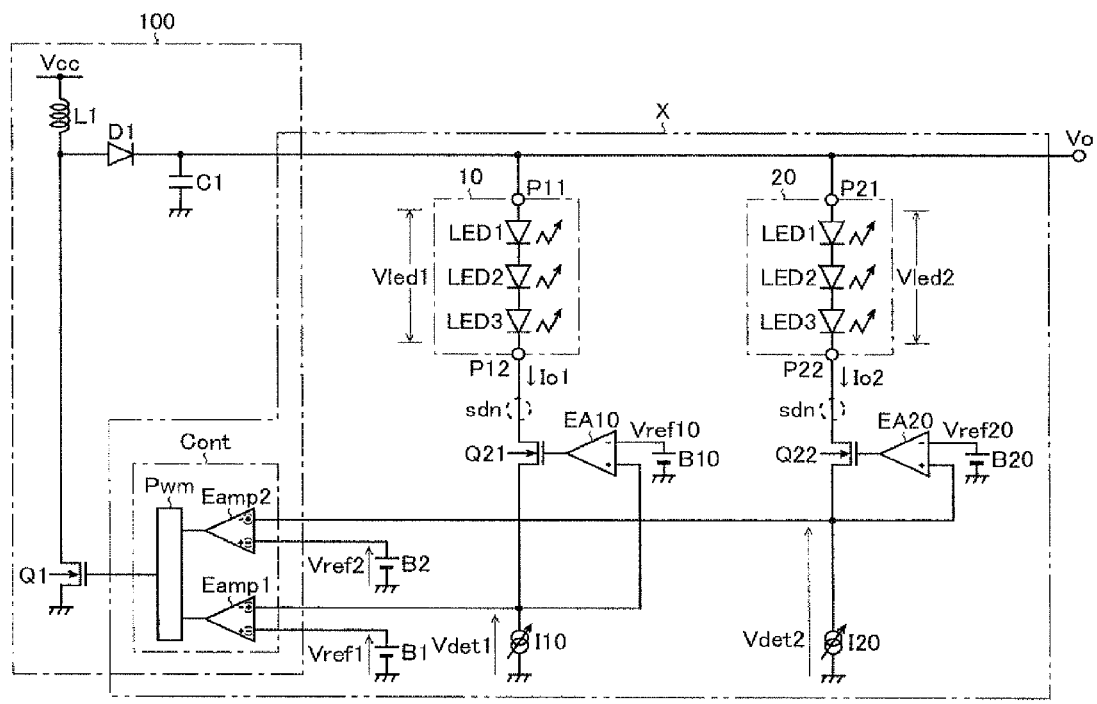
FIG. 50 is a schematic circuit diagram of a load driving device in accordance with a forty-sixth embodiment of the present invention.

FIG. 50 is a view showing a configuration of a load driving device in accordance with a forty-sixth embodiment of the present invention. The load driving device of the forty-sixth embodiment is characterized in that external loads 10 and 20 of multiple systems are connected, that detection voltages Vdet1 and Vdet2 are derived from each one end of constant-current sources I10 and I20, that the detection voltages Vdet1 and Vdet2 are respectively inputted into separate error amplifiers Eamp1 and Eamp2, that in pulse-width modulation control circuit Pwm, On duty of a transistor Q1 is determined depending on any one output (one at a higher output voltage level) of the error amplifiers Eamp1 and Eamp2, and that output feedback circuits (error amplifiers EA10 and EA20 and reference voltage sources B10 and B20) for controlling continuity level of transistors Q21 and Q22 placed respectively between the external loads 10 and 20 and the constant-current sources I10 and I20, depending on drive currents Io1 and Io2 (more specifically, the detection voltages Vdet1 and Vdet2), are provided.

Forty-Seventh Embodiment

Figure 51:
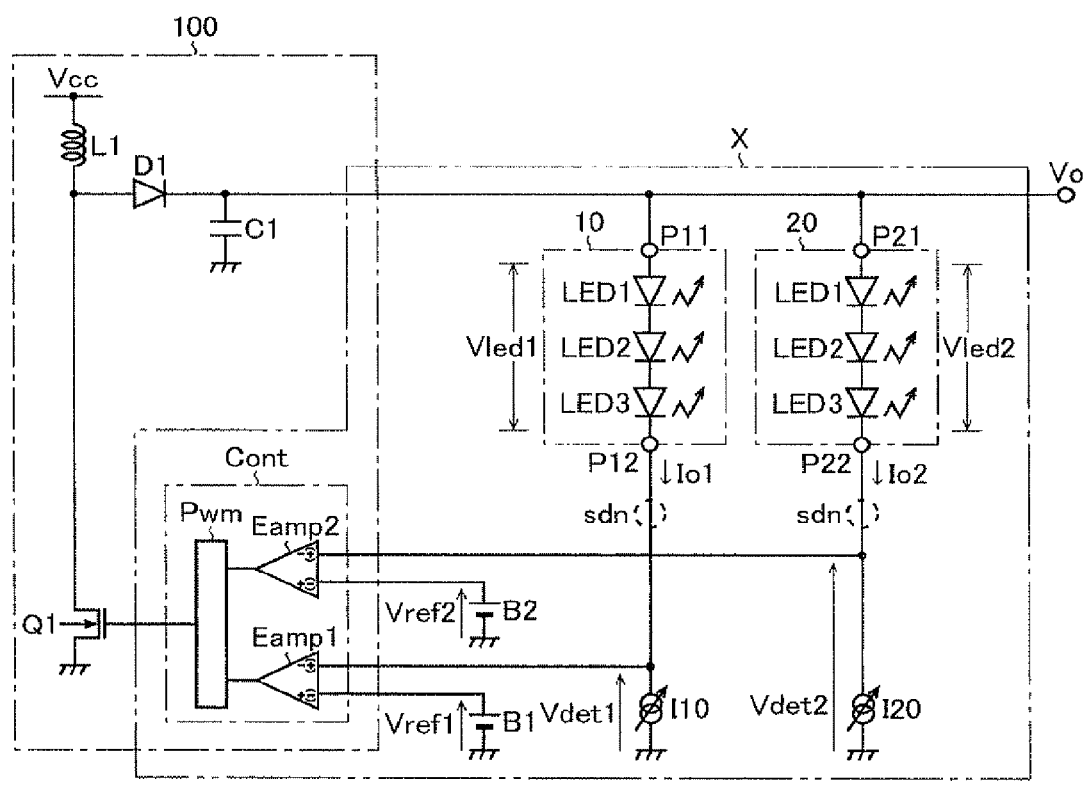
FIG. 51 is a schematic circuit diagram of a load driving device in accordance with a forty-seventh embodiment of the present invention.

FIG. 51 is a view showing a configuration of a load driving device in accordance with a forth-seventh embodiment of the present invention. The load driving device of the forty-seventh embodiment is characterized in that external loads 10 and 20 of multiple systems are connected, that detection voltages Vdet1 and Vdet2 are derived from each one end of constant-current sources I10 and I20, that the detection voltages Vdet1 and Vdet2 are respectively inputted into separate error amplifiers Eamp1 and Eamp2, that in pulse-width modulation control circuit Pwm, On duty of a transistor Q1 is determined depending on any one output (one at a higher output voltage level) of the error amplifiers Eamp1 and Eamp2.

Forty-Eighth Embodiment

Figure 52:
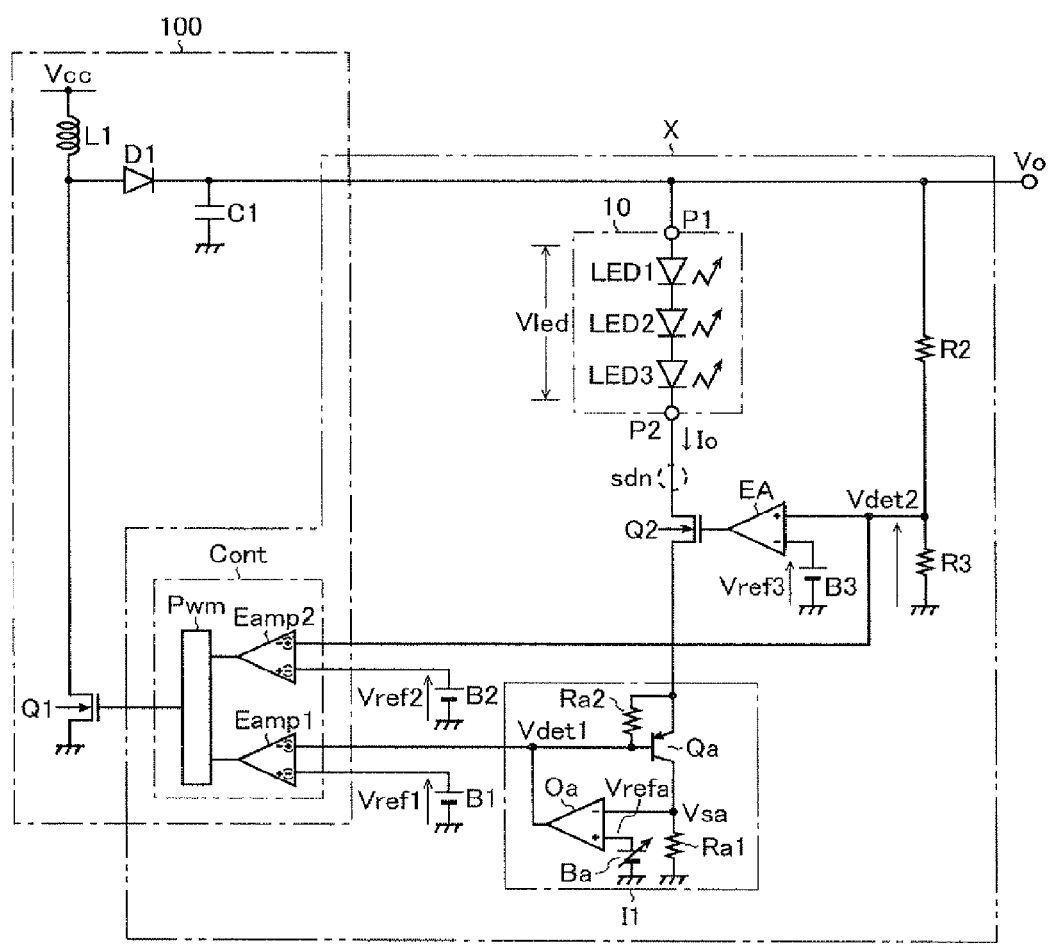
FIG. 52 is a schematic circuit diagram of a load driving device in accordance with a forty-eighth embodiment of the present invention.

FIG. 52 is a view showing a configuration of a load driving device in accordance with a forty-eighth embodiment of the present invention. The load driving device of the forty-eighth embodiment is characterized in that an external load 10 of a single system is connected, that as a constant-current source I1, an internal configuration different from FIG. 3 (a configuration similar to the first constant-current source I10 of the ninth embodiment) is adopted and a position from which a detection voltages Vdet1 is derived has been changed, that detection voltages Vdet1 and Vdet2 (divided voltage of an output voltage Vo) are respectively inputted into separate error amplifiers Eamp1 and Eamp2, that in pulse-width modulation control circuit Pwm, On duty of a transistor Q1 is determined depending on any one output (one at a higher output voltage level) of the error amplifiers Eamp1 and Eamp2, and that output feedback circuits (an error amplifier EA, a reference voltage source B3, and resistances R2 and R3) for controlling continuity level of a transistor Q2 between the external load 10 and the constant-current source I1, depending on an output voltage Vo, are provided.

Forty-Ninth Embodiment

Figure 53:
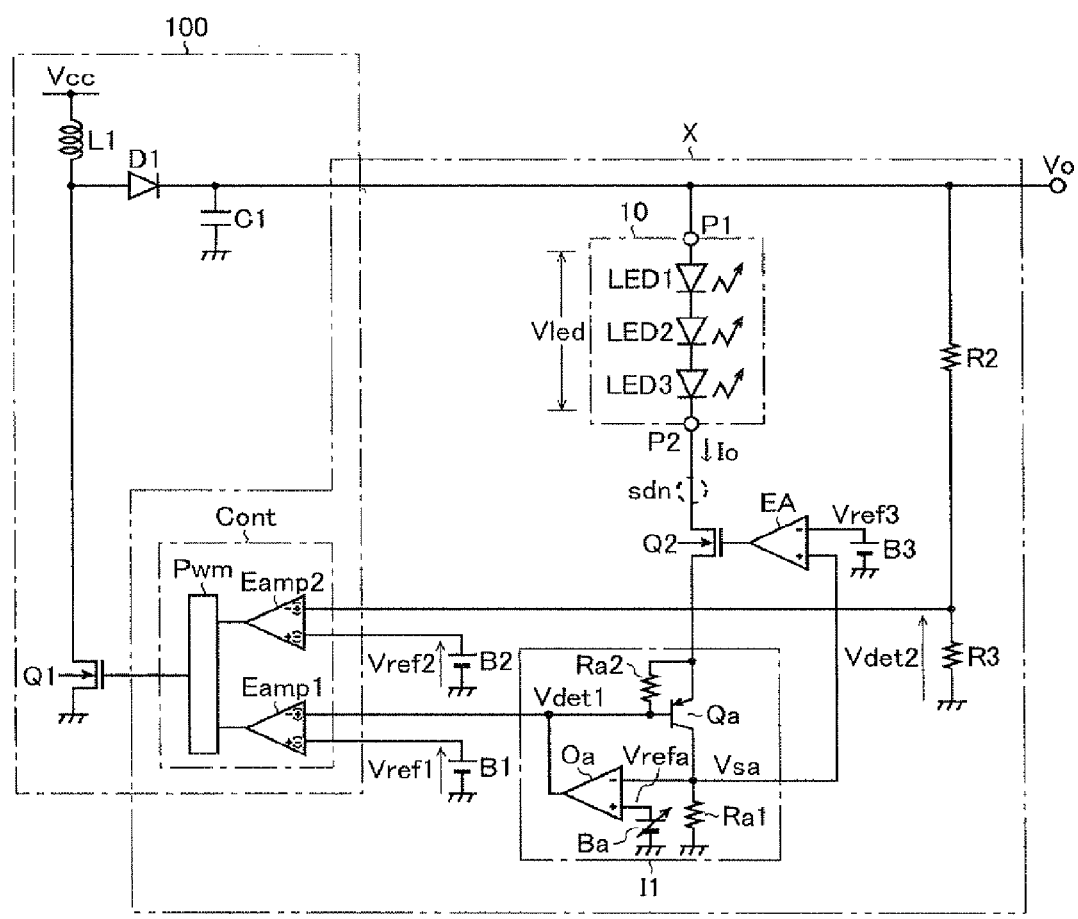
FIG. 53 is a schematic circuit diagram of a load driving device in accordance with a forty-ninth embodiment of the present invention.

FIG. 53 is a view showing a configuration of a load driving device in accordance with a forty-ninth embodiment of the present invention. The load driving device of the forty-ninth embodiment is characterized in that an external load 10 of a single system is connected, that as a constant-current source I1, an internal configuration different from FIG. 3 (a configuration similar to the first constant-current source I10 of the ninth embodiment) is adopted and a position from which a detection voltages Vdet1 is derived has been changed, that detection voltages Vdet1 and Vdet2 (divided voltage of an output voltage Vo) are respectively inputted into separate error amplifiers Eamp1 and Eamp2, that in pulse-width modulation control circuit Pwm, On duty of a transistor Q1 is determined depending on any one output (one at a higher output voltage level) of the error amplifiers Eamp1 and Eamp2, and that output feedback circuits (an error amplifier EA and a reference voltage source B3) for controlling continuity level of a transistor Q2 between the external load 10 and the constant-current source I1, depending on a drive current Io (more specifically, a sense voltage Vsa), are provided.

Fiftieth Embodiment

Figure 54:
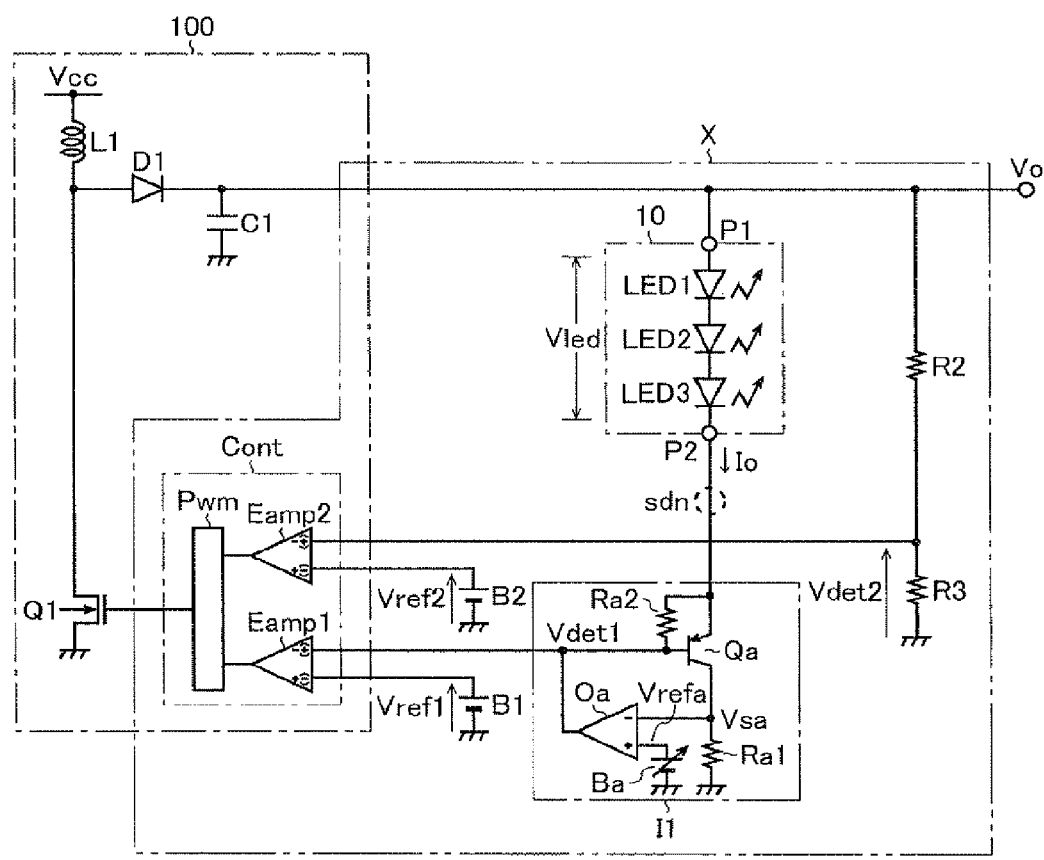
FIG. 54 is a schematic circuit diagram of a load driving device in accordance with a fiftieth embodiment of the present invention.

FIG. 54 is a view showing a configuration of a load driving device in accordance with a fiftieth embodiment of the present invention. The load driving device of the fiftieth embodiment is characterized in that an external load 10 of a single system is connected, that as a constant-current source I1, an internal configuration different from FIG. 3 (a configuration similar to the first constant-current source I10 of the ninth embodiment) is adopted and a position from which a detection voltages Vdet1 is derived has been changed, that detection voltages Vdet1 and Vdet2 (divided voltage of an output voltage Vo) are respectively inputted into separate error amplifiers Eamp1 and Eamp2, and that in pulse-width modulation control circuit Pwm, On duty of a transistor Q1 is determined depending on any one output (one at a higher output voltage level) of the error amplifiers Eamp1 and Eamp2.

Fifty-First Embodiment

Figure 55:
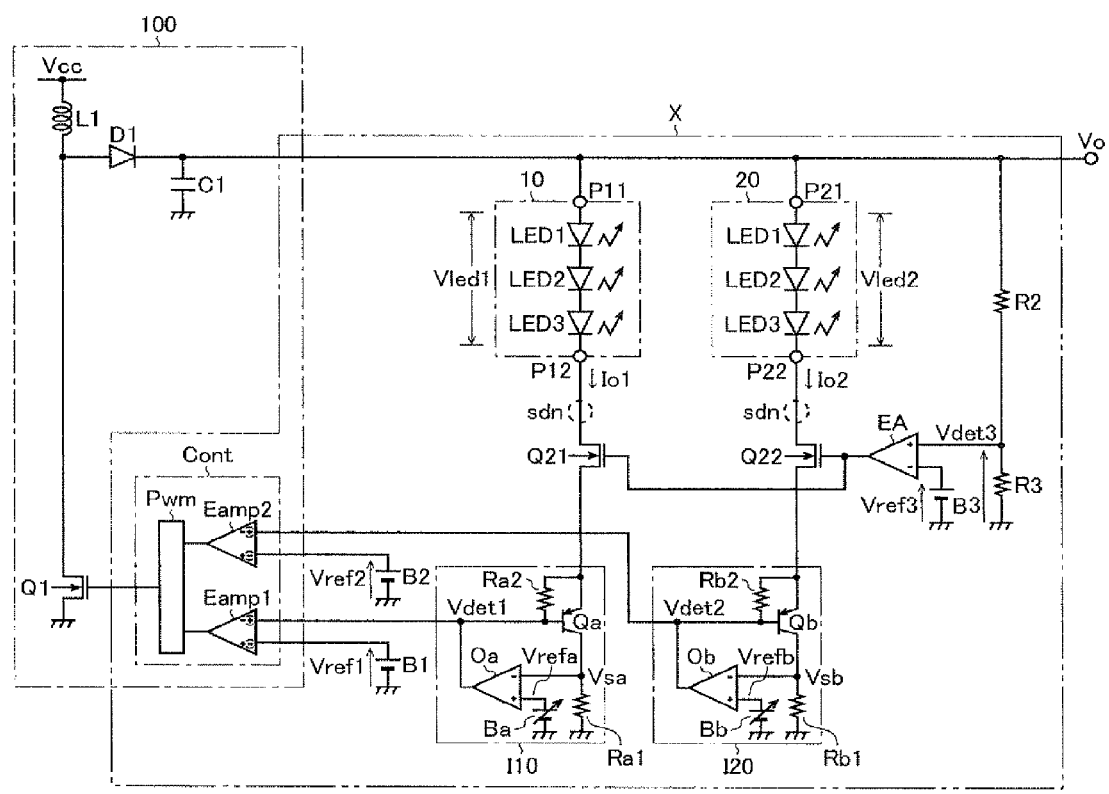
FIG. 55 is a schematic circuit diagram of a load driving device in accordance with a fifty-first embodiment of the present invention.

FIG. 55 is a view showing a configuration of a load driving device in accordance with a fifty-first embodiment of the present invention. The load driving device of the fifty-first embodiment is characterized in that external loads 10 and 20 of multiple systems are connected, that as constant-current sources I10 and I20, an internal configuration different from FIG. 3 (a configuration similar to the ninth embodiment) is adopted and positions from which detection voltages Vdet1 and Vdet2 are derived have been changed, that the detection voltages Vdet1 and Vdet2 are respectively inputted into separate error amplifiers Eamp1 and Eamp2, that in pulse-width modulation control circuit Pwm, On duty of a transistor Q1 is determined depending on any one output (one at a higher output voltage level) of the error amplifiers Eamp1 and Eamp2, and that output feedback circuits (an error amplifier EA, a reference voltage source B3 and resistances R2 and R3) for controlling continuity level of transistors Q21 and Q22 placed respectively between the external loads 10 and 20 and the constant-current sources I10 and I20, depending on an output voltage Vo, are provided.

Fifty-Second Embodiment

Figure 56:
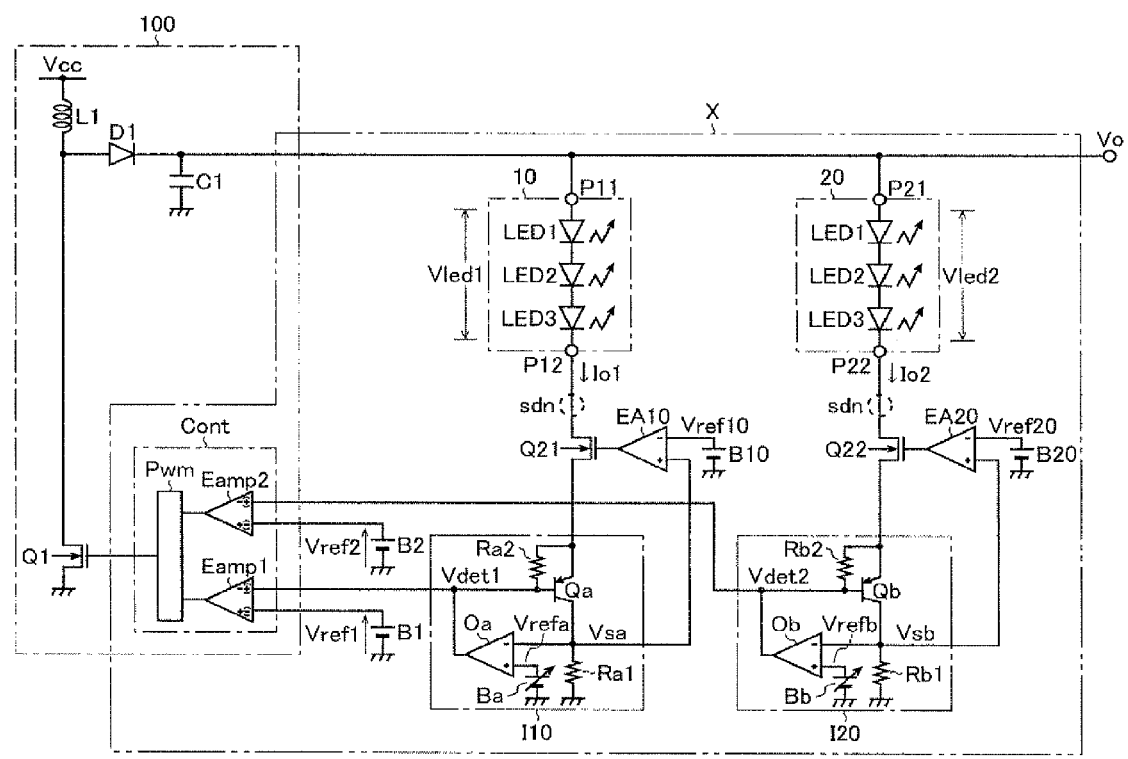
FIG. 56 is a schematic circuit diagram of a load driving device in accordance with a fifty-second embodiment of the present invention.

FIG. 56 is a view showing a configuration of a load driving device in accordance with a fifty-second embodiment of the present invention. The load driving device of the fifty-second embodiment is characterized in that external loads 10 and 20 of multiple systems are connected, that as constant-current sources I10 and I20, an internal configuration different from FIG. 3 (a configuration similar to the ninth embodiment) is adopted and positions from which detection voltages Vdet1 and Vdet2 are derived have been changed, that the detection voltages Vdet1 and Vdet2 are respectively inputted into separate error amplifiers Eamp1 and Eamp2, that in pulse-width modulation control circuit Pwm, On duty of a transistor Q1 is determined depending on any one output (one at a higher output voltage level) of the error amplifiers Eamp1 and Eamp2, and that output feedback circuits (error amplifiers EA10 and EA20 and reference voltage sources B10 and B20) for controlling continuity level of transistors Q21 and Q22 placed respectively between the external loads 10 and 20 and the constant-current sources I10 and I20, depending on drive currents Io1 and Io2 (more specifically, sense voltages Vsa and Vsb), are provided.

Fifty-Third Embodiment

Figure 57:
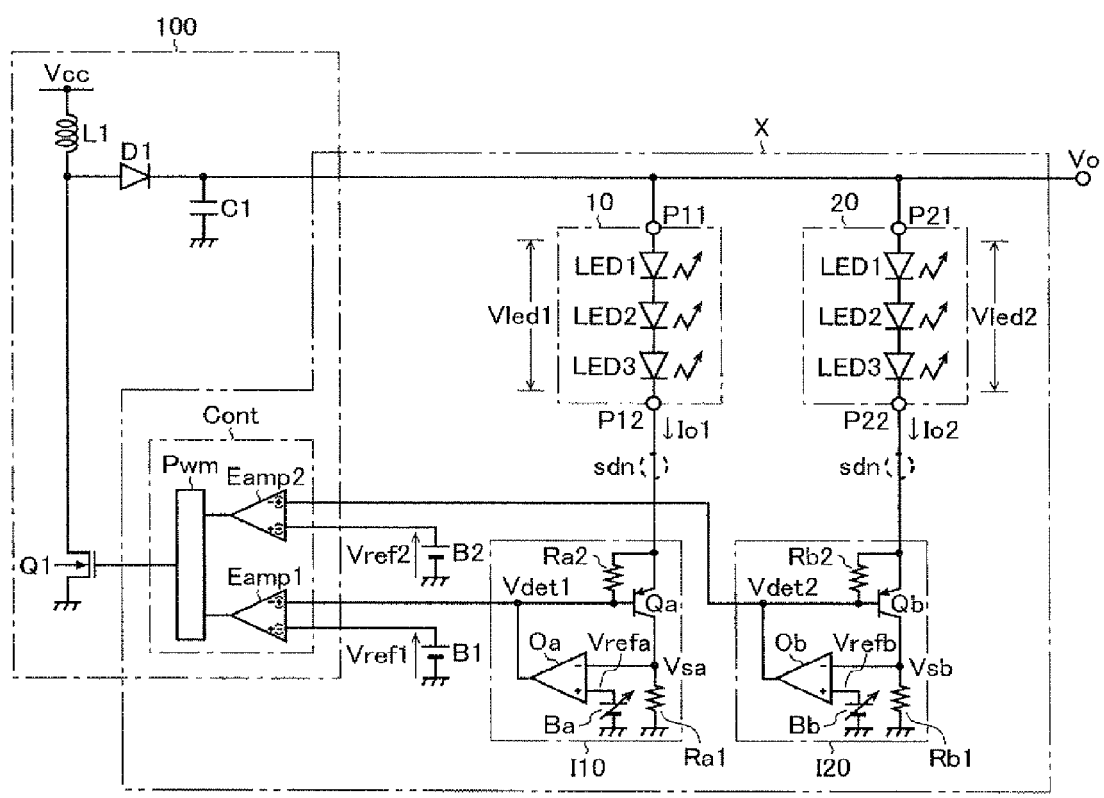
FIG. 57 is a schematic circuit diagram of a load driving device in accordance with a fifty-third embodiment of the present invention.

FIG. 57 is a view showing a configuration of a load driving device in accordance with a fifty-third embodiment of the present invention. The load driving device of the fifty-third embodiment is characterized in that external loads 10 and 20 of multiple systems are connected, that as constant-current sources I10 and I20, an internal configuration different from FIG. 3 (a configuration similar to the ninth embodiment) is adopted and positions from which detection voltages Vdet1 and Vdet2 are derived have been changed, that the detection voltages Vdet1 and Vdet2 are respectively inputted into separate error amplifiers Eamp1 and Eamp2, that in pulse-width modulation control circuit Pwm, On duty of a transistor Q1 is determined depending on any one output (one at a higher output voltage level) of the error amplifiers Eamp1 and Eamp2.

Fifty-Fourth Embodiment

Figure 58:
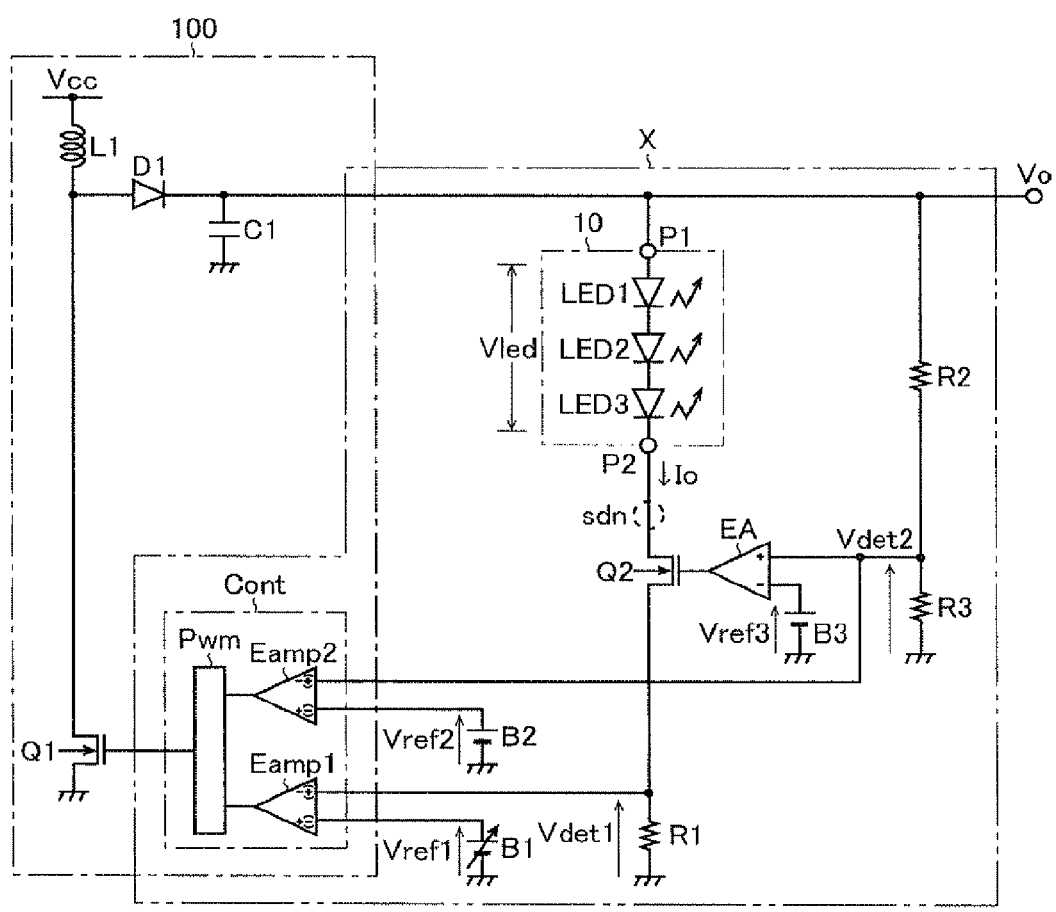
FIG. 58 is a schematic circuit diagram of a load driving device in accordance with a fifty-fourth embodiment of the present invention.

FIG. 58 is a view showing a configuration of a load driving device in accordance with a fifty-fourth embodiment of the present invention. The load driving device of the fifty-fourth embodiment is characterized in that an external load 10 of a single system is connected, that a resistance R1 for current detection is provided at a position of a constant-current source I1 and a detection voltage Vdet1 is derived from one end of the resistance R1, that detection voltages Vdet1 and Vdet2 (divided voltage of an output voltage Vo) are respectively inputted into separate error amplifiers Eamp1 and Eamp2, that in pulse-width modulation control circuit Pwm, On duty of a transistor Q1 is determined depending on any one output (one at a higher output voltage level) of the error amplifiers Eamp1 and Eamp2, and that output feedback circuits (an error amplifier EA, a reference voltage source B3, and resistances R2 and R3) for controlling continuity level of a transistor Q2 between the external load 10 and the resistance R1, depending on an output voltage Vo, are provided.

Fifty-Fifth Embodiment

Figure 59:
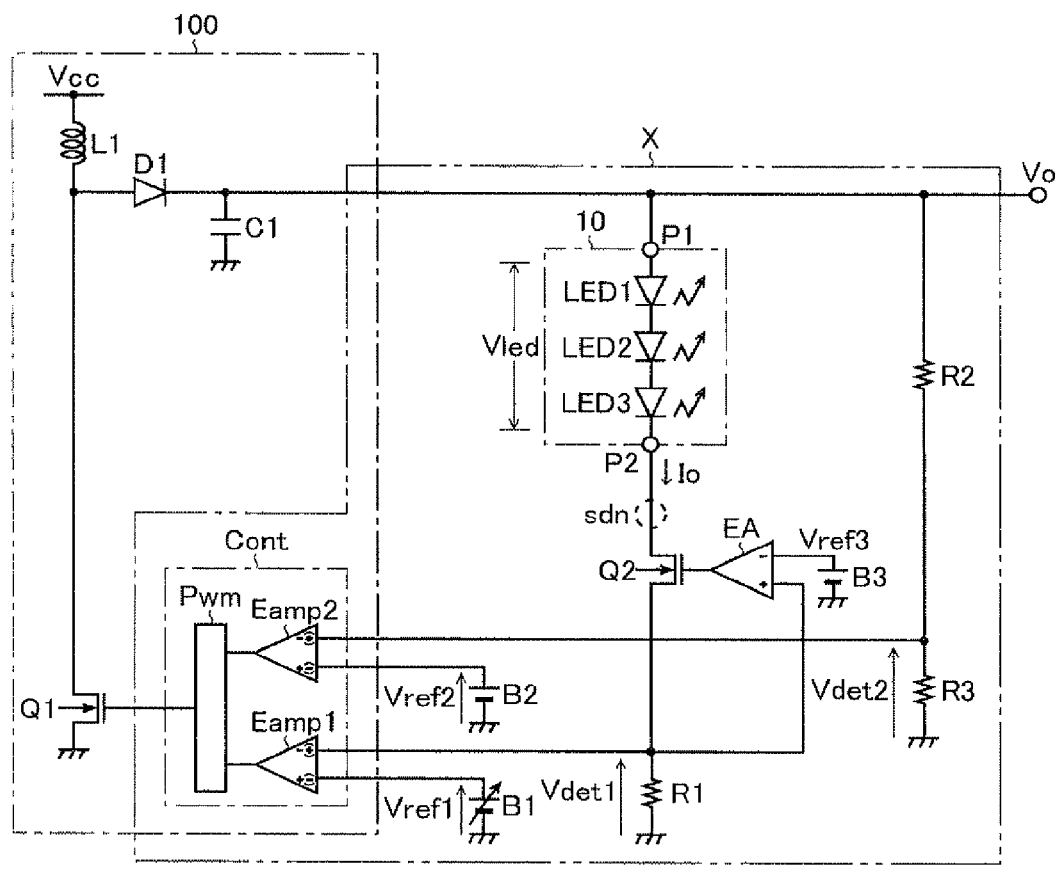
FIG. 59 is a schematic circuit diagram of a load driving device in accordance with a fifty-fifth embodiment of the present invention.

FIG. 59 is a view showing a configuration of a load driving device in accordance with a fifty-fifth embodiment of the present invention. The load driving device of the fifty-fifth embodiment is characterized in that an external load 10 of a single system is connected, that a resistance R1 for current detection is provided at a position of a constant-current source I1 and a detection voltage Vdet1 is derived from one end of the resistance R1, that the detection voltage Vdet1 and a detection voltage Vdet2 (divided voltage of an output voltage Vo) are respectively inputted into separate error amplifiers Eamp1 and Eamp2, that in pulse-width modulation control circuit Pwm, On duty of a transistor Q1 is determined depending on any one output (one at a higher output voltage level) of the error amplifiers Eamp1 and Eamp2, and that output feedback circuits (an error amplifier EA and a reference voltage source B3) for controlling continuity level of a transistor Q2 between the external load 10 and the resistance R1, depending on a drive current Io (more specifically, the detection voltage Vdet1), are provided.

Fifty-Sixth Embodiment

Figure 60:
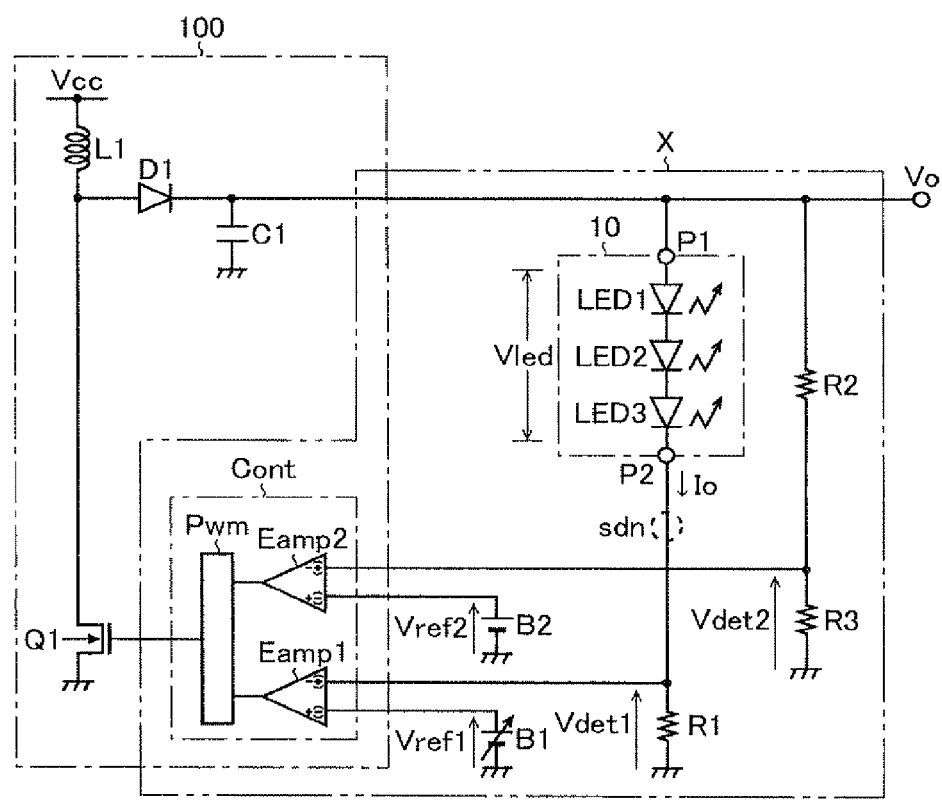
FIG. 60 is a schematic circuit diagram of a load driving device in accordance with a fifty-sixth embodiment of the present invention.

FIG. 60 is a view showing a configuration of a load driving device in accordance with a fifty-sixth embodiment of the present invention. The load driving device of the fifty-sixth embodiment is characterized in that an external load 10 of a single system is connected, that a resistance R1 for current detection is provided at a position of a constant-current source I1 and a detection voltage Vdet1 is derived from one end of the resistance R1, that the detection voltage Vdet1 and a detection voltage Vdet2 (divided voltage of an output voltage Vo) are respectively inputted into separate error amplifiers Eamp1 and Eamp2, and that in pulse-width modulation control circuit Pwm, On duty of a transistor Q1 is determined depending on any one output (one at a higher output voltage level) of the error amplifiers Eamp1 and Eamp2.

Fifty-Seventh Embodiment

Figure 61:
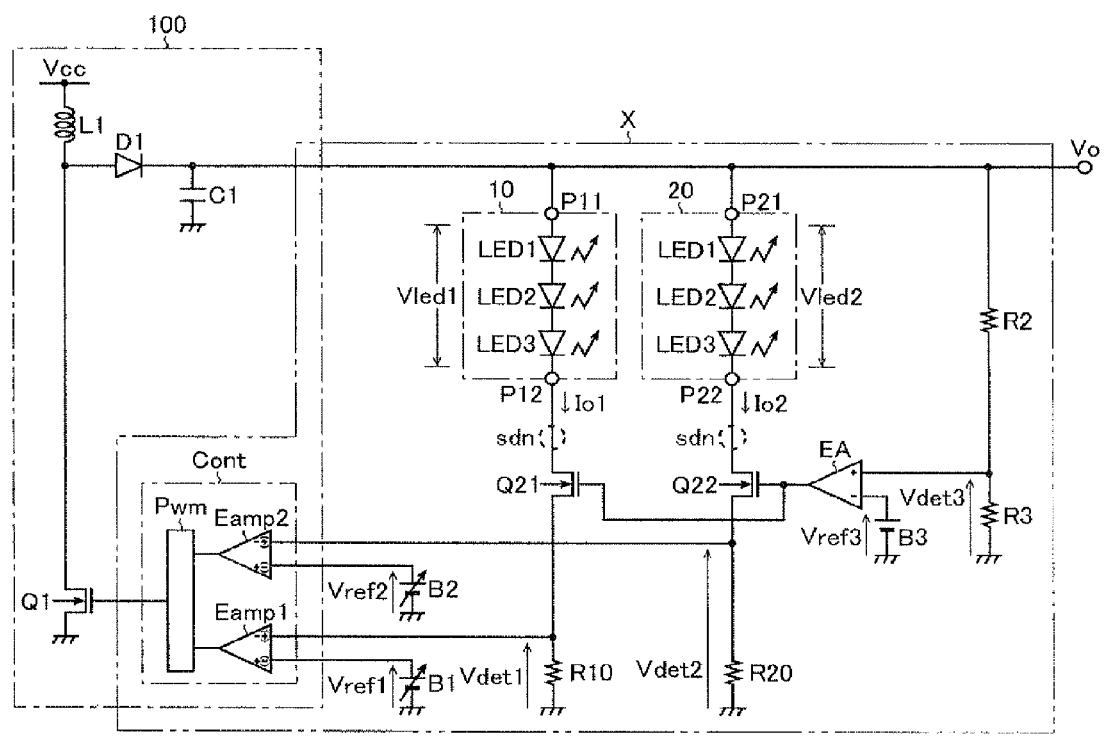
FIG. 61 is a schematic circuit diagram of a load driving device in accordance with a fifty-seventh embodiment of the present invention.

FIG. 61 is a view showing a configuration of a load driving device in accordance with a fifty-seventh embodiment of the present invention. The load driving device of the fifty-seventh embodiment is characterized in that external loads 10 and 20 of multiple systems are connected, that resistances R10 and R20 for current detection are provided at positions of constant-current sources I10 and I20 and detection voltages Vdet1 and Vdet2 are derived from one end of each, that the detection voltages Vdet1 and Vdet2 are respectively inputted into separate error amplifiers Eamp1 and Eamp2, that in pulse-width modulation control circuit Pwm, On duty of a transistor Q1 is determined depending on any one output (one at a higher output voltage level) of the error amplifiers Eamp1 and Eamp2, and that output feedback circuits (an error amplifier EA, a reference voltage source B3, and resistances R2 and R3) for controlling continuity level of transistors Q21 and Q22 placed respectively between the external loads 10 and 20 and the resistances R10 and R20, depending on an output voltage Vo, are provided.

Fifty-Eighth Embodiment

Figure 62:
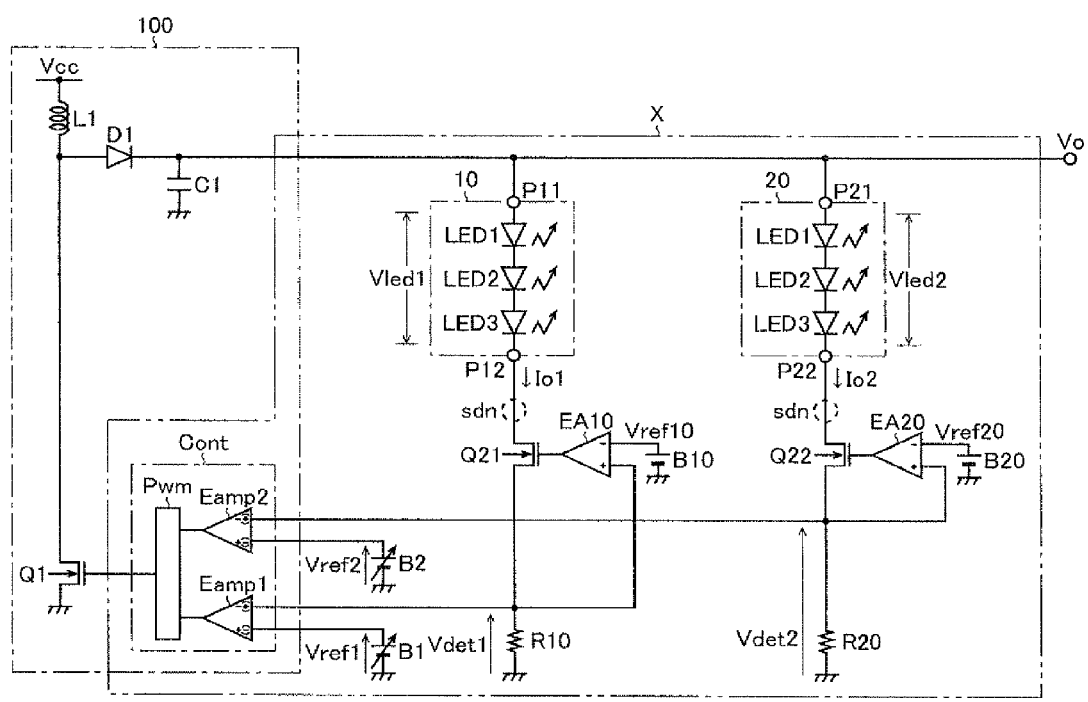
FIG. 62 is a schematic circuit diagram of a load driving device in accordance with a fifth-eighth embodiment of the present invention.

FIG. 62 is a view showing a configuration of a load driving device in accordance with a fifty-eighth embodiment of the present invention. The load driving device of the fifty-eighth embodiment is characterized in that external loads 10 and 20 of multiple systems are connected, that resistances R10 and R20 for current detection are provided at positions of constant-current sources I10 and I20 and detection voltages Vdet1 and Vdet2 are derived from one end of each, that the detection voltages Vdet1 and Vdet2 are respectively inputted into separate error amplifiers Eamp1 and Eamp2, that in pulse-width modulation control circuit Pwm, On duty of a transistor Q1 is determined depending on any one output (one at a higher output voltage level) of the error amplifiers Eamp1 and Eamp2, and that output feedback circuits (error amplifiers EA10 and EA20 and reference voltage sources B10 and B20) for controlling continuity level of transistors Q21 and Q22 placed respectively between the external loads 10 and 20 and the resistances R10 and R20, depending on drive currents Io1 and Io2 (more specifically, the detection voltages Vdet1 and Vdet2), are provided.

Fifth-Ninth Embodiment

FIG. 63 is a view showing a configuration of a load driving device in accordance with a fifty-ninth embodiment of the present invention. The load driving device of the fifty-ninth embodiment is characterized in that external loads 10 and 20 of multiple systems are connected, that resistances R10 and R20 for current detection are provided at positions of constant-current sources I10 and I20 and detection voltages Vdet1 and Vdet2 are derived from one end of each, that the detection voltages Vdet1 and Vdet2 are respectively inputted into separate error amplifiers Eamp1 and Eamp2, and that in pulse-width modulation control circuit Pwm, On duty of a transistor Q1 is determined depending on any one output (one at a higher output voltage level) of the error amplifiers Eamp1 and Eamp2.

(Variations of Power Supply Circuits)

In the first to fifty-ninth embodiments described above, although a description was given by taking as an example a switching power supply circuit 100 of boost type which raises an input voltage Vcc to generate an output voltage Vo1 or Vo, the present invention can be applied to power supply circuits in general which generate a detection voltage which varies depending on a magnitude of a forward dropping voltage of an external load and perform output feedback control of the output voltage on the basis of the detection voltage. That is to say, various changes can be made to an output format of the power supply circuit, and it can be said that such modifications are included in a technical scope of the load driving devices disclosed in the specification. In the following, one example of the variations of the power supply circuits will be described briefly with reference to the drawings.

Figure 64:
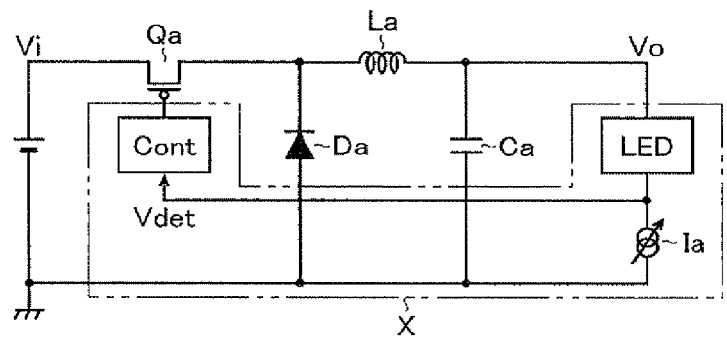
FIG. 64 is a view showing an example of the application to a switching power supply circuit of step-down voltage type.

FIG. 64 is a view showing an example of the application of a switching power supply circuit of step-down voltage type. The switching power supply circuit of step-down voltage type shown in FIG. 64 has a P-channel type MOS field-effect transistor Qa, a coil La, a diode Da, a capacitor Ca, a constant-current source Ia, and a control circuit Cont, lowers an input voltage Vi to generate a desired output voltage Vo, and supplies the output voltage Vo to an LED (external load).

Figure 65:
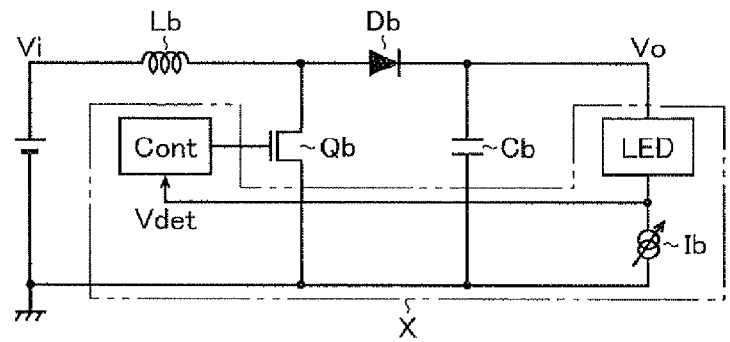
FIG. 65 is a view showing an example of the application to a switching power supply circuit of step-up voltage type.

FIG. 65 is a view showing an example of the application of a switching power supply circuit of step-up voltage type. The switching power supply circuit of step-up voltage type shown in FIG. 65 has an N-channel MOS field-effect transistor Qb, a coil Lb, a diode Db, a capacitor Cb, a constant-current source Ib, and a control circuit Cont, boosts an input voltage Vi to generate a desired output voltage Vo, and supplies the output voltage Vo to an LED (external load).

Figure 66:
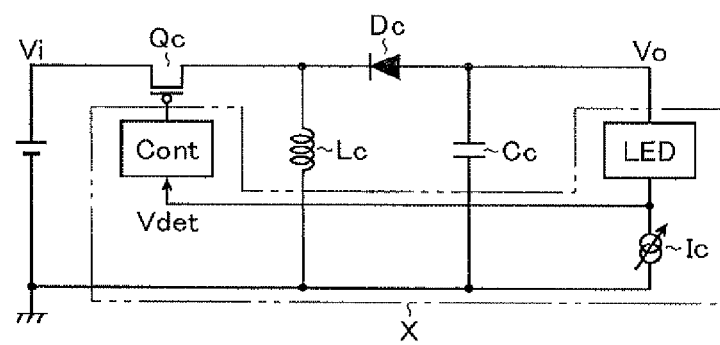
FIG. 66 is a view showing an example of the application to a switching power supply circuit of inverting type.

FIG. 66 is a view showing an example of the application to a switching power supply circuit of inverting type. The switching power supply circuit of inverting type shown in FIG. 66 has a P-channel type MOS field-effect transistor Qc, a coil Lc, a diode Dc, a capacitor Cc, a constant-current source Ic, and a control circuit Cont, inverts plus and minus of an input voltage V1 to generate a desired output voltage Vo, and supplies the output voltage Vo to an LED (external load).

Figure 67:
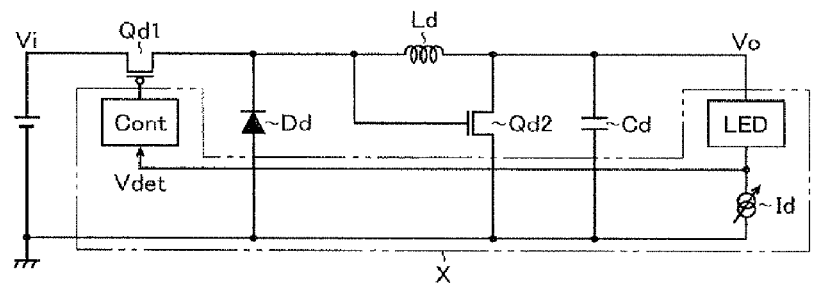
FIG. 67 is a view showing an example of the application to a switching power supply circuit of step-up/down voltage type of REGSEPIC type.

FIG. 67 is a view showing an example of the application to a switching power supply voltage of step-up/down voltage type of REGSEPIC type. The switching power supply circuit of step-up/down voltage type shown in FIG. 67 has a P-channel type field-effect transistor Qd1, an N-channel type MOS field-effect transistor Qd2, a coil Ld, a diode Dd, a capacitor Cd, a constant-current source Id, and a control circuit Cont, boosts or lowers an input voltage V1 to generate a desired output voltage Vo, and supplies the output voltage Vo to an LED (external load).

Figure 68:
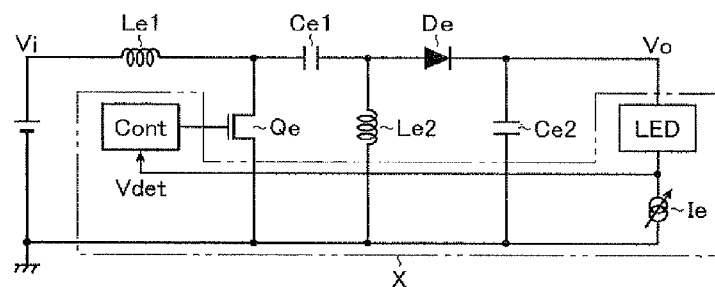
FIG. 68 is a view showing an example of the application to a switching power supply circuit of step-up/down voltage type of SEPIC type.

FIG. 68 is a view showing an example of the application to a switching power supply circuit of step-up/down voltage type of SEPIC (single ended primary inductance converter) type. The switching power supply circuit of step-up/down voltage type shown in FIG. 68 has an N-channel type MOS field-effect transistor Qe, a coil Le1 and a coil Le2, a diode De, a capacitor Ce1 and a capacitor Ce2, a constant-current source Ie, and a control circuit Cont, boosts or lowers an input voltage Vi to generate a desired output voltage Vo, and supplies the output voltage Vo to an LED (external load).

Figure 69:
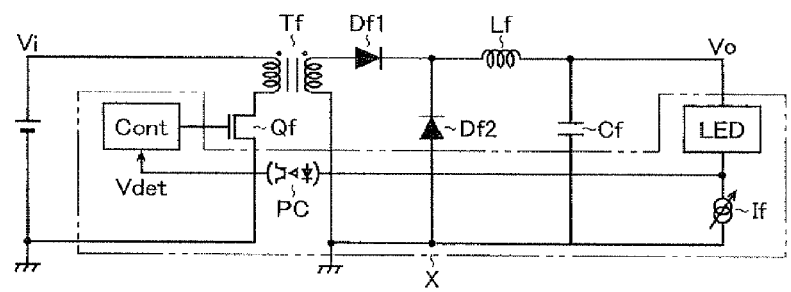
FIG. 69 is a view showing an example of the application to a switching power supply circuit of transformer type (forward method).

FIG. 69 is a view showing an example of the application to a switching power supply circuit of transformer type (forward method). The switching power supply circuit of transformer type (forward method) shown in FIG. 69 has an N-channel type MOS field-effect transistor Qf, a transformer Tf, a coil Lf, a diode Df1 and a diode Df2, a capacitor Cf, a constant-current source If, a control circuit Cont, and a photocoupler Pc, generates from an input voltage Vi a desired output voltage Vo corresponding to a winding ratio of the transformer Tf, and supplies the output voltage Vo to an LED (external load).

Any of the power supply device of various types shown in FIG. 64 to FIG. 69 generates a detection voltage Vdet which varies depending on a magnitude of a forward dropping voltage of an LED (external load), and performs output feedback control of an output voltage Vo on the basis of the detection voltage Vdet.

In addition, as a circuit block X (part surrounded by the chain double-dashed line) shown in FIG. 64 to FIG. 69, the circuit block X shown in any of FIG. 1, FIG. 5, FIG. 6, and FIG. 8 to FIG. 63 described earlier may be applied.

(PWM Control when Multiple Channels are Driven)

Figure 70:
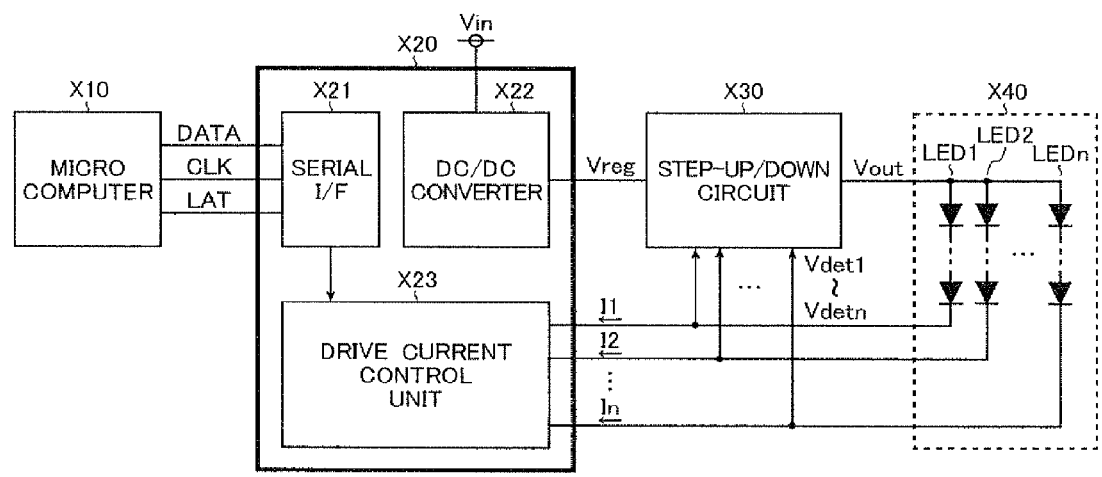
FIG. 70 is a block diagram showing an electronic device comprising the load driving device in accordance with the present invention.

FIG. 70 is a block diagram showing an electronic device comprising the load driving device (light-emitting diode driving device) in accordance with the present invention.

The electronic device shown in FIG. 70 has a microcomputer X10, a light-emitting diode driving device X20, a step-up/down circuit X30, and a light emitting part x40.

The microcomputer X10 is a means for collectively controlling the operation of the electronic device, such as sending a luminance control command to the light-emitting driving device X20.

The light-emitting diode driving device X20 is a semiconductor integrated circuit device (LED driver IC), comprising a serial interface unit X21, a DC/DC converter unit X22, and a drive current control unit X23, which are integrated.

The serial interface unit X21 is a means for receiving the luminance control command inputted from the microcomputer X10, and conveying this to the drive current control unit X23. In FIG. 70, although a configuration of receiving the luminance control command (data signal DATA, a clock signal CLK, and a latch signal LAT indicative of a light emitted diode to be turned on, or on duty and drive current value thereof) by way of a three-line serial bus (I2C bus or the like) was exemplified, the configuration of the present invention is not limited to this, and a two-line serial bus or a parallel bus may also be used.

The DC/DC converter unit X22 is a means for stabilizing an input voltage Vin to generate a desired constant voltage Vreg.

The drive current control unit 23 is a means for generating drive currents (drive currents (I1 to In) to be supplied to each of light-emitting diode rows LED1 to LEDn of n channels (n≥2) forming a light emitting part x40) of the light emitting part x40 according to the luminance control command inputted from the microcomputer X10 and controlling PWM [Pulse Width Modulation] thereof. Such PWM control enables arbitrary adjustment of light-emitting luminance (and thus light-emitting luminance of the light emitting part x40) of light-emitting diode rows LED1 to LEDn, by variably controlling apparent current values (average current values) of drive currents I1 to In. The drive current control unit X23 can be considered a circuit block corresponding to the first constant-current source I10 and the second constant-current source I20 in the second embodiment (see FIG. 5), the sixth to eighth embodiments (see FIG. 10 to FIG. 12), the twenty-seventh to twenty-ninth embodiments (see FIG. 1 to FIG. 33), mentioned above. The operation of the drive current control unit X23 will be described in detail later.

The step-up/down circuit X30 is a means for boosting or lowering a constant voltage Vreg generated by the DC/DC converter X22 to generate a desired drive voltage Vout and supplying it to the light emitting part x40 (anode ends of the light-emitting diode rows LED1 to LEDn). The step-up/down circuit X30 can be considered a circuit block corresponding to the power supply circuit 100 in the first to fifty-ninth embodiments mentioned above. That is to say, the step-up/down circuit X30 is configured to perform output feedback control of a drive voltage Vout, so that among the first detection voltage Vdet1 to the nth detection voltage Vdetn each voltage level of which varies depending on a magnitude of each forward dropping voltage of the light-emitting diode rows LED1 to LEDn, a detection voltage at the lowest pressure level corresponds to a predetermined reference voltage. In addition, as such output feedback control is similar to the first embodiment to the fifty-ninth embodiments mentioned above, a redundant description will be omitted. Although FIG. 70 exemplifies a configuration in which the step-up/down circuit X30 is connected to the external of the light-emitting diode driving device X20, the configuration of the present invention is not limited to this, and similar to the first embodiment to the fifty-ninth embodiment mentioned above, the step-up/down circuit X30 may be built-in in the light-emitting diode driving device X20.

The light emitting part x40 comprises light-emitting diodes LED1 to LEDn of n channels connected to an anode as a common end in parallel, and is used as a backlight for illuminating a liquid crystal display television or a liquid crystal monitor for car navigation, for example. In addition, the number of serial columns of the light-emitting diode rows LED1 to LEDn is not necessarily more than one and a single light-emitting diode may be provided for each channel.

PWM control of drive currents I1 to In by the drive current control unit X23 will be described in detail hereinafter with reference to FIG. 71.

Figure 71:
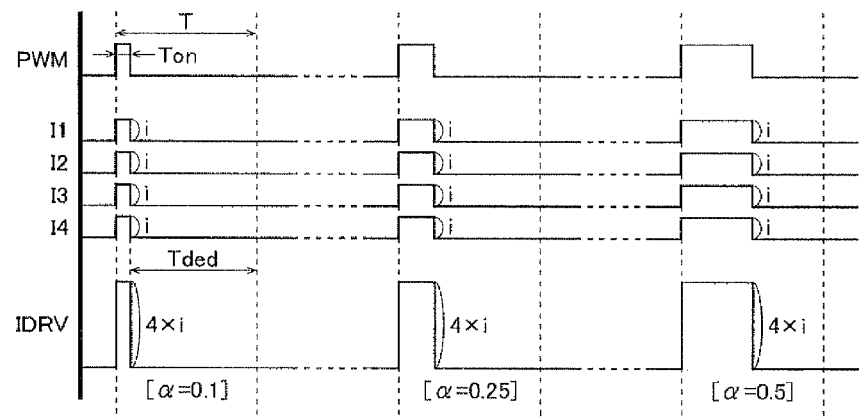
FIG. 71 is a waveform chart showing one embodiment of PWM control.
Figure 71:
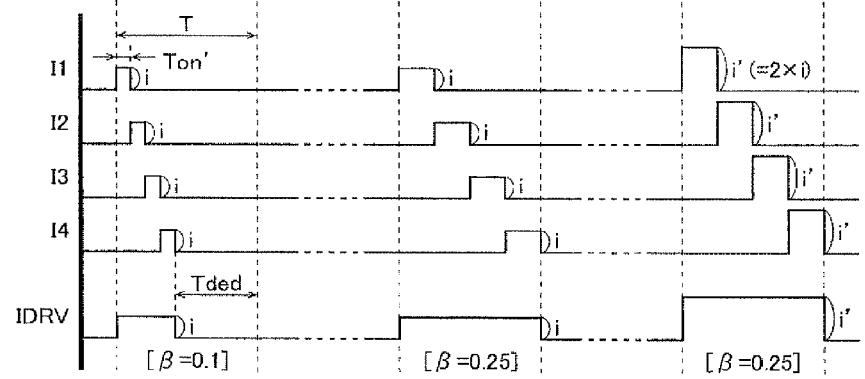

FIG. 71 is a waveform chart showing one embodiment of PWM control. The upper and lower stages of the figure, respectively, illustrate how PWM control was performed conventionally and how PWM control of the present invention is performed, with cycles T corresponding to each other.

In addition, the symbol PWM given at the left end of the figure shows a logical condition of the PWM signal, and the symbols 11 to 14 denote current waveforms of the drive currents to be supplied to each of the 4-channel light-emitting diode rows LED1 to LED4. In addition, the symbol IDRV shows a current waveform of a total drive currents IDRV (total current of the drive currents I1 to I4) to be supplied from the drive current control unit X23 to the light emitting part x40. In addition, the symbol T in the figure denotes a cycle of PWM control, and the symbols Ton, Ton' denote the on period of PWM control. In addition, the symbol i in the figure denotes a current value of the drive currents I1 to I14.

As shown in the figure, for the light-emitting diode rows LED1 to LED4 of all 4 channels, the light-emitting diode driving device X20 is configured to supply the drive currents I1 to I4 (a current value I for any channel) by shifting each on period Ton' so that each of the channels will not turn on simultaneously. More specifically, the light-emitting diode driving device X20 is configured to turn on the light-emitting diode row of one channel, and then turn on the light-emitting diode row of a next channel after the on period Ton' has elapsed.

With such configuration, unlike the conventional PWM control in which the drive currents I1 to I4 were supplied at the same timing to the light-emitting diode rows LED1 to LED4 of all the four channels, a peak value of the drive currents IDRV can be reduced to each current value i of the drive currents I1 to I4, by preventing the drive currents IDRV (=4×i) for the four channels from flowing at a time during the on period of PWM control. In other words, with the above configuration, as the timing of heat generation of the light-emitting diode driving device X20 is uniformly distributed, the heat generation efficiency thereof will rise. Thus, it becomes possible to reduce allowable dissipation of a package and achieve a small footprint or cost reduction.

Since the human visual system perceives magnitude of luminance according to total energy amount to be given in unit time, sensible luminance will not change considerably if PWM control method of the present invention is adopted.

In addition, frequency (1/T) of PWM control may be set to a number of frames of a displayed image (e.g., 30 [fps]) or frequency of a commercial AC power supply (50/60 [Hz]), and any frequency which does not match these multiples. By performing such frequency setting, it becomes possible to prevent flickering in display images or illuminating light due to flashing of the lighting system 40.

Incidentally, when on duty of the conventional PWM control is α (α≥0) and when on duty of the PWM control of the present invention is β (β≥0), the on period Ton of PWM control of the conventional PWM control and the on period Ton' of PWM control of the present invention are expressed in the following expressions (1) and (2), respectively.

$$Ton = \alpha \times T \quad (1)$$

$$Ton' = \beta \times T \quad (2)$$

Hence, when the number of channels in the light-emitting diode row is n, a blank period Tded of the conventional PWM control and a blank period Tded' of PWM control of the present invention can be expressed in the following expressions (3) and (4), respectively.

$$Tded = T - Ton = (1-\alpha) \times T \quad (3)$$

$$Tded' = T - Ton' \times n = (1-\beta \times n) \times T \quad (4)$$

Now the blank periods Tded, Tded' should be Tded≥0, Tded'≥0, a range of on duty α, β that can be set is expressed by the following expressions (5) and (6):

$$0 \leq \alpha \leq 1 \quad (5)$$

$$0 \leq \beta \leq 1/n \quad (6)$$

As can be seen from the expression (5), expression (6) above, in PWM control of the present invention, there arises a restriction on an upper limit value (1/n) of the on duty β, depending on the number of channels n in the light-emitting diode rows. For example, when the light-emitting diode rows LED1 to LED4 of the four channels are driven, the on duty β cannot be set to more than 0.25 (=1/4).

Consequently, in order to obtain the light-emitting luminance (light-emitting luminance comparable to 0.25≤α≤1 in the conventional PWM control) higher than this, current values of the drive current should be increased from i to i' after the on duty β has reached a predetermined upper limit value (0.25).

Since total charges (then total drive currents) to be consumed in a cycle T to obtain identical light-emitting efficiency is equal in PWM control of the present invention (channel distributed control) as well as in the conventional PWM control (channel synchronization control), the following expression (7) is true.

$$n \times i \times Ton/T = n \times i' \times Ton'/T$$

$$n \times i \times \alpha = n \times i' \times \beta \quad (7)$$

From the expression (7) above, a necessary current value i' can be calculated from the following expression (8), $$i' = (\alpha/\beta) \times i \quad (8)$$

For example, when the light-emitting diode rows LED1 to LED4 of the four channels are driven and the upper limit value of the on duty β in PWM control of the present invention is 0.25, it can be seen that in order to obtain the light-emitting luminance corresponding to the on duty α=0.5 of the conventional PWM control, the current value i' of the drive current may be increased to 2×i.

Thus, the light-emitting diode driving device X20 is such configured that it performs PWM control only for the drive currents I1 to I4, unless the on duty β of the drive currents I1 to I4 has reached the upper limit value (0.25), and if the on duty β of the drive currents I1 to I4 has reached the upper limit value (0.25), it performs not only PWM control of the drive currents I1 to I4 but also current value control of the drive currents I1 to I4. Such configuration makes it possible to variably control the light-emitting luminance widely in a setting range similar to the conventional range, while reducing a peak value of the drive current IDRV flowing through the drive current control unit X23.

In addition, in FIG. 70, although the description was given by taking as an example a configuration in which the light-emitting diode rows LED1 to LED4 of the four channels are to be driven, the configuration of the present invention is not limited to this, and the number of channels of the light-emitting diode rows may be increased or decreased, as appropriate.

In addition, in FIG. 70, although the description was given by taking as an example a configuration in which for the light-emitting diode rows LED1 to LED4 of the all four channels, the drive currents I1 to I4 are supplied by shifting each on period so that each of the channels will not turn on simultaneously, the configuration of the present invention is not limited to this. As long as the configuration is such that it supplies the drive currents by shifting each on period so that the light-emitting diode rows in at least one channel are prevented from turning on simultaneously with the light-emitting diode rows of the remaining channels, it becomes possible to reduce the peak value of the drive current IDRV flowing through the drive current control unit X23 lower than the conventional peak value.

In addition, in FIG. 70, although the description was given by taking as an example a configuration in which immediately after light-emitting diode rows of one channel are turned off, light-emitting diode rows of other channels are turned on, the configuration of the present invention is not limited to this. The configuration may be such that drive currents are supplied and controlled so that there is a predetermined simultaneous off period until light-emitting diode rows of other channels are turned on after light-emitting diode rows of one channel are turned off. With such configuration, it becomes possible to prevent a transient temperature rise which occurs after a previous channel turns off from overlapping a temperature rise which accompanies turn-on of a next channel, and thus to improve the efficiency of heat dissipation thereof.

Also, in FIG. 70, although the description was given by taking as an example a configuration in which current value control of drive currents starts after on duty of the drive currents has reached a predetermined upper limit value, the configuration of the present invention is not limited to this and may be such that the current value control of the drive currents is performed even before the on duty reaches the upper limit value.

In addition, in FIG. 70, although the description was given by taking as an example a configuration in which the microcomputer X10 inputs a luminance control command (data signal DATA, clock signal CLK, latch signal LAT) to the light-emitting diode driving device X20, the configuration of the present invention is not limited to this illustration, and may be such that a PWM signal of each channel is individually inputted from the microcomputer X10.

In the above, although the description was given regarding the best mode of the invention, it is obvious to those skilled in the art that the disclosed invention can make modifications in various manners, and that various embodiments which are different from the configurations specifically described above can be made. Hence, the following claims are intended to include every modification of the present invention in a technical scope without deviating from the intent or technical perspective of the present invention.

What is claimed is:

1. A load driving device comprising:
a power supply circuit for supplying to a load an output voltage converted from an input voltage;
a detection voltage generation circuit that is connected between the load and a ground, for generating a detection voltage that varies depending on a magnitude of a voltage drop across the load; and
a control circuit for controlling the power supply circuit so that output feedback control of the output voltage is performed based on the detection voltage, wherein
the detection voltage generation circuit includes a constant-current source connected in series with the load and flowing constant current that can be adjusted, the detection voltage generation circuit outputting a node voltage at a connection node between the load and the constant-current source as the detection voltage,
the control circuit generates a control signal of the power supply circuit so that the detection voltage of a connecting point of the load and the constant-current source becomes a constant voltage, and
the constant-current source includes:
a transistor having a first terminal connected in series with the load;
a resistor connected between a second terminal of the transistor and a ground; and
an error amplifier for generating a control signal to a control terminal of the transistor, and
wherein the power supply circuit includes:
an isolation transformer, the input voltage being applied to a primary side of the isolation transformer, and the output voltage being supplied from a secondary side of the isolation transformer to the load, and
the power supply circuit feeds back, via a photocoupler to the primary side, a signal corresponding to the detection voltage, in order to control the output voltage according to an output signal of the photocoupler such that the node voltage remains constant.

2. The load driving device according to claim 1, wherein the power supply circuit further includes:
a diode provided on the secondary side of the isolation transformer, the diode being connected in a current supply path from the isolation transformer to the load, with an anode of the diode on the isolation transformer side and a cathode of the diode on the load side.

3. The load driving device according to claim 2, wherein the power supply circuit further includes:
a capacitor of which a first terminal is connected to the cathode of the diode, and of which a second terminal is connected to a ground.

4. The load driving device according to claim 1, wherein a value of the constant current supplied from the constant-current source is adjustable.

5. The load driving device according to claim 1, wherein the load is an LED.

6. The load driving device according to claim 1, wherein the isolation transformer is driven by a forward method.

* * * * *